(12) United States Patent
Sugiyama et al.

(10) Patent No.: US 8,804,247 B2
(45) Date of Patent: Aug. 12, 2014

(54) TRANSMISSIVE DISPLAY DEVICE

(75) Inventors: Keiji Sugiyama, Kyoto (JP); Kenichi Kasazumi, Osaka (JP); Kakuya Yamamoto, Hyogo (JP); Akira Kurozuka, Osaka (JP); Tatsuo Itoh, Osaka (JP); Shinichi Shikii, Nara (JP)

(73) Assignee: Panasonic Corporation, Osaka (JP)

( * ) Notice: Subject to any disclaimer, the term of this patent is extended or adjusted under 35 U.S.C. 154(b) by 217 days.

(21) Appl. No.: 13/515,408

(22) PCT Filed: Dec. 8, 2010

(86) PCT No.: PCT/JP2010/007131
§ 371 (c)(1),
(2), (4) Date: Jun. 12, 2012

(87) PCT Pub. No.: WO2011/074209
PCT Pub. Date: Jun. 23, 2011

(65) Prior Publication Data
US 2012/0250306 A1    Oct. 4, 2012

(30) Foreign Application Priority Data

Dec. 14, 2009  (JP) ................................ 2009-282493
Dec. 14, 2009  (JP) ................................ 2009-282494
Apr. 26, 2010  (JP) ................................ 2010-100589

(51) Int. Cl.
*G02B 27/14*  (2006.01)
*G02B 27/01*  (2006.01)

(52) U.S. Cl.
CPC .................................. *G02B 27/0101* (2013.01)
USPC .............................. 359/630; 359/13; 359/633

(58) Field of Classification Search
CPC ........... G02B 27/0101; G02B 27/0103; G02B 2027/011
USPC .................................... 359/13, 629, 630, 633
See application file for complete search history.

(56) References Cited

U.S. PATENT DOCUMENTS 4,832,427 A    5/1989   Nanba et al.
4,973,132 A    11/1990  McDonald et al.
(Continued)

FOREIGN PATENT DOCUMENTS

JP    63-194222    8/1988
JP    3-48809      3/1991
(Continued)

OTHER PUBLICATIONS

International Search Report issued Mar. 8, 2011 in International (PCT) Application No. PCT/JP2010/007131.

*Primary Examiner* — William Choi
(74) *Attorney, Agent, or Firm* — Wenderoth, Lind & Ponack, L.L.P.

(57) ABSTRACT

A transmissive display device includes: a light source which outputs light; a display part which receives the light from the light source and generates display light representing an image; a deflecting element which changes a direction of the display light emitted from the display part; and a transmissive reflector which reflects, towards a user, light of a wavelength included in the display light emitted from the display part, and transmits light of other wavelengths. An angle formed by a straight line, which extends between an upper edge of an incident area of the display light on the transmissive reflector and a lower portion of an eyebox which is defined as a visible range of the reflected light from the transmissive reflector, with respect to a horizontal line is smaller than a difference between an emission angle and an incident angle of the display light at the transmissive reflector.

23 Claims, 48 Drawing Sheets

(56) References Cited

U.S. PATENT DOCUMENTS

| | | | |
|---|---|---|---|
| 5,035,473 A * | 7/1991 | Kuwayama et al. | 359/13 |
| 5,748,377 A | 5/1998 | Matsumoto et al. | |
| 5,760,931 A | 6/1998 | Saburi et al. | |

FOREIGN PATENT DOCUMENTS

| | | |
|---|---|---|
| JP | 3-197239 | 8/1991 |
| JP | 6-115382 | 4/1994 |
| JP | 6-167671 | 6/1994 |
| JP | 9-50227 | 2/1997 |
| JP | 9-179060 | 7/1997 |
| JP | 9-236774 | 9/1997 |
| JP | 10-10464 | 1/1998 |
| JP | 3151766 | 4/2001 |
| JP | 3418985 | 6/2003 |

\* cited by examiner

FIG. 24

| DIFFRACTION ANGLE OF COMBINER | ALLOWABLE MAGNIFICATION RATIO |
|---|---|
| 65° | 3.0x |
| 60° | 3.33x |
| 55° | 3.5x |
| 50° | 3.5x |
| 45° | 3.75x |

※ INCIDENT ANGLE: 20° IN ALL CASES

FIG. 26

| DIFFRACTION ANGLE OF COMBINER | COMBINER DISTANCE | 100mm | 150mm | 165mm | 200mm |
|---|---|---|---|---|---|
| 65° (INCIDENT ANGLE 20°, MAGNIFICATION RATIO 3.0) | | 3.09L | 1.82L | 1.53L | 0.94L |
| 60° (INCIDENT ANGLE 20°, MAGNIFICATION RATIO 3.33) | | 2.16L | 1.14L | 0.92L | 0.59L |
| 55° (INCIDENT ANGLE 20°, MAGNIFICATION RATIO 3.5) | | 1.74L | 0.85L | 0.71L | 0.47L |
| 52° (INCIDENT ANGLE 20°, MAGNIFICATION RATIO 3.5) | | 1.57L | 0.76L | 0.66L | 0.44L |
| 50° (INCIDENT ANGLE 20°, MAGNIFICATION RATIO 3.5) | | 1.55L | 0.75L | 0.64L | 0.43L |
| 45° (INCIDENT ANGLE 20°, MAGNIFICATION RATIO 3.75) | | 1.14L | 0.47L | 0.48L | 0.33L |

TRANSMISSIVE DISPLAY DEVICE

TECHNICAL FIELD

The present invention relates to a transmissive display device which displays a superimposed image over an ambient outlook that is viewed through a transmissive display portion so that a user views an image and the ambient outlook together.

BACKGROUND OF THE INVENTION

A driver driving a vehicle such as an automobile has to safely and quickly perform various driving operations such as understanding what happens outside the vehicle, reading information from display devices of the vehicle and performing driving actions. Therefore, it is desirable that vehicle information sent from the display device is readable in a necessary movement range of the driver's viewpoint for understanding circumstances outside the vehicle while driving. For example, an image display device desirably irradiates light onto a part of a transparent plate such as the front windscreen of the vehicle to display texts and/or images.

Various devices such as a head-up display (hereinafter, called "HUD"), which displays driving information on a front windscreen of an automobile or a head-mounted display (hereinafter, called "HMD"), which displays information on a lens section of an eyeglass apparatus, are exemplified as such a transmissive display device. A driver uses such a transmissive display device to see driving information (e.g., a map and/or a speedometer) with an ambient outlook. Therefore, it is expected that such transmissive display devices contribute to safe driving operation of the driver.

FIG. 46 shows a schematic view of a conventional HUD. According to Patent Document 1, the HUD projects a virtual image onto the front windscreen. A highly transmissive hologram combiner is attached to the front windscreen. The hologram combiner transmits external light at a high transmission ratio and also directs very bright display image, which is projected onto the hologram combiner, to the driver's eyes. The external light passes through the hologram combiner at a high transmission ratio and reaches the driver's eyes.

As shown in FIG. 46, the HUD mounted on the vehicle 101 comprises an HUD optical unit 102, which is stored in the dashboard, a display part 103 and a deflecting element 104 which are situated inside the HUD optical unit 102, a light source (not shown), which is situated inside the display part 103, and a combiner 106, which is attached to the front windscreen 107.

For example, the display part 103 includes liquid crystals to display information (an image), which a driver DR watches. The display light, which represents the image generated by the display part 103, is projected towards the deflecting element 104. For example, the deflecting element 104 includes optical elements such as mirrors to deflect the display light from the display part 103 toward the combiner 106, which is attached to the front windscreen 107.

An opening 105 is defined on the HUD optical unit 102. The deflected display light from the deflecting element 104 is projected through the opening 105 onto the combiner 106 which is formed on a surface of the front windscreen 107. The front windscreen 106 reflects the display light from the HUD optical unit 102 toward the driver DR.

The driver DR may see the reflected display light from the combiner 106 to visually obtain driving information. The eye box EB means a range in which the driver DR may see an image when the driver DR moves the head. If the eyes of the driver DR stay inside the eye box EB, the display light reaches the retina of the driver DR, so that the driver DR may view the image. The combiner 106 has characteristics, which allow transmission of the external light outside the front windscreen 106 (the exterior) and reflect the display light from the HUD optical unit 102. Due to these characteristics of the combiner 106, the driver DR may see an ambient view outside the front windscreen 107 together with the displayed information from the display part 103. The driver DR may use an HUD to see information from the display part 103 without moving the sight line away from the exterior. Since the driver DR moves the sight line less frequently, the driving operation becomes safer.

According to Patent Document 1, a hologram combiner is used as the combiner 106. A hologram combiner has high wavelength selectivity. For example, the hologram combiner reflects only wavelengths used by the display part 103 and transmits other light wavelengths. Therefore, the hologram combiner may reflect bright light from the display part 103 and simultaneously transmit external light at a high transmission ratio.

According to Patent Document 1, a concave mirror is used as the deflecting element 104. Patent Document 1 proposes usage of a concave mirror to correct resultant image distortion from a curvature of the combiner 106.

Adjustment to an incident light angle on a hologram used as the combiner 106 and an angle of diffracted and emitted light from the combiner may be attempted in order to make resultant aberration from the hologram less influential (c.f., Patent Document 4).

The HUD shown in FIG. 46 uses the combiner 106 (hologram combiner) attached to the front windscreen 107 to present an image to the driver DR. However, the display light from the display part 103 is also reflected not only by the combiner 106 but also by the front windscreen 107. Therefore, the driver DR sees images created by the diffracted display light from the combiner 106 and by the reflected display light from the front windscreen 107.

FIG. 47 is a schematic view, which describes a problem caused by the reflected display light from the front windscreen. The problem caused by the reflected display light from the front windscreen is described with reference to FIG. 47.

FIG. 47 shows two glass plates (an inner glass plate 202 and an outer glass plate 203), which are used as a front windscreen, and a hologram combiner 201, which intervenes between the inner and outer glass plates 202, 203. Display light (incident light IL) is projected towards the hologram combiner 201. The hologram combiner 201 diffracts the incident light IL to create diffracted light DL towards the driver DR.

The inner glass plate 202 forms an inner surface of the vehicle whereas the outer glass plate 203 forms a boundary surface between the vehicle and the exterior. The inner glass plate 202 reflects the incident light IL, which is directed to the hologram combiner 201, towards the driver DR. The reflected light from the inner glass plate 202 is indicated as the reflected light RL1 in FIG. 47. The outer glass plate 203 reflects the light, which passes through the hologram combiner 201, towards the driver DR. The reflected light from the outer glass plate 203 is indicated as the reflected light RL2 in FIG. 47.

The driver DR views an image displayed by the diffracted light DL from the hologram combiner 201, an image displayed by the reflected light RL1 from the inner glass plate 202, and an image displayed by the reflected light RL2 from the outer glass plate 203. Consequently, the image displayed by the display light from the display part is viewed by the driver DR as blurred double or triple images.

Hereinafter, in the present specification, a problem which causes drivers to simultaneously view the diffracted light from the hologram combiner and the reflected light from the glass plates (front windscreen) is called "surface reflection problem".

FIG. 48 shows a schematic view of a method for solving the surface reflection problem. The method shown in FIG. 48 resolves the surface reflection problem by making a directional difference between the diffracted light from the hologram combiner and the reflected light from the surface of the glass plates.

Optical characteristics of the hologram combiner 201 shown in FIG. 48 are designed so that the diffracted light DL is emitted at a diffraction angle DA in response to the light (incident light IL) which is incident at an incident angle IA. In this case, the reflected light RL1 from the inner glass plate 202 and the reflected light RL2 from the outer glass plate 203 are emitted from the front windscreen at an emission angle OA which is equivalent to the incident angle IA. If there is a sufficiently large difference between the diffraction angle DA and the emission angle OA, only the diffracted light DL from the hologram combiner 201 is incident on the eye box EB in which the driver DR sees the display image. Consequently, the driver DR is less likely to view the reflected lights RL1, RL2 from the inner and outer glass plates 202, 203.

For example, if the emission angle OA of the reflected lights RL1, RL2 is sufficiently larger than the diffraction angle DA as shown in FIG. 48, the diffracted light DL is incident on the eye box EB whereas the reflected lights RL1, RL2 deviate over from the eye box EB. For instance, Patent Document 2 proposes a display device for a vehicle which causes a directional difference between the reflected light from a glass plate and the diffracted light from a hologram combiner according to the scheme shown in FIG. 48.

Patent Document 3 proposes a hologram applied to other portions than a combiner for quality improvement of images presented to a driver by an HUD. If a hologram is used as the deflecting element 104 to deflect the light from the display part 103 of the HUD described with reference to FIG. 46 towards the combiner 106 instead of a mirror, the resultant aberration from the combiner 106 becomes less influential.

A large difference between the diffraction angle and the emission angle resolves the surface reflection problem but causes image blurring (color aberration) because of a wavelength width of the light source. Here, "image blurring" means phenomena in which incident light is diffracted in a different direction from a designed direction for a designed light wavelength of the hologram combiner if different light in wavelength from the design wavelength is incident on the hologram combiner.

If the hologram combiner is designed on the basis of the central wavelength of the light source and if the wavelength width of the light source becomes wider, a larger amount of light which has different wavelengths from the designed wavelength is incident on the hologram combiner. Consequently, a large amount of the light from the light source is diffracted in a different direction from the designed diffraction angle. The greater the difference between the incident angle and the diffraction angle of the hologram combiner, the more influential the image blurring caused by the hologram combiner. Consequently, if the wavelength width of the light source is large, a large difference between the incident angle and the diffraction angle of the hologram combiner largely reduces image resolution, which is presented to the driver, although the difference resolves the surface reflection problem. Patent Document 2 does not take account of the wavelength width of the light source.

A hologram used as the deflecting element 104 makes the resultant image blurring from the combiner 106 less influential. However, the optimum optical design for making the image blurring less influential (e.g., settings of the optimum incident angle and diffraction angle for the deflecting element 104 which uses a hologram) depends on the wavelength width of the light source and the target resolution. Patent Document 3 does not take account of this point.

Usage of an optical element having magnification characteristics such as a hologram or a concave mirror as a combiner allows a compact design of an HUD. However, if an optical magnification ratio of the combiner is increased, the optical system causes aberration large enough to decrease resolution of the displayed image.

Patent Document 4 proposes setting the incident angle and the diffraction angle (emission angle) at the combiner to 20° or more to resolve the aforementioned problem. However, if there is a large difference between the incident angle and the emission angle at the combiner and if the light source supplying light to the display element to display an image has a large wavelength width, the hologram causes the image blurring. Patent Document 4 does not take account of the wavelength width of the light source.

Patent Document 1 proposes a turning mirror, which also works as a concave mirror, to correct resultant distortion from a combiner. According to Patent Document 1, a decrease in resolution is prevented by the concave mirror function. However, if a concave mirror is simply used, astigmatisms caused by the combiner and aberration because of the concave mirror are superimposed on each other. Therefore, resultant image resolution may not be improved. A reduction in a magnification ratio of the optical system may improve the image resolution but the optical system undesirably becomes larger for application to transmissive display devices such as HUDs which are mounted in small vehicles.

Patent Document 1: JP 3,418,985 B
Patent Document 2: JP 2,751,436 B
Patent Document 3: JP H06-167671 A
Patent Document 4: JP H10-010464 A

DISCLOSURE OF THE INVENTION

It is an object of the present invention to provide a transmissive display device which suitably corrects effects of image blurring and aberration caused by a hologram combiner, in response to a wavelength width of a light source.

The transmissive display device according to one aspect of the present invention comprises: a light source configured to emit light; a display part which receives the light from the light source to generate display light that represents an image; a deflecting element which changes a direction of the display light emitted from the display part; and a transmissive reflector configured to reflect light, which has a wavelength included in the display light emitted from the display part, towards a user and transmits light, which has other wavelengths, wherein an angle formed by a straight line, which extends between an upper edge of an incident area of the display light on the transmissive reflector and a lower portion of an eye box that is defined as a visible range of the reflected display light from the transmissive reflector, with respect to a horizontal line, is smaller than a difference between an emission angle and an incident angle of the display light at the transmissive reflector.

The aforementioned transmissive display device may suitably correct image blurring effects caused by a transmissive reflector because of a light wavelength width from a light source.

BRIEF DESCRIPTION OF THE DRAWINGS

FIG. 24 is an exemplary table about set values of the diffraction angle and optical magnification ratio of the combiner.

FIG. 26 is an exemplary table of incident angles on the combiner, diffraction angles of the combiner, optical magnification ratios of the combiner and volumes of the HUD, which are associated with a change in combiner distance.

DETAILED DESCRIPTION OF THE INVENTION

Figure 1:
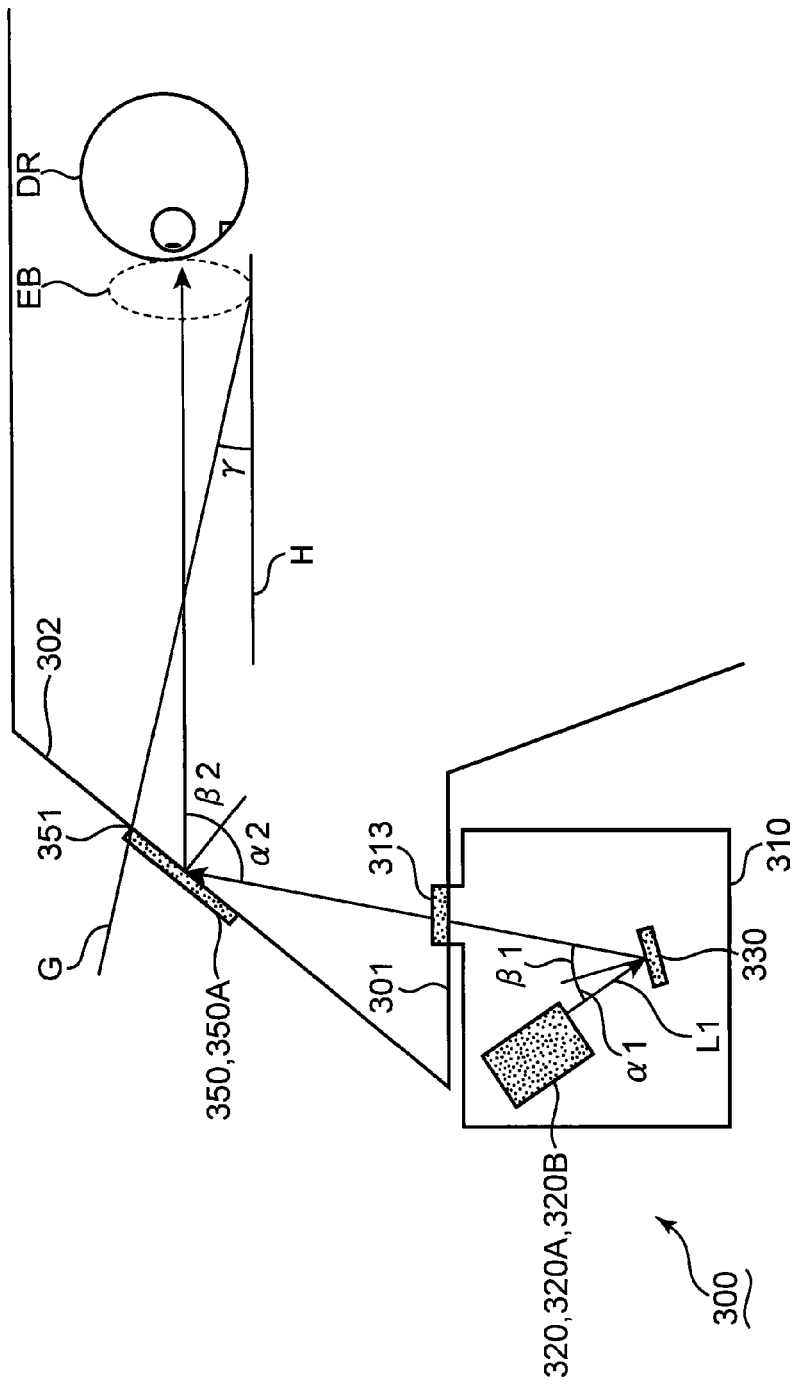
FIG. 1 is a schematic view of a transmissive display device according to the first embodiment.

A transmissive display device according to one embodiment of the present invention is described below with reference to the drawings. In the embodiments described below, the same constituent components are donated with the same reference numerals. In order to make the description clear, repetitive explanations are omitted as necessary. Configurations, arrangements or shapes shown in the drawings and the description relating to the drawings are merely intended to make principles of the following embodiments easily understood. The principles described on the basis of the various embodiments given below are not limited in any way to these.

First Embodiment

FIG. 1 is a schematic view of an exemplary HUD (head-up display) according to the first embodiment. An incident angle on a hologram combiner of the HUD according to the present embodiment is designed to be larger than its diffraction angle, in order to resolve the surface reflection problem and display high quality images.

The HUD 300 shown in FIG. 1 comprises an HUD optical unit 310 which is situated inside a dashboard of a vehicle 301. The HUD optical unit 310 stores a display part 320 and a correcting element 330. An opening 313 is formed on the HUD optical unit 310. The display part 320 creates display light L1 which is emitted through the opening 313. In the present embodiment, the HUD optical unit 310 is exemplified as the display unit.

The display part 320 generates and emits the display light L1 to display an image, which contains driving information (a speedometer and/or map information), to a driver DR. In the present embodiment, the display part 320 two-dimensionally scans a display screen with beams emitted from laser sources to create an image, which is presented to the driver DR.

Figure 2:
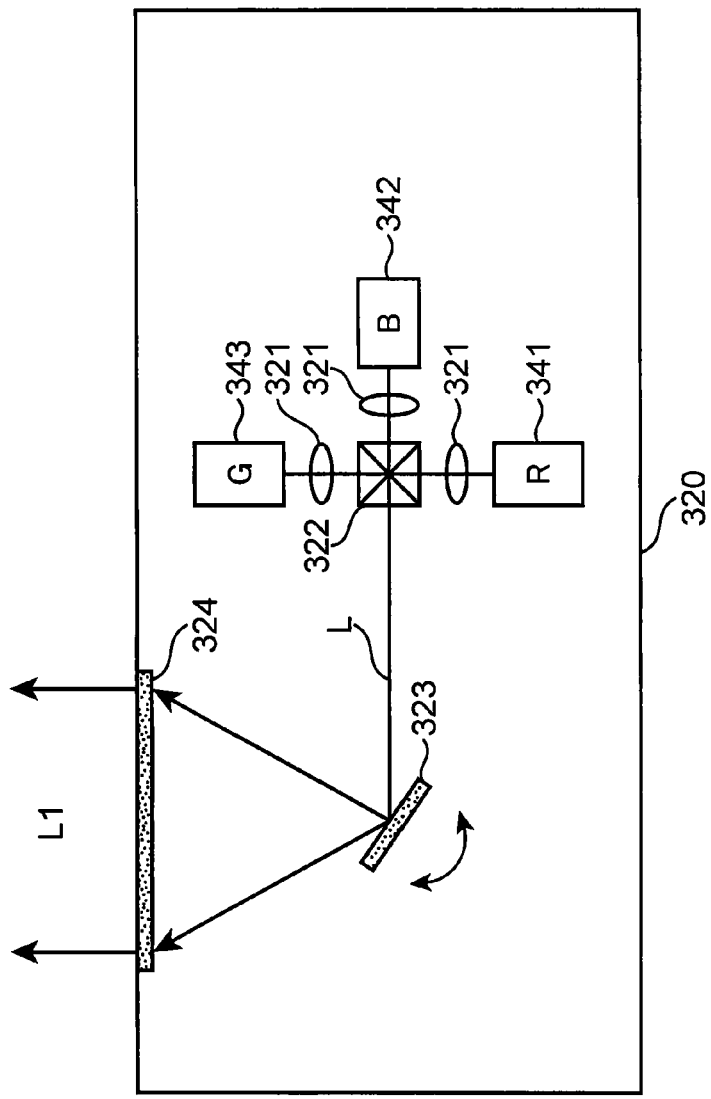
FIG. 2 is a schematic view of a display part of the transmissive display device shown in FIG. 1.

FIG. 2 is a schematic view of the display part 320. The display part 320 is described with reference to FIGS. 1 and 2.

The HUD 300 comprises a red laser source 341, a blue laser source 342 and a green laser source 343 which are situated inside the display part 320. In the present embodiment, the red, blue and green laser source 341, 342, 343 are exemplified as the light sources, respectively. The light sources are not limited to laser sources. Other types of light sources may be used so long as the light sources generate the display light L1 to show the driver DR the image.

The display part 320 comprises collimators 321 which are situated on optical paths of the laser beams emitted from the red, blue and green laser sources 341, 342, 343, respectively, and a dichroic mirror 322 which multiplexes the laser beams emitted from the red, blue and green laser sources 341, 342, 343. In the present embodiment, these various components in the display part 320 are exemplified as the display elements.

The laser beams emitted from the red, blue and green laser sources 341, 342, 343 pass through the collimators 321, respectively. The dichroic mirror 322 then multiplexes these beams and outputs the multiplexed beams as laser light L. The outputs of the red, blue and green laser sources 341, 342 343 are appropriately modulated. Consequently, the laser light L emitted from the dichroic mirror 322 has a desired color.

In the present embodiment, the red laser source 341 is a red (R) semiconductor laser source. The blue laser source 342 is a blue (B) semiconductor laser source. The green laser source 343 is a green (G) semiconductor laser source. Alternatively, the green laser source may be a combination of a semiconductor laser source, which emits infrared light, and an SHG (Second-Harmonic Generation) element, which converts the infrared light to green light. Yet alternatively, the red, blue and green laser sources may be solid-state laser sources, liquid laser sources, gas laser sources or light-emitting diode light sources.

In the present embodiment, the outputs of the red, blue and green laser sources 341, 342, 343 are adjusted to modulate the laser light L. Alternatively, a laser source and an optical device, which modulates the emitted light from the laser source, may be used to modulate the laser light.

The display part 320 further comprises a scanning element 323 and a display screen 324. The scanning element 323 two-dimensionally scans the display screen 324 with the laser light L of the multiplexed laser beams from the red, blue and green laser sources 341, 342, 343. In the present embodiment, the scanning element 323 comprises a compact mirror of a single plate which two-dimensionally deflects an angle with respect to the optical path of the laser light L. For example, a MEMS (Micro-Electro-Mechanical System) is suitably used as the scanning element 323.

Figure 3:
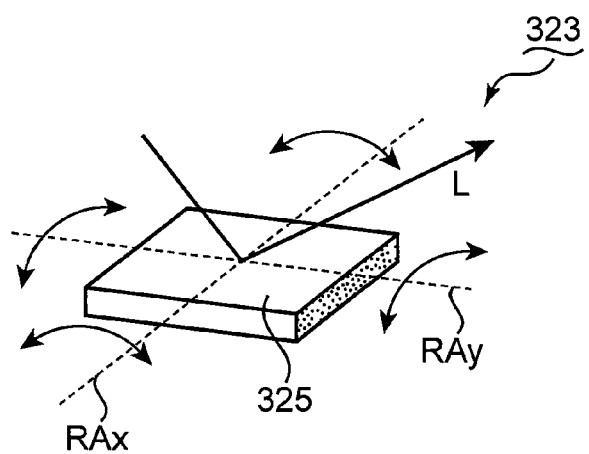
FIG. 3 is a schematic view of a scanning element of the display device shown in FIG. 2.

FIG. 3 shows a schematic view showing operation of the scanning element 323. The scanning element 323 is further described with reference to FIG. 3.

The scanning element 323 comprises a single-plate compact mirror 325. The single-plate compact mirror 325 may rotate about a rotational axis RAx which extends along the X axis, and a rotational axis RAy which extends along the Y axis perpendicular to the X axis. The scanning element 323 causes the single-plate compact mirror 325 to oscillate in the direction of the rotational axes RAx, Ray, in order to perform the two-dimensional scanning operation of the incident laser light L on the single-plate compact mirror 325.

In the present embodiment, the scanning element 323 causes one single-plate compact mirror 325 to oscillate in the two-dimension directions. Alternatively, the scanning element may use a combination of two mirrors which oscillate in one-dimensional direction, respectively, to perform the two-dimensional scanning operation of the laser light. If the scanning element causes the mirrors to oscillate in one-dimensional directions only, it becomes simple to control each angle of the mirrors.

The display part 320 is further described with reference to FIGS. 1 and 2.

As described above, the scanning element 323 two dimensionally scans the rear surface of the display screen (the inner surface of the display part 320) with the laser light L to form a display image (image). The image formed on the display screen 324 is output towards the correcting element 330 from a surface of the display screen 324 (the outer surface of the display part 320).

In the present embodiment, the display part 320 performs rear projection onto the display screen 324. Alternatively, the display part may perform front projection onto a display screen.

Figure 4:
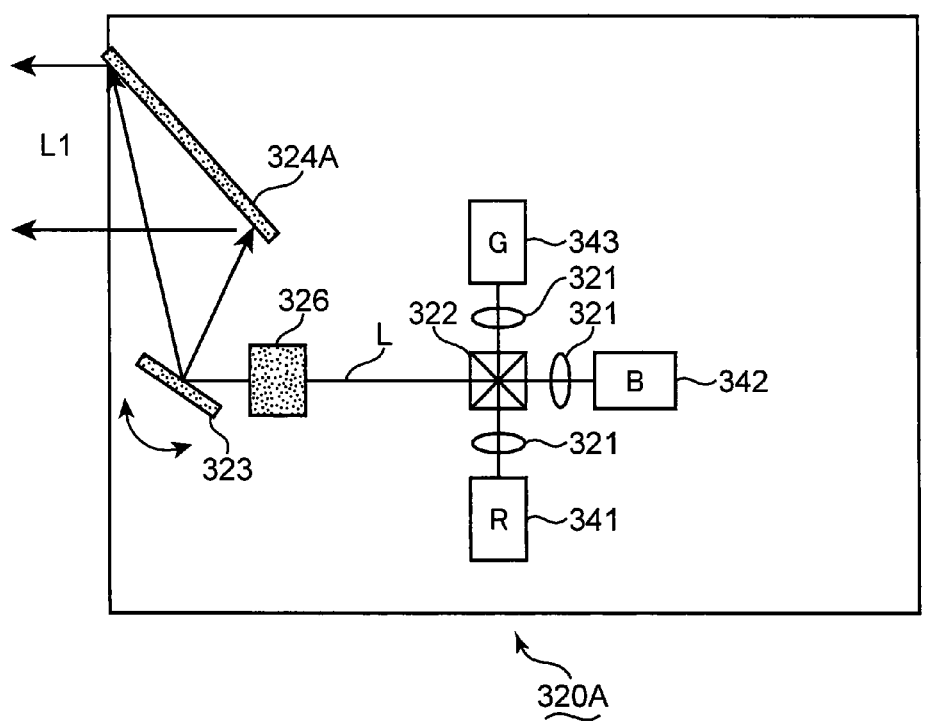
FIG. 4 is a schematic view of anther display part of the transmissive display device shown in FIG. 1.

FIG. 4 shows a configuration of a display part which performs the front projection. In FIG. 4, the same reference numerals are allocated to the same components as the components described with reference to FIG. 2. Description of the same components as those described with reference to FIG. 2 is omitted here. The display part shown in FIG. 4 is suitably used for the HUD 300, instead of the display part 320 described with reference to FIG. 2. The display part which performs the front projection is described with reference to FIGS. 1, 2 and 4.

The display part 320A which performs the front projection comprises a polarizer 326 and a display screen 324A, in addition to the light sources (the red, blue and green laser sources 341, 342, 343), the collimator 321, the dichroic mirror 322 and the scanning element 323, which are described with reference to FIG. 2. In the present embodiment, the various components in the display part 320A are exemplified as the display elements.

The polarizer 326 polarizes the output laser light L from the dichroic mirror 322 to make a desired color of the laser light L. The output laser light L from the polarizer 326 is directed towards the scanning element 323.

The display screen 324A is situated inside the display part 320A at a slant. The front surface of the display screen 324A substantially faces the scanning element 323. The scanning element 323 scans the front surface of the display screen 324A with the laser light output from the polarizer 326.

The display part 320A is desirably a fly-eye mirror or a bead screen, which has highly efficient diffusion functions. The display part 320A which uses a fly-eye mirror or a bead screen may present a very bright image to the driver DR.

In the present embodiment, the display parts 320, 320A comprise the display screens 324, 324A, respectively. Alternatively, the display part may exclude a display screen if laser light is directly projected onto the combiner, which is described below. Consequently, the light is directly projected onto the retinas of the driver DR so that the driver DR may perceive a very clear image.

In the present embodiment, the display parts 320, 320A use a scanning element 323 to perform the scanning operation of the laser light L. Alternatively, the display part may comprise a liquid crystal device and a backlight device. For instance, the liquid crystal device is used, instead of the scanning element 323 shown in FIG. 2 or 4. An optical system (backlight device), which illuminates the liquid crystal device, is situated between the dichroic mirror 322 shown in FIG. 2 or 4 and the liquid crystal device. A laser source may be used as the backlight device. Alternatively, a LED or another suitable light source may be used as the backlight device.

Figure 5:
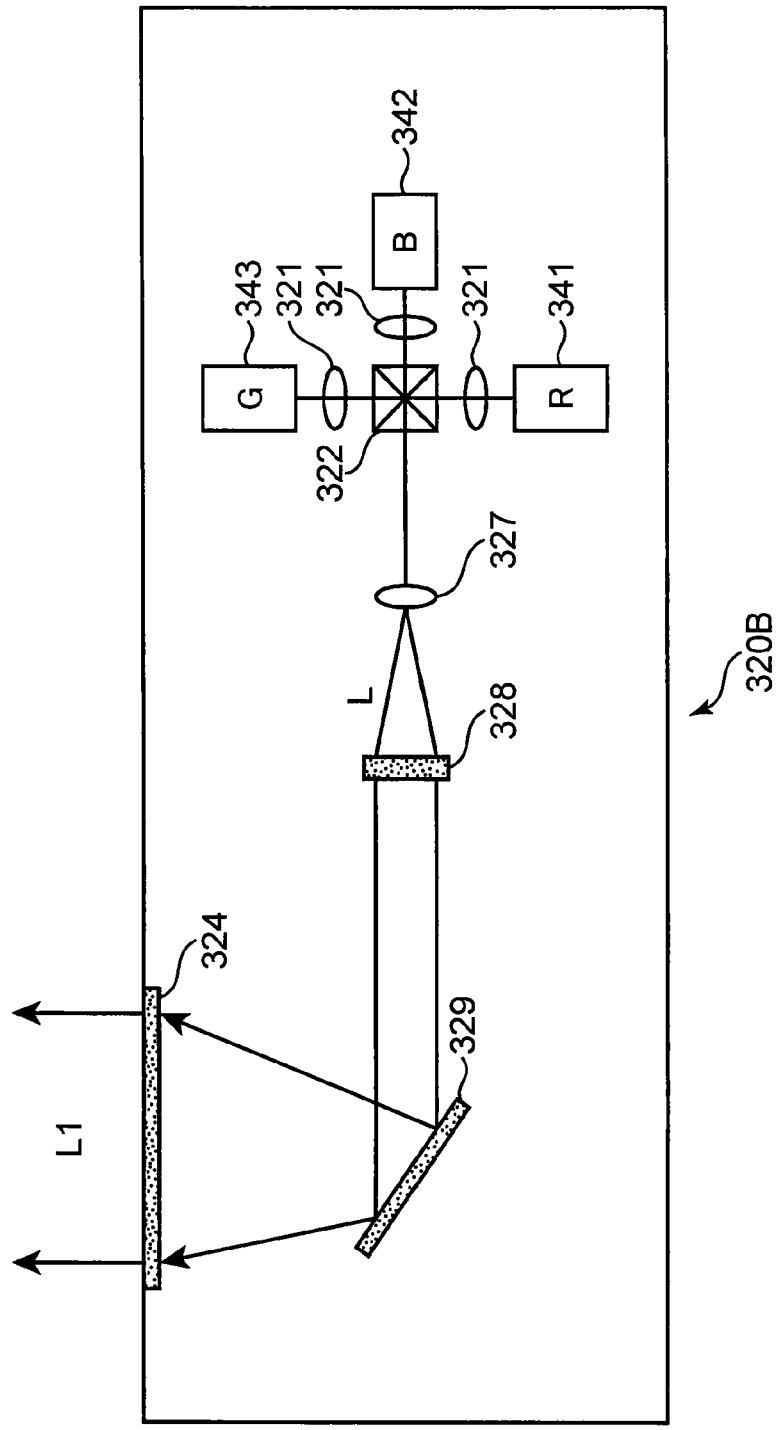
FIG. 5 is a schematic view of yet another display part of the transmissive display device shown in FIG. 1.

FIG. 5 shows a configuration of a display part which uses a liquid crystal device. In FIG. 5, the same reference numerals are allocated to the same components as those described with reference to FIG. 2. Description of the same components as those described with reference to FIG. 2 is omitted here. The display part shown in FIG. 5 is suitably used in the HUD 300, instead of the display part 320 described with reference to FIG. 2. A display part using a liquid crystal device is described with reference to FIGS. 1, 2 and 5.

The display part 320B comprises an illuminating optical element 327, a liquid crystal device 328 and a turning mirror 329, in addition to the light source (the red, blue and green laser sources 341, 342, 343), the collimator 321, the dichroic mirror 322 and the display screen 324, which are described with reference to FIG. 2. The liquid crystal device 328 and the turning mirror 329 are used, instead of the scanning element 323 which is described with reference to FIG. 2. In the present embodiment, the various components in the display part 320B are exemplified as the display elements.

The laser light L, which is generated by means of the light sources (the red, blue and green laser sources 341, 342, 343) and the dichroic mirror 322, is diffused by the illuminating optical element 327. The diffused laser light L is irradiated onto the liquid crystal device 328, which forms the display light L1 to send information to the driver DR. The display light L1 is then reflected towards the display screen 324 by the turning mirror 329. Consequently, the image displayed by the display light L1 appears on the display screen 324.

The display part 320B creates a display image by means of the liquid crystal device 328, instead of the scanning element 323 which is described with reference to FIG. 2. The display image is then formed on the display screen 324. Alternatively, if a liquid crystal device is used instead of the scanning element to create a display image, the display part may exclude a turning mirror or a display screen. For instance, the output display light from the liquid crystal device may be directly emitted from the display part. If the display light is directly emitted from the display part without passing through a turning mirror or a display screen, the display part may become very compact.

The HUD 300 is further described with reference to FIGS. 1 and 2.

The HUD 300 also comprises a hologram combiner 350. The display part 320, 320A or 320B emits the display light L1 towards the correcting element 330. The correcting element 330 changes the direction of the display light L1 and causes the light to be incident on the hologram combiner 350. In the present embodiment, the correcting element 330 is exemplified as the deflecting element.

As shown in FIG. 1, the display light L1 is incident on the correcting element 330 at an incident angle $\alpha_1$, and is emitted at a diffraction angle $\beta_1$. In the present embodiment, a hologram mirror, which is used as the correcting element 330, is designed so that the incident angle $\alpha_1$ is smaller than the diffraction angle $\beta_1$. Desirably, a Lippman volume type hologram or a blazed hologram, which is made of a photopolymer, is used as the correcting element 330. Alternatively, a liquid crystal device or another optical element, which has diffracting functions, may be used as the correcting element.

The display light L1 orientated by the correcting element 330 is incident on the hologram combiner 350 at an incident angle $\alpha_2$. The hologram combiner 350 emits the display light L1 at an incident angle $\beta_2$.

In the present embodiment, as shown in FIG. 1, the inclination direction of the correcting element 330 with respect to the horizontal line is equal to the inclination direction of the hologram combiner 350 with respect to the horizontal line (in FIG. 1, both the correcting element 330 and the hologram combiner 350 are inclined up towards the driver DR). Consequently, aberration caused by the greater incident angle $\alpha_2$ at the hologram combiner 350 than the diffraction angle $\beta_2$ is reduced enough to improve image quality presented to the driver DR.

The correcting element 330 may have functions of a magnifying mirror. If the correcting element 330 has the functions of a magnifying mirror, the optical path length from the display part 320, 320A or 320B to the correcting element 330 becomes short enough to achieve a compact design of the HUD optical unit 310.

A relationship among the incident and diffraction angles at the correcting element 330 and the hologram combiner 350 is described below.

In the present embodiment, the hologram combiner 350 is exemplified as the transmissive reflector which reflects the incident display light L1 from the correcting element 330 towards the eyes of the driver DR. The hologram combiner 350 reflects light, which have wavelengths included in the display light L1 emitted from the display parts 320, 320A or 320B, towards the driver DR (user) whereas the hologram combiner 350 transmits light which have other wavelengths. Consequently, the driver DR may visually perceive an ambient outlook outside the vehicle 301, as well as the image displayed with the display light L1.

For example, a photopolymer layer is formed on the inner surface of the front windscreen 302 mounted on the vehicle 301 (the surface forming a boundary with the interior of the vehicle 301). The hologram combiner 350 may be a Lippman volume hologram which is formed in the photopolymer layer. The hologram combiner 350 is fabricated so that the incident display light L1 at the incident angle $\alpha_2$ from the correcting element 330 is reflected towards the driver DR at the diffraction angle $\beta_2$.

In the present embodiment, the hologram combiner 350, which is formed in the photopolymer layer, includes three holograms which reflect light components from the red, blue and green laser sources 341, 342, 343, respectively. These holograms are formed by a multiple exposure method.

In the present embodiment, the hologram combiner 350 is a one-layer hologram, which is formed by the multiple exposure method for the light components of the three colors R, G, B. Alternatively, the hologram combiner may be a hologram which has three layers which correspond to light components of the three colors of R, G, B, respectively. Modulation values of refractive indexes for the hologram materials used in the hologram combiner with three laminated layers are appropriately set for each of the light components of three colors (RGB). Therefore, the diffraction efficiency for each of the light components of three colors (RGB) is improved, in comparison with a case where the modulation values of the refractive indexes of the hologram material are allocated to the RGB light components (when a one-layer hologram is used).

The hologram combiner 350 may have functions of a magnifying mirror. If the hologram combiner 350 has the functions of a magnifying mirror, the optical path length from the display part 320, 320A or 320B to the hologram combiner 350 become short enough to achieve a compact design of the HUD optical unit 310. In the present embodiment, the hologram combiner 350 has functions of a 2.0× (2.0 times) magnifying mirror. Alternatively, the hologram combiner may have other optical functions (e.g., another magnification ratio).

In the present embodiment, the HUD 300 is designed so that the incident angle $\alpha_2$ at the hologram combiner 350 is greater than the diffraction angle $\beta_2$ by at least 10°. Consequently, the surface reflection problem is suitably resolved.

The aforementioned hologram combiner 350 is formed in the photopolymer layer on the inner surface of the front windscreen 302. Alternatively, the HUD 300 may use a hologram combiner which intervenes into the front windscreen 302 as the transmissive reflector.

Figure 6:
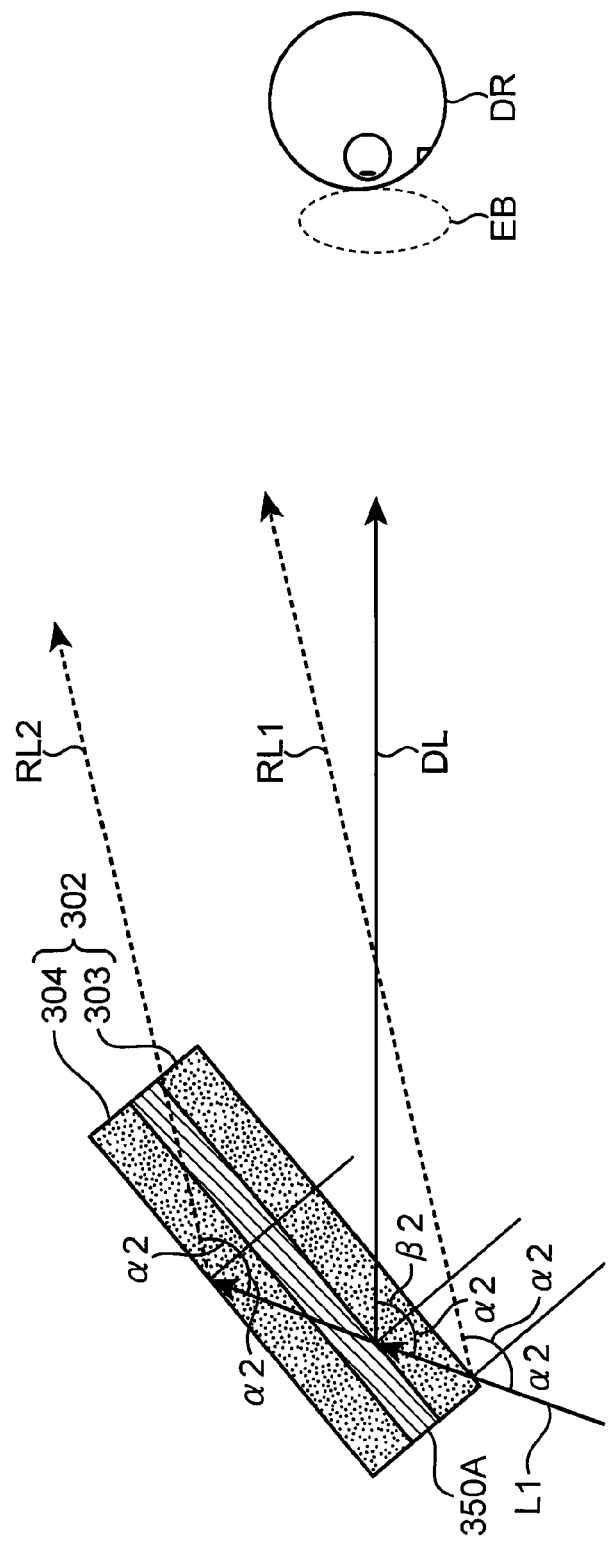
FIG. 6 is a schematic view of a hologram combiner of the transmissive display device shown in FIG. 1.

FIG. 6 shows a schematic view of a hologram combiner which intervenes into the front windscreen 302. The hologram combiner, which intervenes in the front windscreen 302, is described with reference to FIGS. 1, 6 and 48.

The front windscreen 302 comprises an inner glass plate 303, which forms a boundary of the interior of the vehicle 301, and an outer glass plate 304 which appears on the outside of the vehicle 301. The hologram combiner 350A used as the transmissive reflector is situated between the inner and outer glass plates 303, 304. For example, the hologram combiner 350A may be an HOE (Holographic Optical Element). The display light L1 is incident on the inner glass plate 303 at first. The inner glass plate 303 is exemplified as the front transparent member in the present embodiment. The outer glass plate 304 opposite to the inner glass plate 303 sandwiches the hologram combiner 350A with the inner glass plate 303. In the present embodiment, the outer glass plate 304 is exemplified as the rear transparent member. In the present embodiment, the hologram combiner 350A formed from the HOE is exemplified as the diffracting element.

The display light L1 is incident at the incident angle $\alpha_2$ on the hologram combiner 350A, which then diffracts the display light L1 at the diffraction angle $\beta_2$. The hologram combiner 350A directs the display light L1 to the driver DR. On the other hand, reflected light RL1 of the display light L1 from the inner glass plate 303 and reflected light RL2 of the display light L1 from the outer glass plate 304 are emitted at the emission angle $\alpha_2$ which is the same as the incident angle $\alpha_2$. The diffracted light DL from the hologram combiner 350A propagates in a different direction from the reflected lights RL1, RL2. Therefore, the driver DR may view only the diffracted light DL.

Figure 48:
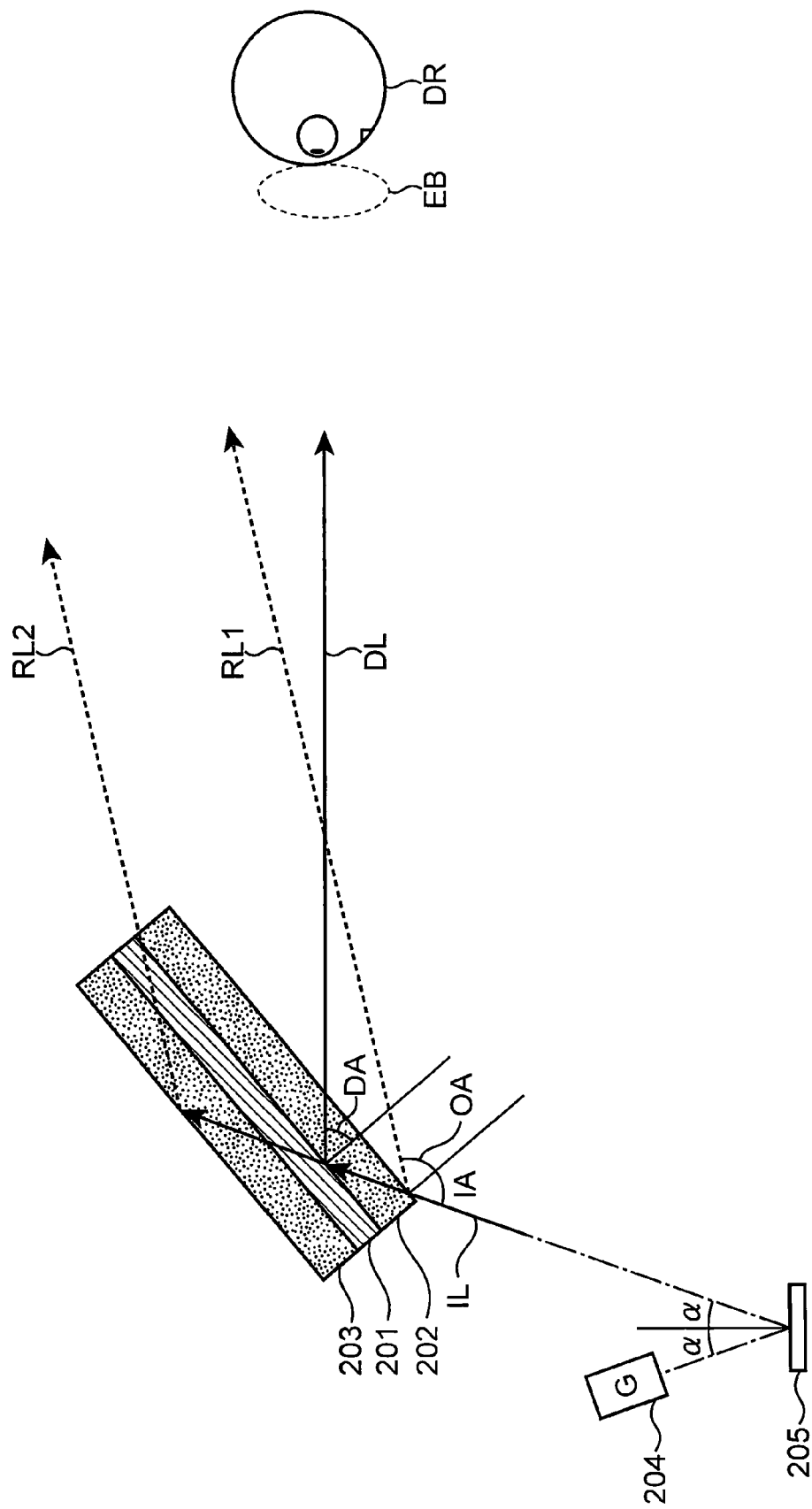
FIG. 48 is a schematic view of a hologram combiner which is used in a conventional transmissive display device.

As described with reference to FIG. 48, if there is a large difference between the incident angle IA on the hologram combiner 201 and the diffraction angle DA from the hologram combiner 201, and if the light source has a large wavelength width, the hologram combiner 201 causes very influential image blurring. Consequently, the image quality presented to the driver DR becomes worse.

Figure 7:
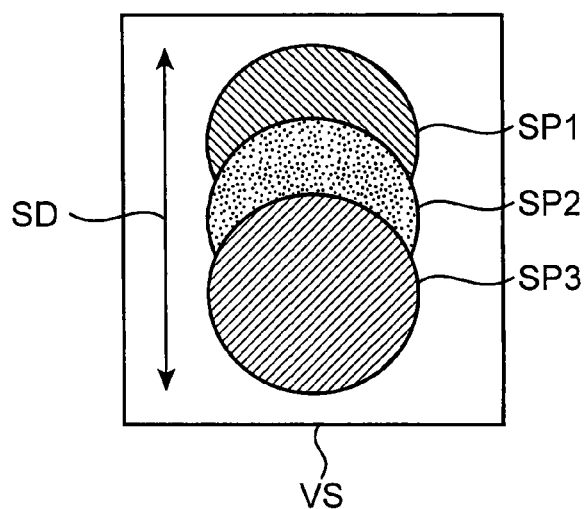
FIG. 7 is a schematic view of spot diameters on the retina of a driver under imaging blurring.

FIG. 7 shows a schematic view of spot diameters on the retina of the driver DR when an image is affected by the aforementioned blurring. The effects of the image blurring are described with reference to FIGS. 7 and 48.

FIG. 7 shows shapes of spots (spot shapes) which are irradiated from a green light source 204 configured to irradiate light of green wavelengths and then formed at the retina of the driver DR. FIG. 7 shows a schematic view of a spot SP2 which is formed at the retina by light of the central wavelength of the green light source 204, a spot SP3 formed at the retina by light of the longest wavelength, which is emitted from the green light source 204, and a spot SP1 formed at the retina by light of the shortest wavelength, which is emitted from the green light source 204. The spot SP2 is positioned substantially at the center of a screen VS while the spots SP1, SP3 are vertically adjacent to the spot SP2, respectively. In FIG. 7, the green light source depicts a spot on the central pixel of the screen VS with the light of which size at the retina is indicated by the reference symbol "SD".

As shown in FIG. 7, if there is a large difference between the incident angle IA on the hologram combiner 201 and the diffraction angle DA from the hologram combiner 201, and if the light source has a large wavelength width, the image forming position at the retina changes with the output wavelength of the light source (green light source 204). Consequently, the driver DR perceives a blurred image, which is depicted by the diffracted light DL from the hologram combiner 201.

The larger the size SD of the light from the green light source 204 at the retina, the greater the extent of the image blurring. If the wavelength width of the green light source 204 is large and if the difference between the incident angle IA and the diffraction angle DA at the hologram combiner 201 increases, then the hologram combiner 201 causes very influential image blurring. For instance, under a condition of: 2 nm of light wavelength width emitted from the green light source 204, 65° of the incident angle IA, 55° of the diffraction angle DA and an equivalent incident angle to the diffraction angle of the correcting element 205 (if the incident angle and the diffraction angle in FIG. 48 are "$\alpha$"), the size SD of the light from the green light source 204 is approximately 20 μm at the retina. In general, if a driver having "1.0" vision views a displayed image distant by 2 m in front, then the driver may view pixels up to 6.2 μm in size at the retina. If the size SD of the light from the green light source 204 is 20 μm at the retina, the driver DR perceives the image displayed by the HUD as a blurred image.

The blurring problem is not an inherent issue associated only with the green light source 204 but a common problem in red light sources, which irradiate light of red wavelengths, and blue light sources, which irradiate light of blue wavelengths. There are various descriptions hereinafter associated with the light from the green laser source 343 which depicts a spot on the central pixel of the screen. Principles and advantageous effects included in these descriptions may similarly apply to other light sources and other pixels.

A method for making the image blurring caused by the hologram combiner 350, 350A less influential is described with reference to FIG. 1 again.

In the present embodiment, in order to make the image blurring caused by the hologram combiner 350, 350A less influential, the correcting element 330 is formed from a hologram. The incident angle $\alpha_1$ on the correcting element 330 is set to be smaller than the diffraction angle $\beta_1$. Consequently, the effects of the image blurring caused by the hologram combiner 350, 350A are canceled out by the effects of the image blurring caused by the correcting element 330. Therefore, the spot diameter of the pixel becomes smaller at the retina.

In the following description, the difference between the incident angle $\alpha_2$ and the diffraction angle $\beta_2$ of the hologram combiner 350, 350A is called "combiner angle difference". The difference between the incident angle $\alpha_1$ and the diffraction angle $\beta_1$ of the correcting element 330 is called "correction angle difference".

If the correction angle difference is larger than the combiner angle difference, the effects of the image blurring caused by the hologram combiner 350, 350A are suitably corrected.

Figure 8:
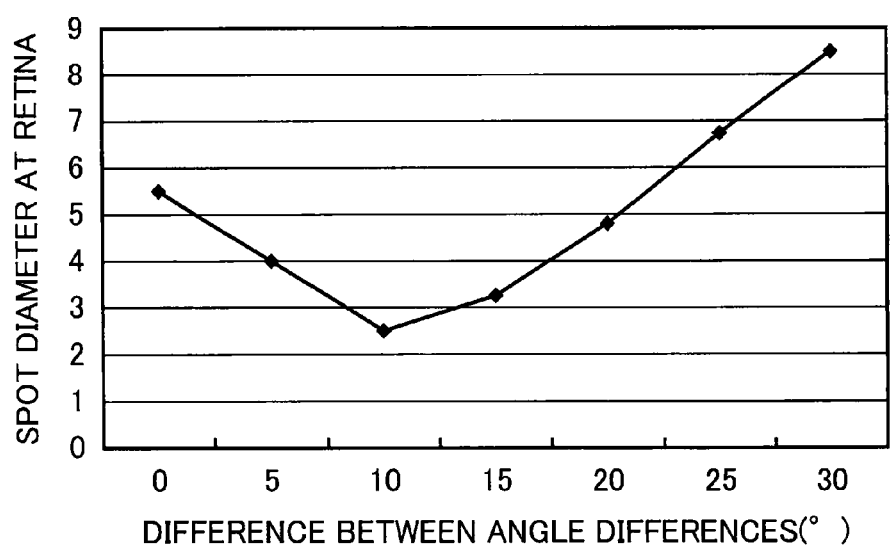
FIG. 8 is a schematic graph showing effects of a difference between a correction angle difference and a combiner angle difference on the spot diameter at the retina.

FIG. 8 is a schematic graph showing the effects of the difference between the correction angle difference (the difference between the incident angle $\alpha_1$ and the diffraction angle $\beta_1$ of the correcting element 330) and the combiner angle difference on the spot diameter at the retina. The effects of the correction angle difference on the spot diameter at the retina are described with reference to FIGS. 1, 2 and 8.

The wavelength width of the laser light L emitted from the green laser source 343 is 2 nm. The incident angle $\alpha_2$ at the hologram combiner 350, 350A is set to 65°. The diffraction angle $\beta_2$ from the hologram combiner 350, 350A is set to 55° (i.e., the combiner angle difference is set to 10°). The hologram combiner 350, 350A and the correcting element 330 both function as a 2.0× magnifying mirror.

The horizontal axis of the graph shown in FIG. 8 indicates the difference between the correction angle difference and the combiner angle difference. The vertical axis indicates a spot diameter at the retina of the light of the green laser source 343 which depicts a pixel at the center of the image.

As shown in FIG. 8, if the correction angle difference is set to be larger than the combiner angle difference (if the correction angle difference is larger than the combiner angle difference by 10° in the graph shown in FIG. 8), the spot diameter of the pixel is minimized at the retina.

Figure 9:
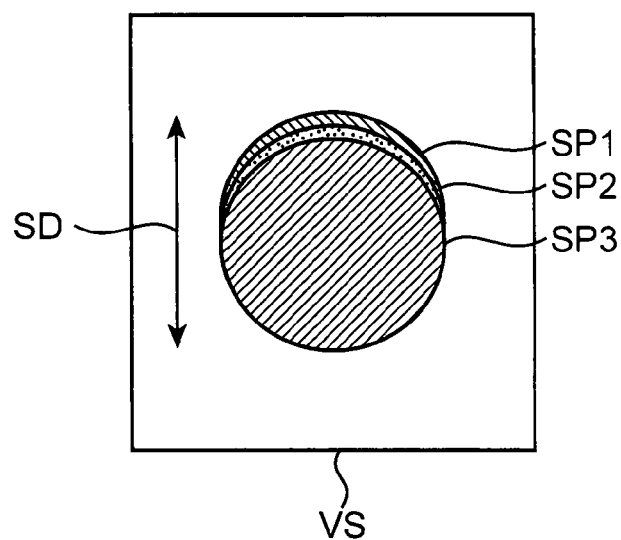
FIG. 9 is a schematic view of a spot diameter of a pixel at the retina under a greater correction angle difference than the combiner angle difference by 10°.

FIG. 9 shows a schematic view of the spot diameter of a pixel at the retina when the correction angle difference is greater than the combiner angle difference by 10°. It is described how adjustment to the correction angle difference resolves the image blurring with reference to FIG. 1 and FIGS. 7 to 9.

In accordance with the graph shown in FIG. 8, if the incident angle $\alpha_1$ and diffraction angle $\beta_1$ of the correcting element 330 are appropriately set so that the correction angle difference is greater than the combiner angle difference by 10°, the resultant difference in image formation position of the spots SP1, SP2, SP3 from the wavelength width is reduced at the retina. Consequently, the spot diameter of the pixel at the retina (the size SD of the light from the green laser source 343 at the retina) is reduced (c.f., FIGS. 7 and 9).

As shown in FIG. 8, on the contrary, if the correction angle difference is excessively large in comparison with the combiner angle difference, the image blurring becomes more influential.

Figure 10:
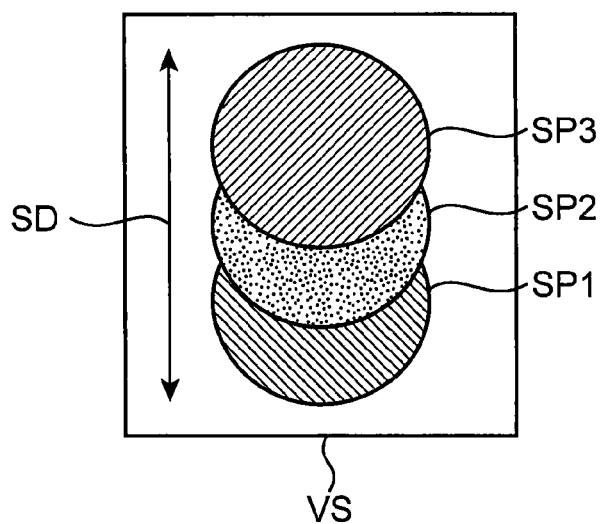
FIG. 10 is a schematic view of a spot diameter of a pixel when the correction angle difference is set excessively large in comparison with the combiner angle difference.

FIG. 10 shows a schematic view of the spot size of a pixel when an excessively large correction angle difference is set in comparison with the combiner angle difference. It is described how the adjustment to correction angle difference resolves the image blurring with reference to FIG. 1 and FIGS. 7 to 10.

As clearly shown by a comparison between FIGS. 7 and 10, a positional relationship between the spot SP1, which is obtained by light of the largest wavelength, and the spot SP3 of the smallest wavelength is reversed. This means that if the difference between the incident angle $\alpha_1$ and the diffraction angle $\beta_1$ of the correcting element 330 is too large, the image blurring caused by the correcting element 330 becomes more influential than the image blurring caused by the hologram combiner 350, 350A. Therefore, the spot diameter of the pixel at the retina (the size SD of the light from the green laser source 343 at the retina) becomes larger. Consequently, the incident angle $\alpha_1$ and the diffraction angle $\beta_1$ of the correcting element 330 have to be appropriately set on the basis of the wavelength width of the light source and optical settings of the hologram combiner 350, 350A. According to the graph shown in FIG. 8, if the wavelength width of the laser light L emitted from the green laser source 343 is 2 nm, and if the optical magnification ratio of the hologram combiner 350, 350A and the correcting element 330 is 2.0×, it is desirable that the difference between the correction angle difference and the combiner angle difference is restricted to a range of approximately 5° to 15°. It is desirable that a larger difference is set between the correction angle difference and the combiner angle difference as the wavelength width of the laser light L emitted from the green laser source 343 becomes larger. Therefore, if the wavelength width of the laser light L emitted from the green laser source 343 is no less than 2 nm, the difference between the correction angle difference and the combiner angle difference is set to be no less than 5°.

The smaller the wavelength width of the laser light L emitted from the green laser source 343, the shorter the distance between the spot SP1 obtained by light of the large wavelength and the spot SP3 of the small wavelength shown in FIGS. 7, 9 and 10. Consequently, if the wavelength width of the laser light L emitted from the green laser source 343 is narrower than 2 nm, the difference between the correction angle difference and the combiner angle difference is desirably set to a narrower range. Conversely, if the wavelength width of the laser light L emitted from the green laser source 343 is larger than 2 nm, the difference between the correction angle difference and the combiner angle difference is desirably set to a wider range. Thus, the image quality presented to the driver DR is improved.

The optimal difference between the correction angle difference and the combiner angle difference also depends on the optical magnification ratio of the hologram combiner 350, 350A and the correcting element 330.

Figure 11:
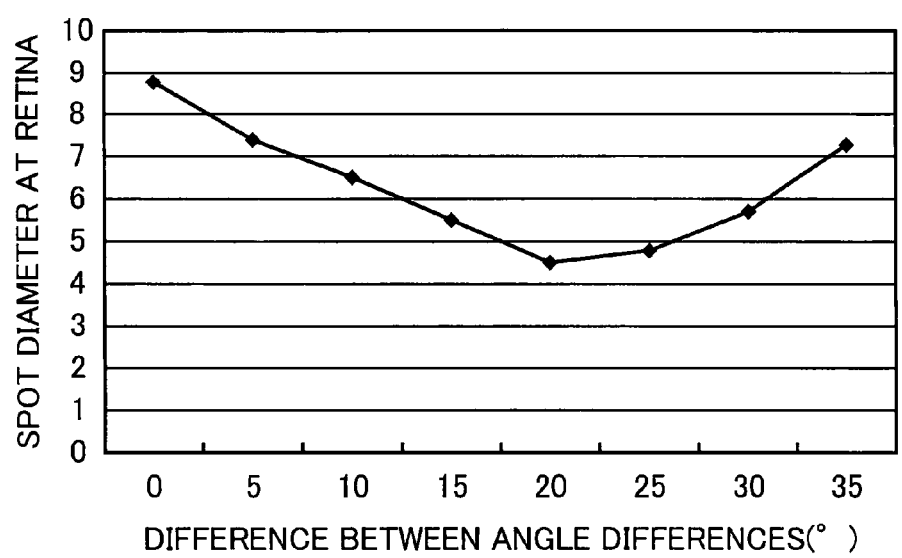
FIG. 11 is a graph showing a relationship between the correction angle difference and the spot diameter at the retina when an optical magnification ratio of the hologram combiner and the correcting element are changed.

FIG. 11 shows a relationship between the correction angle difference and the spot diameter at the retina when the optical magnification ratio of the hologram combiner 350, 350A and the correcting element 330 is changed. The relationship between the correction angle difference and the spot diameter at the retina is further described with reference to FIGS. 1, 8 and 11.

The horizontal axis of the graph shown in FIG. 11 indicates a difference between the correction angle difference and the combiner angle difference. The vertical axis indicates a light spot diameter at the retina from the green laser source 343 depicting a pixel at the center of the image.

The optical magnification ratio of the hologram combiner 350, 350A is set to 2.6×. The optical magnification ratio of the correcting element 330 is set to 1.5×. Other settings are the same as those described with reference to FIG. 8.

According to the graph shown in FIG. 11, if the difference between the correction angle difference and the combiner angle difference is set to a range of 15° to 30°, the spot diameter of the light from the green laser source 343 becomes relatively small at the retina.

As clearly shown by a comparison between the graphs in FIGS. 8 and 11, it is desirable that a larger difference is set between the correction angle difference and the combiner angle difference if a higher optical magnification ratio is set for the hologram combiner 350, 350A.

A relationship among the eye box EB of the driver DR and the angle settings of the correcting element 330 and the hologram combiner 350, 350A is described with reference to FIG. 1 again.

The eye box EB is shown in FIG. 1. The eye box EB is optically defined as a range in which the reflected display light L1 from the hologram combiner 350, 350A is visible. For example, the eye box EB may be defined as a range in which the driver DR may view the display light L1 at a distant position by approximately 1 m from the eyes of the driver DR.

In the present embodiment, in order to clarify the description, the upper edge 351 of the hologram combiner 350, 350A is exemplified as the upper edge of the incident area of the display light L1. It should be noted that the upper edge of the incident area of the display light L1 does not have to coincide with the upper edge 351 of the hologram combiner 350, 350A. The upper edge of the incident area of the display light L1 may be situated below the upper edge 351 of the hologram combiner 350, 350A.

FIG. 1 shows a straight line G which extends between the upper edge 351 of the hologram combiner 350, 350A and the lower edge of the eye box EB which is optically defined. FIG. 1 shows the horizontal line H, which intersects with the straight line G, and the angle γ between the straight line G and the horizontal line H.

The angle γ which is defined by the aforementioned optical settings (the position and angle of the correcting element 330 with respect to the display part 320, 320A, 320B, the setting of the incident angle $\alpha_1$ and the diffraction angle $\beta_1$ of the correcting element 330, the position and angle of the hologram combiner 350, 350A, and the incident angle $\alpha_2$ and the diffraction angle $\beta_2$ of the hologram combiner 350, 350A) is set to be smaller than the difference between the incident angle $\alpha_2$ and the diffraction angle $\beta_2$ of the hologram combiner 350, 350A (i.e., the combiner angle difference). For example, if the combiner angle difference is set to 10°, the angle γ is set to be smaller than 10°.

In the aforementioned embodiment, the incident angle $\alpha_1$ at the correcting element 330 is exemplified as the first incident angle. The diffraction angle $\beta_1$ of the correcting element 330 is exemplified as the first emission angle. The incident angle $\alpha_2$ at the hologram combiner 350, 350A is exemplified as the second incident angle. The diffraction angle $\beta_2$ of the hologram combiner 350, 350A is exemplified as the second emission angle.

In the aforementioned embodiment, the correction angle difference which is defined as the difference between the incident angle $\alpha_1$ on the correcting element 330 and the diffraction angle $\beta_1$ of the correcting element 330 is exemplified as the first angular difference. The combiner angle difference which is defined as the difference between the incident angle $\alpha_2$ on the hologram combiner 350, 350A and the diffraction angle $\beta_2$ of the hologram combiner 350, 350A is exemplified as the second angular difference.

According to the principles described in the context of the first embodiment, the reflected light from the front windscreen 302 and the wavelength width of the laser light L from the light sources (the red, blue and green laser source 341, 342, 343) suitably become less influential. Consequently, the HUD 300 according to the first embodiment may present a high quality image to the driver DR with little influential image blurring.

Second Embodiment

Figure 12:
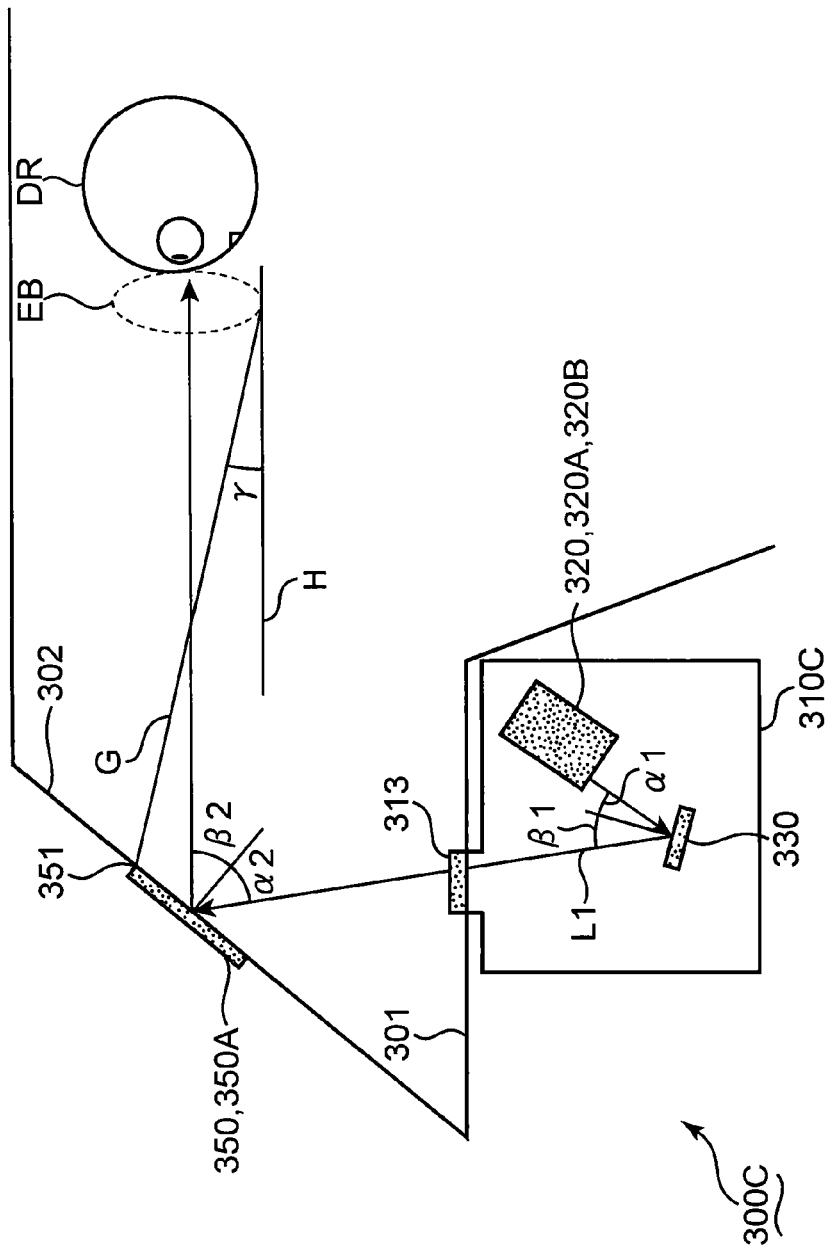
FIG. 12 is a schematic view of a transmissive display device according to the second embodiment.

FIG. 12 shows a schematic view of an HUD which is exemplified as the transmissive display device according to the second embodiment. The same components as the first embodiment are labeled with the same reference numerals. Differences from the first embodiment are described with reference to FIGS. 1 and 12. Descriptions about the same components as the first embodiment are omitted here. The descriptions about the first embodiment may be suitably incorporated into components which are not described below.

The incident angle at the hologram combiner of the HUD according to the second embodiment is set to be smaller than the diffraction angle of the hologram combiner, unlike the first embodiment. Consequently, the surface reflection problem is resolved to improve quality of an image which is presented to the driver.

The HUD 300C comprises the hologram combiner 350 or 350A, which is situated on the front windscreen 302 of the vehicle 301, and the HUD optical unit 310C, which is situated inside the dashboard of the vehicle 301. Like the first embodiment, the HUD optical unit 310C comprises the correcting element 330 and the display part 320, 320A or 320B, but the positional relationship between the correcting element 330 and the display part 320, 320A, 320B differs from the HUD optical unit 310 which is provided in the HUD 300 of the first embodiment.

The correcting element 330 is inclined down towards the driver DR with respect to the horizontal line H whereas the hologram combiner 350, 350A is inclined up towards the driver DR with respect to the horizontal line H. The difference between the inclination direction of the correcting element 330 and the inclination direction of the hologram combiner 350, 350A reduces aberration to improve quality of the image presented to the driver DR.

As clearly shown by a comparison between FIGS. 1 and 12, if the incident angle $\alpha_2$ at the hologram combiner 350, 350A is greater than the diffraction angle $\beta_2$ of the hologram combiner 350, 350A, the correcting element 330 is inclined in the same direction as the hologram combiner 350, 350A as described in the context of the first embodiment. On the other hand, if the incident angle $\alpha_2$ at the hologram combiner 350, 350A is smaller than the diffraction angle $\beta_2$ of the hologram combiner 350, 350A, like the HUD 300C according to the second embodiment, the correcting element 330 is inclined in a different direction from the hologram combiner 350, 350A.

In the present embodiment, the HUD 300C is designed so that the incident angle $\alpha_2$ at the hologram combiner 350, 350A is smaller than the diffraction angle $\beta_2$ of the hologram combiner 350, 350A by at least 15°. In the present embodiment, in order to clarify the description, the upper edge 351 of the hologram combiner 350, 350A is exemplified as the upper edge of the incident area of the display light L1. The angle γ between the horizontal line H and the straight line G which extends between the upper edge 351 of the hologram combiner 350, 350A and the lower edge of the eye box EB, which is optically defined, is set to be smaller than the difference between the incident angle $\alpha_2$ on the hologram combiner 350, 350A and the diffraction angle $\beta_2$ of the hologram combiner 350, 350A (the combiner angle difference).

Figure 13:
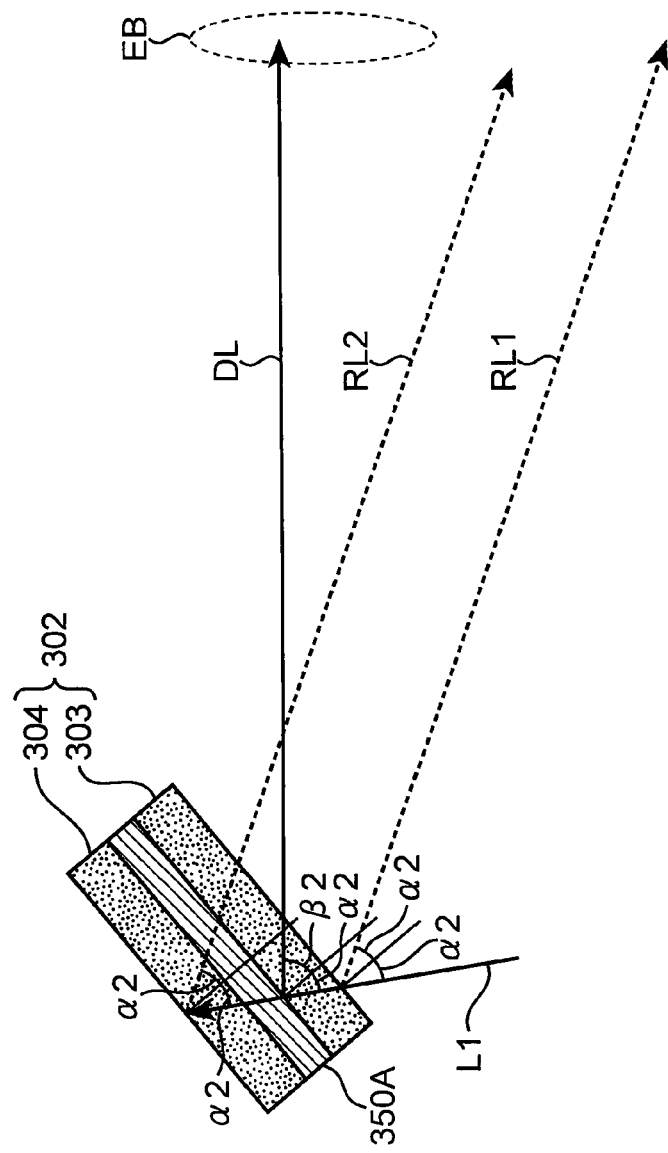
FIG. 13 is a schematic view of a hologram combiner of the transmissive display device shown in FIG. 12.

FIG. 13 shows a hologram combiner 350A (HOD: Holographic Optical Component) which intervenes between the inner and outer glass plates 303, 304 of the front windscreen 302. The advantageous effects arisen from the difference between the incident angle $\alpha_2$ on the hologram combiner 350, 350A and the diffraction angle $\beta_2$ of the hologram combiner 350, 350A is described with reference to FIGS. 12 and 13.

The display light L1 is incident on the hologram combiner 350A at the incident angle $\alpha_2$. The hologram combiner 350A diffracts the display light L1 at the diffraction angle $\beta_2$ to create the diffracted light DL which is directed towards the eye box EB.

The display light L1 is incident on the inner glass plate 303 at the incident angle $\alpha_2$. The inner glass plate 303 reflects the display light L1 to create the reflected light RL1 which is emitted at the emission angle $\alpha_2$ that is equal to the incident angle $\alpha_2$. Likewise, the display light L1 is incident on the outer glass plate 304 at the incident angle $\alpha_2$. The outer glass plate 304 reflects the display light L1 to create the reflected light RL2 which is emitted at the emission angle $\alpha_2$ that is equal to the incident angle $\alpha_2$. The reflected lights RL1, RL2 are propagated outside the eye box EB. Since the propagation direction of the reflected lights RL1, RL2 is different from the diffracted light DL, the driver DR views only the diffracted light DL.

Like the first embodiment, the correcting element 330 is formed from a hologram. The smaller incident angle $\alpha_1$ at the correcting element 330 is set than the diffraction angle $\beta_1$ of the correcting element 330. Consequently, the image blurring caused by the hologram combiner 350, 350A becomes less influential. The blurring effects caused by the correcting element 330 cancel out the blurring effects caused by the hologram combiner 350, 350A, like the first embodiment. Therefore, the spot diameter of the pixel becomes smaller at the retina.

In the present embodiment, the difference between the incident angle $\alpha_2$ and the diffraction angle $\beta_2$ of the hologram combiner 350, 350A is called the "combiner angle difference". The difference between the incident angle $\alpha_1$ and the diffraction angle $\beta_1$ of the correcting element 330 is called the "correction angle difference". If a larger correction angle difference is set than the combiner angle difference, the image blurring effects caused by the hologram combiner 350, 350A are suitably corrected.

Figure 14:
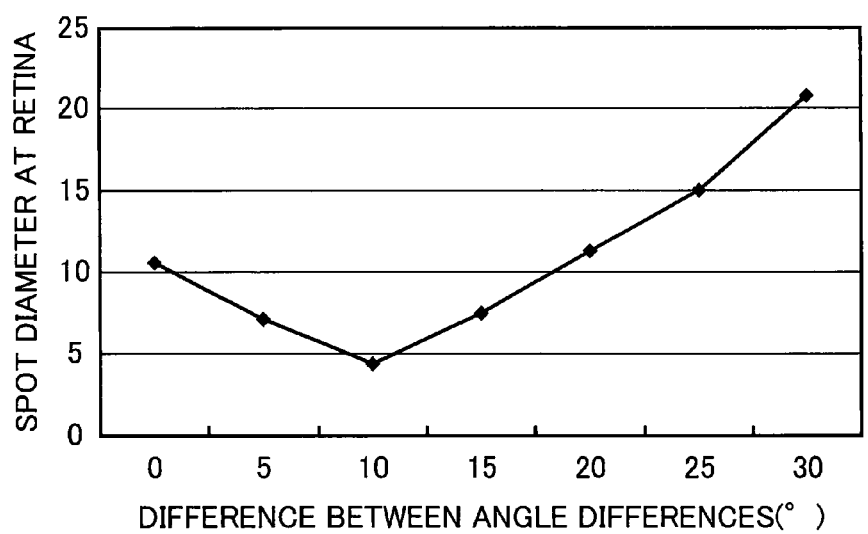
FIG. 14 is a schematic graph showing effects of a difference between a correction angle difference and a combiner angle difference on a spot diameter at the retina.

FIG. 14 is a schematic graph showing effects of the difference between the correction angle difference, which is defined as the difference between the incident angle $\alpha_1$ and the diffraction angle $\beta_1$ of the correcting element 330, and the combiner angle difference on the spot diameter at the retina. The effects of the correction angle difference on the spot diameter at the retina are described with reference to FIGS. 12 and 14.

The wavelength width of the light source for creating the display light L1 is set to 2 nm. The incident angle $\alpha_2$ at the hologram combiner 350, 350A is set to 40°. The diffraction angle $\beta_2$ of the hologram combiner 350, 350A is set to 55° (i.e., the combiner angle difference is set to) 15°. Like the first embodiment, both the correcting element 330 and the hologram combiner 350, 350A function as a 2.0× magnifying mirror.

The vertical axis of the graph shown in FIG. 14 indicates the light spot diameter at the retina from the green laser source depicting a pixel at the center of the image. The horizontal axis of the graph shown in FIG. 14 indicates the difference between the correction angle difference and the combiner angle difference.

As shown in FIG. 14, if the correction angle difference is set to be larger than the combiner angle difference, the spot diameter of the pixel is reduced at the retina. According to the graph shown in FIG. 14, the spot diameter of the pixel at the retina becomes minimal if the correction angle difference is larger than the combiner angle difference by 10°.

On the other hand, if the correction angle difference is excessively large in comparison with the combiner angle difference as shown in FIG. 14, the image blurring effects become greater. Therefore, the incident angle $\alpha_1$ and the emission angle $\beta$, of the correcting element 330 have to be suitably set in response to the wavelength width of the light source and the optical settings of the hologram combiner 350, 350A. According to the graph in FIG. 14, if the wavelength width of the light source is 2 nm, and if the optical magnification ratio of the hologram combiner 350, 350A and the correcting element 330 is 2.0×, then the correction angle difference and the combiner angle difference are desirably set in a range of approximately 5° to 15°.

According to the principles of the second embodiment, the HUD may present a high quality image to the driver DR with little influential reflected light from the front windscreen 302 or little influential image blurring caused by a large wavelength width of the light source.

Third Embodiment

Figure 15:
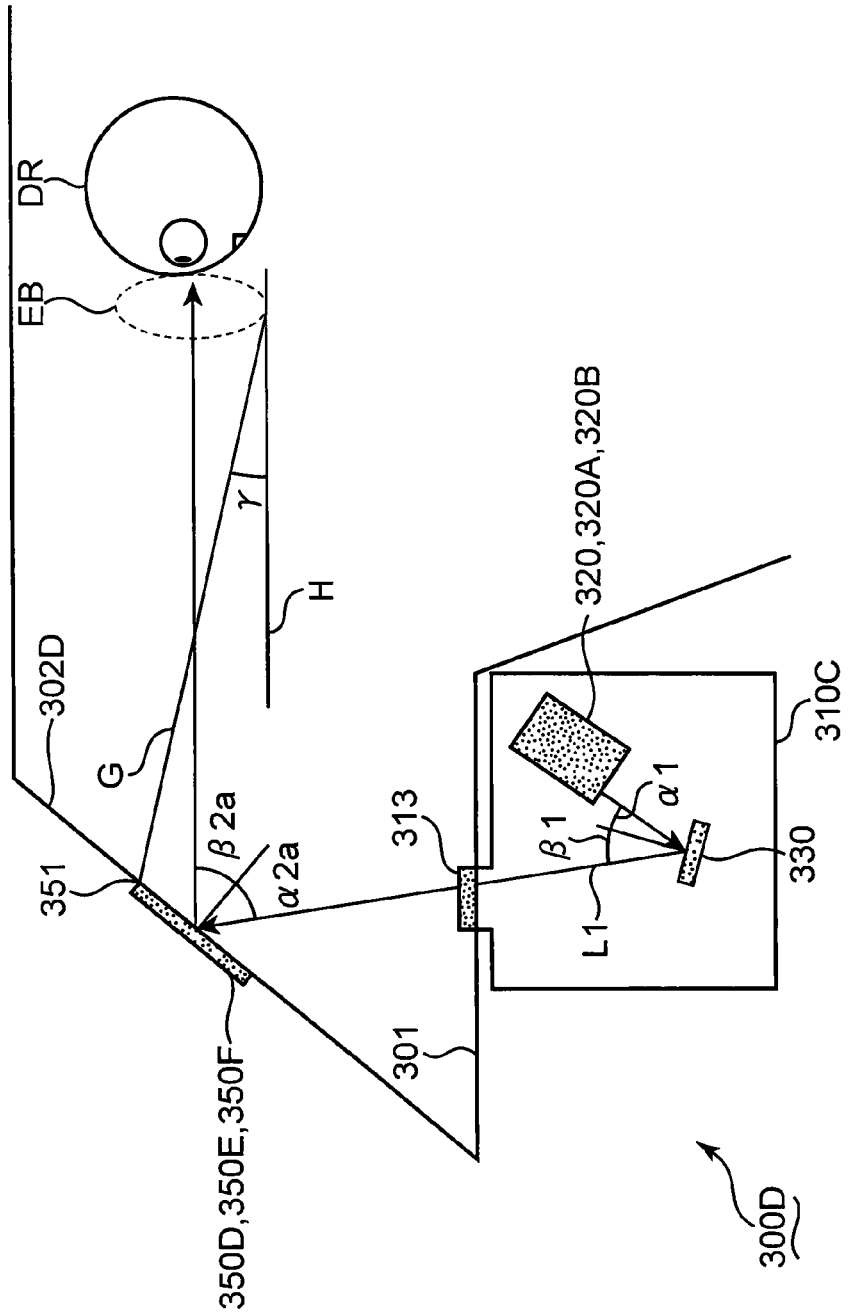
FIG. 15 is a schematic view of a transmissive display device according to the third embodiment.

FIG. 15 shows a schematic view of an HUD which is exemplified as a transmissive display device according to the third embodiment. The same components as the second embodiment are labeled with the same reference numerals. Differences from the second embodiment are described with reference to FIG. 15. Descriptions about the components as the first and/or second embodiments are omitted here. The descriptions in the context of the first and/or second embodiments may be suitably incorporated to components which are not described below.

The incident angle on the hologram combiner of the HUD according to the third embodiment is set to be smaller than the diffraction angle of the hologram combiner, like the second embodiment. Consequently, the surface reflection problem is resolved to improve quality of the image which is presented to the driver.

The HUD 300D comprises a hologram combiner 350D which is situated on the front windscreen 302D of the vehicle 301, in addition to the HUD optical unit 310C which is provided in the HUD 300C of the second embodiment.

Figure 16:
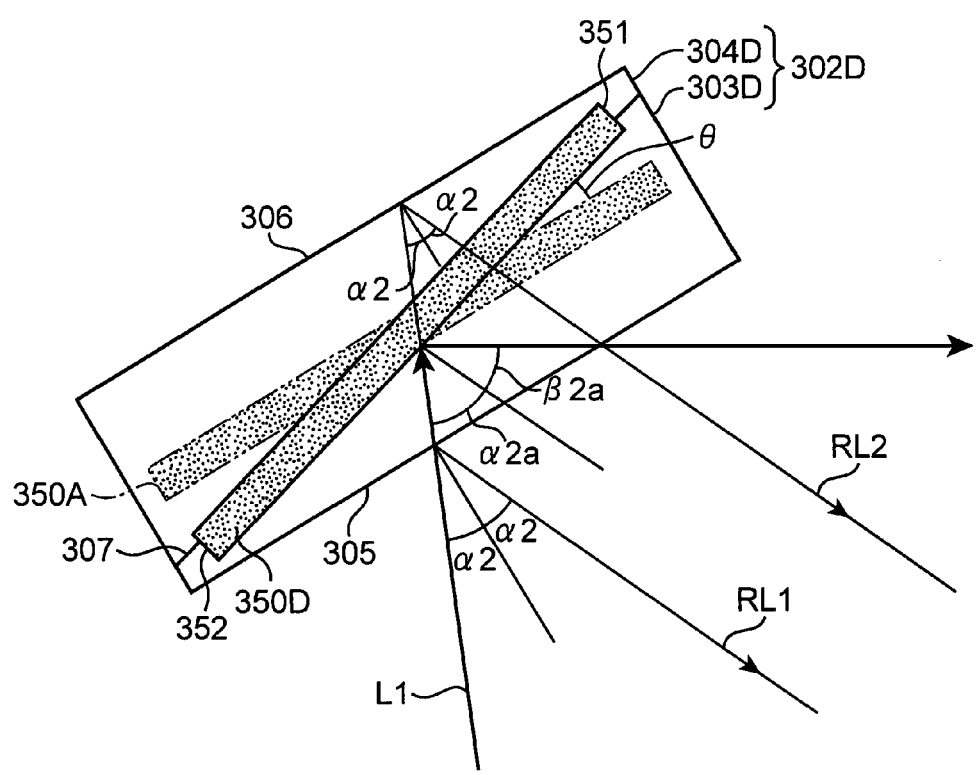
FIG. 16 is a schematic view of a hologram combiner of the transmissive display device shown in FIG. 15.

FIG. 16 shows the hologram combiner 350D which is attached to the front windscreen 302D. The hologram combiner 350D is described here with reference to FIGS. 13, 15 and 16.

The front windscreen 302D comprises an inner glass plate 303D, which has an inner surface 305 that defines a boundary of the interior of the vehicle 301, and an outer glass plate 304D, which has an outer surface 306 that appears on the outer surface of the vehicle 301. In the present embodiment, the inner and outer surfaces 305, 306 are exemplified as the air contact surfaces which contact the air inside or outside the vehicle 301. A boundary surface 307 is formed between the inner and outer glass plates 303D, 304D. The boundary surface 307 is inclined (i.e., not parallel to) with respect to the inner surface 305 of the inner glass plate 303D and the outer surface 306 of the outer glass plate 304D.

The hologram combiner 350D situated along the boundary surface 307 intervenes between the inner and outer glass plates 303D, 304D. The hologram combiner 350D is formed from an HOE, like the hologram combiner 350A described in the context of the second embodiment.

In FIG. 16, the hologram combiner 350A described in the context of the second embodiment is depicted by dotted lines. The hologram combiner 350A described in the context of the second embodiment is parallel to the inner surface 305 of the inner glass plate 303D and the outer surface 306 of the outer glass plate 304D whereas the hologram combiner 350D provided in the HUD 300D according to the present embodiment is inclined with respect to the inner surface 305 of the inner glass plate 303D and the outer surface 306 of the outer glass plate 304D.

FIG. 16 shows the inclination angle θ of the hologram combiner 350D with respect to the hologram combiner 350A described in the context of the second embodiment (i.e., the inclination angle of the hologram combiner 350D with respect to the inner surface 305 of the inner glass plate 303D and/or the outer surface 306 of the outer glass plate 304D). In the present embodiment, the hologram combiner 350D has the same optical characteristics as the hologram combiner 350A described in the context of the second embodiment.

FIG. 16 shows the incident angle $\alpha_{2a}$ of the display light L1 on the hologram combiner 350D and the incident angle $\alpha_2$ of the display light L1 on the inner glass plate 303D and/or the outer glass plate 304D. The incident angle $\alpha_{2a}$ of the display light L1 on the hologram combiner 350D is substantially equal to the sum of the inclination angle θ of the hologram combiner 350D and the incident angle $\alpha_2$ on the inner glass plate 303D and/or the outer glass plate 304D. On the other hand, the diffraction angle $\beta_{2a}$ of the hologram combiner 350D is smaller than the diffraction angle $\beta_2$ of the hologram combiner 350A described in the context of the second embodiment (c.f., FIG. 13) by the inclination angle θ. The inner surface 305 of the inner glass plate 303D reflects the display light L1, which is incident at the incident angle $\alpha_2$, to create the reflected light RL1, which is emitted at an emission angle $\alpha_2$ that is equal to the incident angle $\alpha_2$. The outer surface 306 of the outer glass plate 304D reflects the display light L1, which is incident at the incident angle $\alpha_2$, to create the reflected light RL2, which is emitted at an emission angle $\alpha_2$ that is equal to the incident angle $\alpha_2$.

As described in the context of the second embodiment, the hologram combiner 350A diffracts the display light L1, which is incident at the incident angle $\alpha_2$ to create the diffracted light DL at the diffraction angle $\beta_2$ which is larger than the incident angle $\alpha_2$. If the hologram combiner 350D, which has the same optical characteristics as the hologram combiner 350A, is inclined at the inclination angle θ (i.e., if the hologram combiner 350D is inclined so that the upper edge 351 of the hologram combiner 350D approaches the outer surface 306 of the outer glass plate 304D while the lower edge 352 of the hologram combiner 350D approaches the inner surface 305 of the inner glass plate 303D), the difference between the incident angle $\alpha_{2a}$ on the hologram combiner 350D and the diffraction angle $\beta_{2a}$ of the hologram combiner 350D is reduced. Consequently, it is desirable to set the inclination angle θ of the hologram combiner 350D so that the difference between the incident angle $\alpha_{2a}$ on the hologram combiner 350D and the diffraction angle $\beta_{2a}$ of the hologram combiner 350D becomes smaller if the wavelength width of the light source, which is a cause of aberration, becomes larger.

The aberration caused by the hologram combiner 350A on the incident light (display light L1) become less influential if there are a smaller difference between the incident angle $\alpha_{2a}$ and the diffraction angle $\beta_{2a}$. Consequently, if the hologram combiner 350D is inclined within the front windscreen 302D, the aberration becomes less influential while the surface reflection problem is resolved. Therefore, the HUD 300D may improve the quality of the image which is presented to the driver DR.

If the hologram combiner 350D in use is large, a gradient of the inclination angle θ of the hologram combiner 350D results in an increase in thickness of the front windscreen 302D. Therefore, portions, which are expected to be susceptible to the aberration, may be inclined (e.g., portions of the hologram combiner 350D corresponding to the edges of the screen) with respect to the inner surface 305 of the inner glass plate 303D and/or the outer surface 306 of the outer glass plate 304D.

Figure 17:
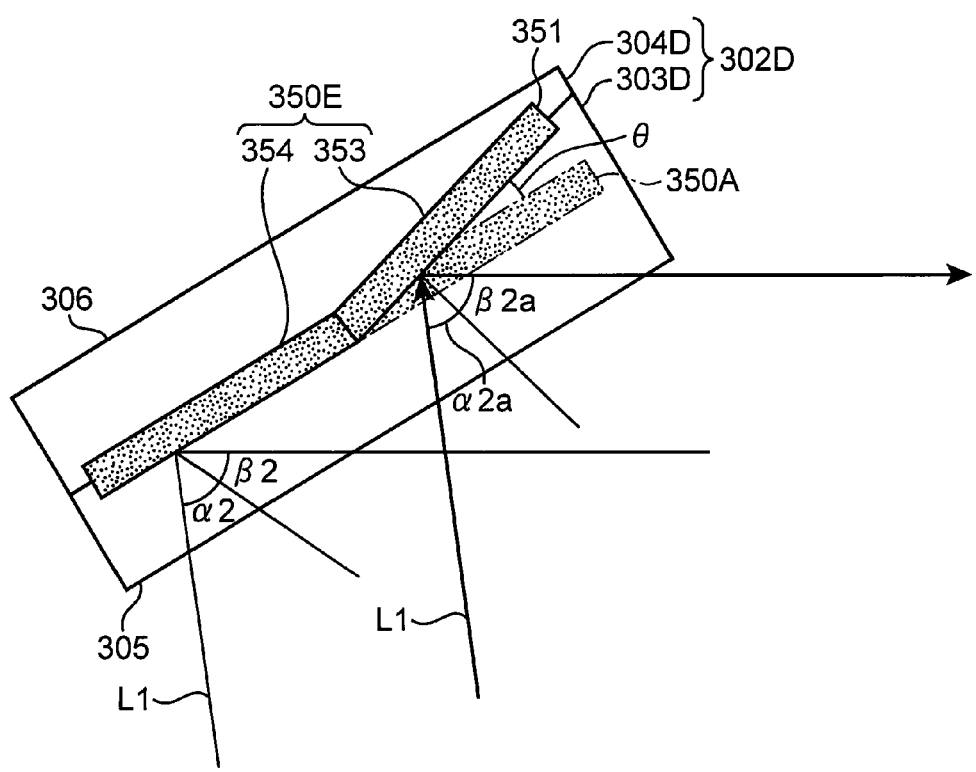
FIG. 17 is a schematic view of another hologram combiner of the transmissive display device shown in FIG. 15.

FIG. 17 shows a hologram combiner which improves the upper half of image quality in a display screen. The improved hologram combiner is described with reference to FIGS. 15 to 17.

The HUD 300D may comprise a hologram combiner 350E, instead of the hologram combiner 350D. The hologram combiner 350E includes a first portion 353, which is inclined with respect to the inner surface 305 of the inner glass plate 303D and/or the outer surface 306 of the outer glass plate 304D, and a second portion 354, which is parallel to the inner surface 305 of the inner glass plate 303D and/or the outer surface 306 of the outer glass plate 304D.

In FIG. 17, like FIG. 16, the hologram combiner 350A described in the context of the second embodiment is depicted by dotted lines. Like FIG. 16, FIG. 17 shows the inclination angle θ of the hologram combiner 350D with respect to the hologram combiner 350A described in the context of the second embodiment (i.e., the inclination angle of the hologram combiner 350D with respect to the inner surface 305 of the inner glass plate 303D and/or the outer surface 306 of the outer glass plate 304D).

The first portion 353 is inclined from the inner surface 305 of the inner glass plate 303D and/or the outer surface 306 of the outer glass plate 304D, so that the upper edge 351 approaches the outer surface 306 of the outer glass plate 304D, like the hologram combiner 350D described with reference to FIG. 16. On the other hand, the second portion 354 is situated substantially in parallel with the inner surface 305 of the inner glass plate 303D and/or the outer surface 306 of the outer glass plate 304D, like the hologram combiner 350A described in the context of the second embodiment. In the present embodiment, the first portion 353 is exemplified as the inclined area.

The difference between the incident angle $\alpha_{2a}$ and the diffraction angle $\beta_{2a}$ of the incident display light L1 on the first portion 353 is smaller than the difference between the incident angle $\alpha_2$ and the diffraction angle $\beta_2$ of the incident display light L1 on the second portion 354. Consequently, the aberration of the image area corresponding to the first portion 353 becomes relatively small, which results in improved image quality. Since the surface area of the inclined portion from the front windscreen 302D becomes smaller, an excessive increase in thickness of the front windscreen 302D is prevented.

Each of the aforementioned hologram combiners 350D, 350E is planar. Alternatively, the hologram combiner may be formed in a free curved shape. If a hologram combiner having a free curved shape is used, an excessive increase in thickness of the front windscreen is prevented as well.

Figure 18:
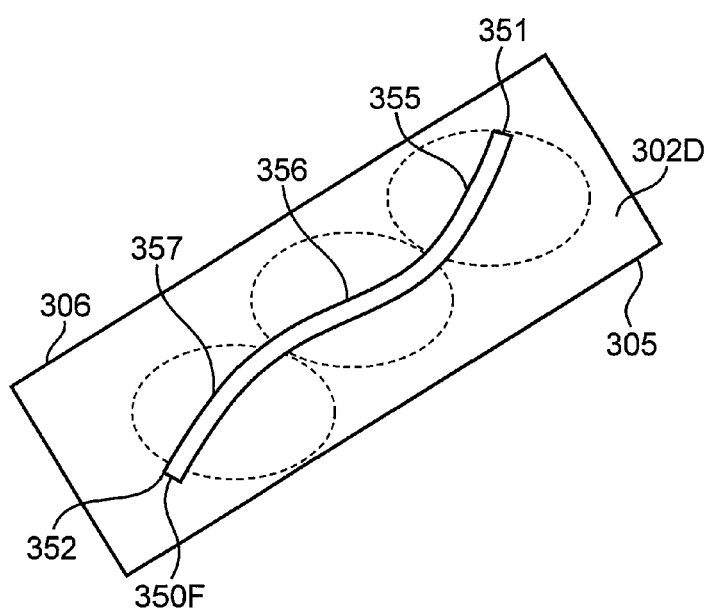
FIG. 18 is a schematic view of yet another hologram combiner of the transmissive display device shown in FIG. 15.

FIG. 18 shows a hologram combiner which improves image quality in an upper portion and a lower portion of a display screen. The hologram combiner which improves image quality in the upper and lower portions is described with reference to FIGS. 15 and 18.

The HUD 300D according to the present embodiment may comprise a hologram combiner 350F, instead of the hologram combiner 350D, 350E. The hologram combiner 350F is formed from an HOE, like the hologram combiner 350D, 350E.

The hologram combiner 350F includes an upper portion 355, which corresponds to an upper portion of an image, a lower portion 357, which corresponds to a lower portion of the image, and an intermediate portion 356 between the upper and lower portions 355, 357. The upper and lower portions 355, 357 are inclined with respect to the inner and/or outer surfaces 305, 306 of the front windscreen 302D whereas the intermediate portion 356 is parallel to the inner and/or outer surfaces 305, 306 of the front windscreen 302D. The boundary portion between the upper and intermediate portions 355, 356 and the boundary portion between the lower and intermediate portions 357, 356 are formed as curved surfaces, so that the hologram combiner 350F is formed with a free curved shape having one or more curvature as a whole. In the present embodiment, the upper and lower portions 355, 357 are exemplified as the inclined area.

The upper portion 355 is inclined so that the upper edge 351 of the hologram combiner 350F approaches the outer surface 306 of the front windscreen 302D. The lower portion 357 is inclined so that the lower edge 352 of the hologram combiner 350F approaches the inner surface 305 of the front windscreen 302D. The display light L1 for depicting the upper edge of the image is incident on the upper portion 355. The display light L1 for depicting the lower edge of the image is incident on the lower portion 357. The curvature of the upper and lower portions 355, 357 is set so as to create a small difference between the incident angle of the display light L1 which is incident on the hologram combiner 350F and the diffraction angle of the hologram combiner 350F.

The upper and lower portions 355, 357 reduce aberration in the upper and lower portions of the displayed image, respectively, in accordance with the principles of the hologram combiner 350D described with reference to FIG. 16. On the other hand, the intermediate portion 356 which corresponds to the central area of the image that is not susceptible to the aberration, in comparison with the upper and lower portions of the image, is parallel to the inner and/or outer surfaces 305, 306 of the front windscreen 302D. Therefore, the front windscreen 302D does not excessively thick. Consequently, the hologram combiner 350F may improve the image quality in the upper and lower portions of the image by means of narrow inclined areas (i.e., the upper and lower portions 355, 357) with respect to the front windscreen 302D.

In the present embodiment, the upper portion 355 is substantially parallel to the lower portion 357. Alternatively, the upper portion may be inclined with respect to the front windscreen at a different angle from the inclination angle of the lower portion. The inclination angle of the upper and/or lower portions may be independently set in accordance with characteristics of the image represented by the display light from the HUD optical unit. Since the inclination angle of the upper and/or lower portions is independently set, the image quality in the upper and lower portions may be suitably adjusted.

In the present embodiment, the hologram combiner 350F is divided into the upper portion 355, the intermediate portion 356 and the lower portion 357. Alternatively, the hologram combiner may be divided into more than three areas. The divided areas may have different inclination angles, respectively. Consequently, the image quality of each area may be appropriately improved.

Fourth Embodiment

Figure 19:
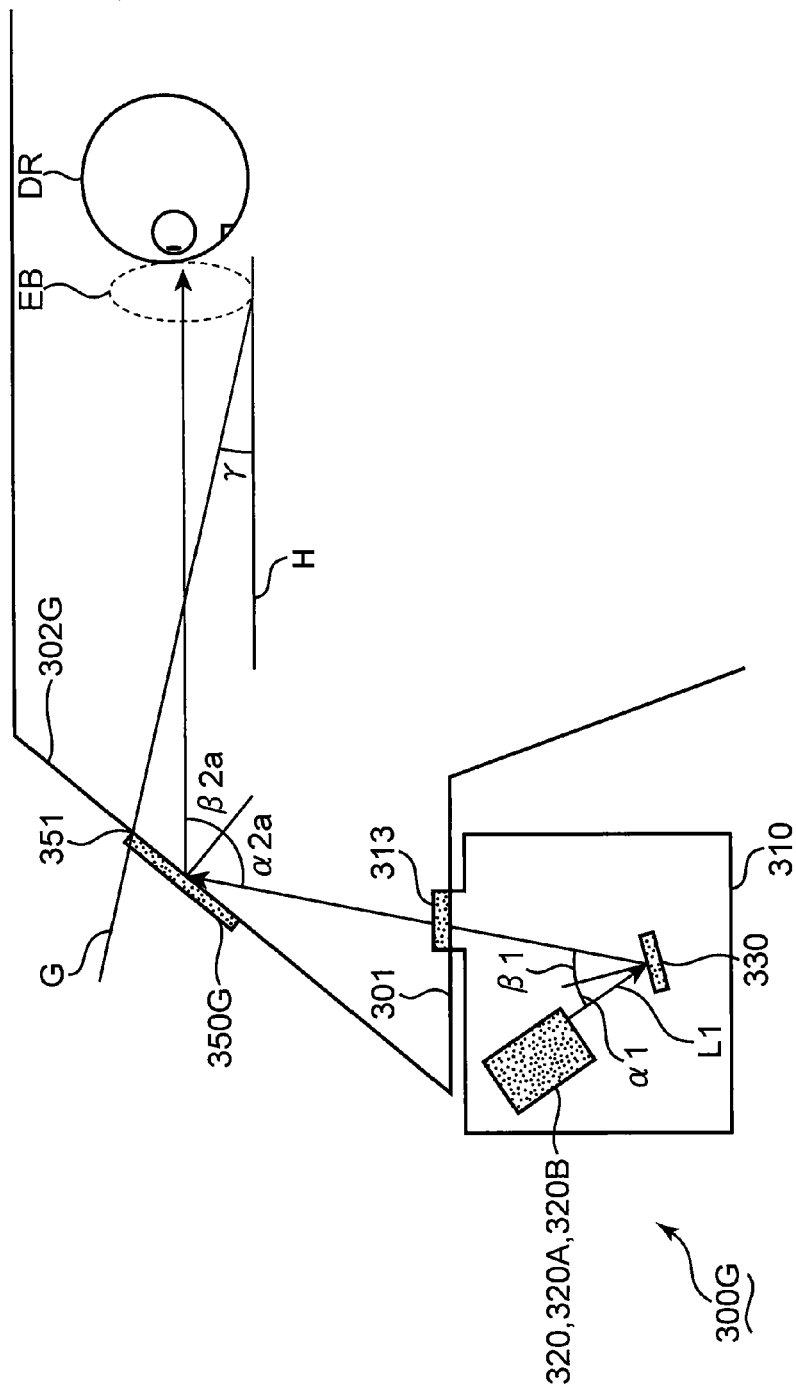
FIG. 19 is a schematic view of a transmissive display device according to the fourth embodiment.

FIG. 19 shows a schematic view of an HUD which is exemplified as a transmissive display device according to the fourth embodiment. The same components as the first embodiment are labeled with the same reference numerals. Differences from the first embodiment are described with reference to FIG. 19. Description about the same components as the first and/or third embodiments is omitted here. The descriptions about the first and/or third embodiments may be suitably incorporated to components which are not described below.

The incident angle at the hologram combiner of the HUD according to the fourth embodiment is set to be larger than the diffraction angle of the hologram combiner, like the first embodiment. Consequently, the surface reflection problem is resolved while quality of the image presented to the driver is improved.

The HUD 300G comprises a hologram combiner 350G which is situated on the front windscreen 302G of the vehicle 301, in addition to the HUD optical unit 310 which is provided in the HUD 300 of the first embodiment.

Figure 20:
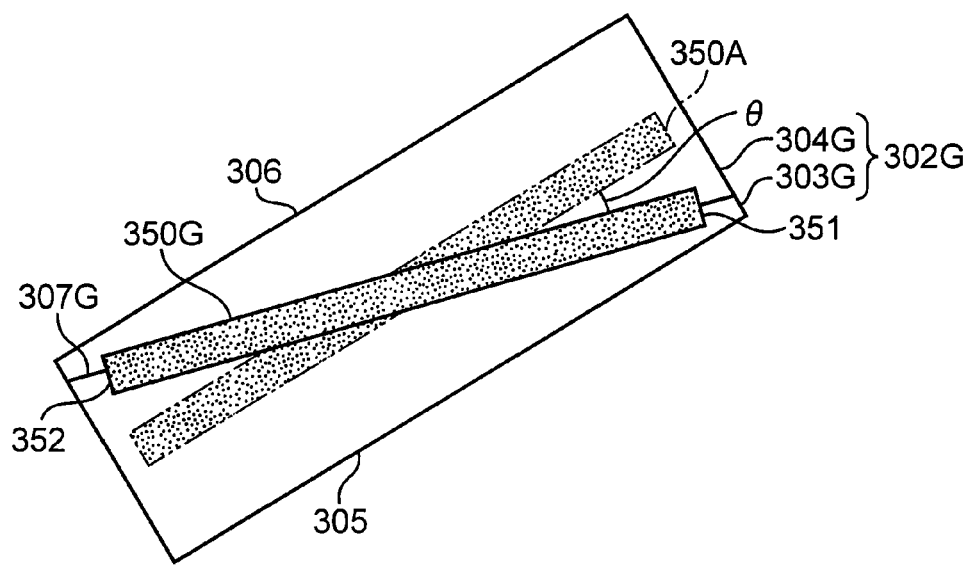
FIG. 20 is a schematic view of yet another hologram combiner of the transmissive display device shown in FIG. 19.

FIG. 20 shows the hologram combiner 350G which is attached to the front windscreen 302G. The hologram combiner 350G is described with reference to FIGS. 16, 19 and 20.

The front windscreen 302G comprises an inner glass plate 303G, which has the inner surface 305 that defines the boundary of the interior of the vehicle 301, and an outer glass plate 304G, which has the outer surface 306 that appears on the outer surface of the vehicle 301. A boundary surface 307G is formed between the inner and outer glass plates 303G, 304G. The boundary surface 307G is inclined (i.e., not parallel to) with respect to the inner surface 305 of the inner glass plate 303G and the outer surface 306 of the outer glass plate 304G.

The hologram combiner 350G situated along the boundary surface 307G intervenes between the inner and outer glass plates 303G, 304G. The hologram combiner 350G is formed from an HOE, like the hologram combiner 350A described in the context of the first embodiment.

In FIG. 20, the hologram combiner 350A described in the context of the first embodiment is depicted by dotted lines. The hologram combiner 350A described in the context of the first embodiment is parallel to the inner surface 305 of the inner glass plate 303G and the outer surface 306 of the outer glass plate 304G whereas the hologram combiner 350G provided in the HUD 3000 according to the present embodiment is inclined from the inner surface 305 of the inner glass plate 303G and the outer surface 306 of the outer glass plate 304G.

FIG. 20 shows the inclination angle θ of the hologram combiner 350G with respect to the hologram combiner 350A described in the context of the first embodiment (i.e., the inclination angle of the hologram combiner 350G with respect to the inner surface 305 of the inner glass plate 303G and/or the outer surface 306 of the outer glass plate 304G). In the present embodiment, the hologram combiner 350G has the same optical characteristics as the hologram combiner 350A described in the context of the first embodiment.

As clearly shown by a comparison with the hologram combiner 350D in FIG. 16, the inclination direction of the hologram combiner 350G with respect to the hologram combiner 350A is opposite to the hologram combiner 350D. In other words, the hologram combiner 350G is set so that the upper edge 351 of the hologram combiner 350G approaches the inner surface 305 of the front windscreen 302G while the lower edge 352 of the hologram combiner 350G approaches the outer surface 306 of the front windscreen 302G.

The hologram combiner 350G may reduce the difference between the incident angle $\alpha_{2a}$ at the hologram combiner 350G and the diffraction angle $\alpha_{1b}$ of the hologram combiner to improve aberration, in accordance with the principles described with reference to FIG. 16, if the incident angle $\alpha_{2a}$ at the hologram combiner 350G is set to be smaller than the diffraction angle $\alpha_{1b}$ of the hologram combiner.

Therefore, the HUD 300G may make the reflected light from the front windscreen 302G and the image blurring caused by a large wavelength width of the light source less influential. Therefore, HUD 300G may present a high quality image to the driver DR.

Fifth Embodiment

Figure 21:
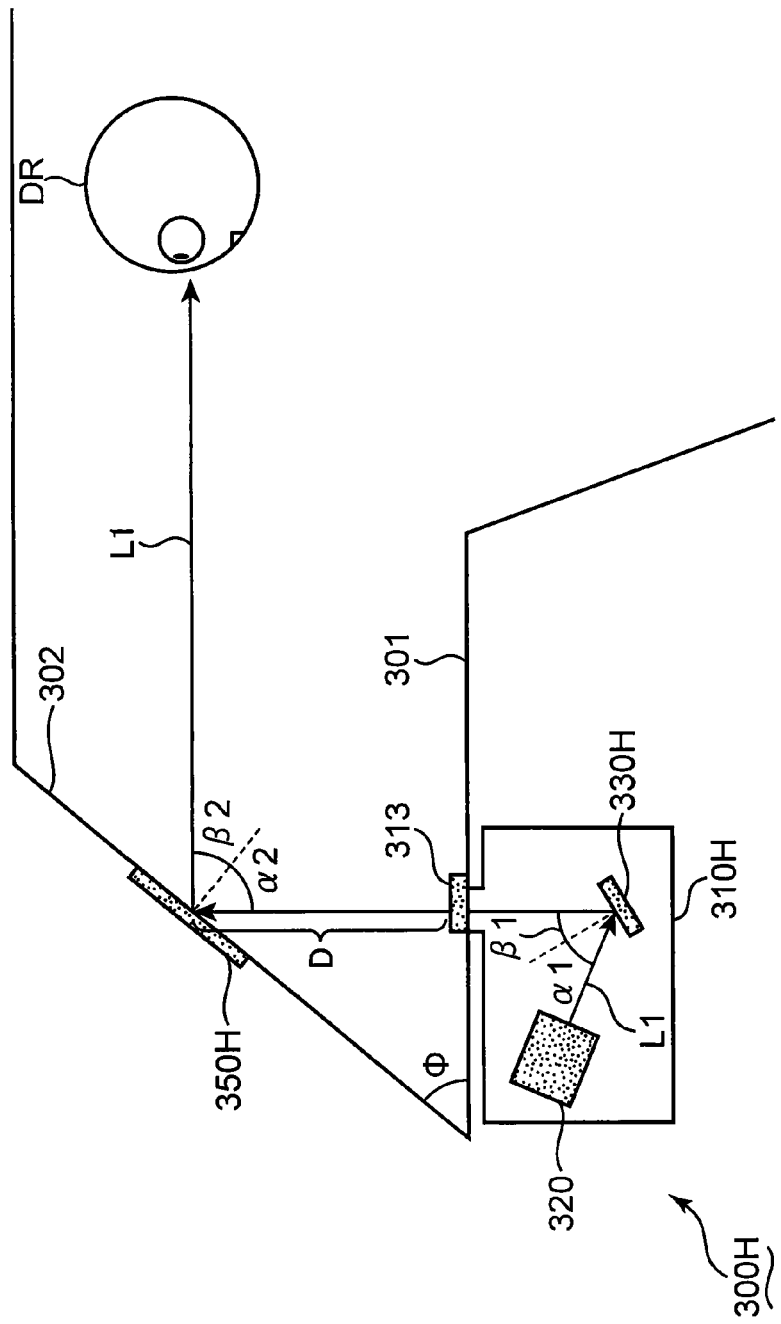
FIG. 21 is a schematic view of a transmissive display device according to the fifth embodiment.

FIG. 21 shows a schematic view of an HUD which is exemplified as a transmissive display device according to the fifth embodiment. The same components as the first embodiment are labeled with the same reference numerals. Differences from the first embodiment are described with reference to FIGS. 2, 4, 5 and 21. Description about the same components as the first embodiment is omitted here. The description about the first embodiment may be suitably incorporated to components which are not described below.

The HUD 300H shown in FIG. 21 comprises an HUD optical unit 310H which is situated inside the dashboard of the vehicle 301. The HUD optical unit 310H comprises the display part 320 and a correcting element 330H. The opening 313 is formed in the HUD optical unit 310H.

In the present embodiment, the display part 320 described with reference to FIG. 2 is used. Alternatively, another display device (e.g., the display part 320A described with reference to FIG. 4 or the display part 320B described with reference to FIG. 5) may be used instead of the display part 320.

The display part 320 generates and emits the display light L1 to display an image, which contains driving information (a speedometer and/or map information), to the driver DR. In the present embodiment, the display part 320 two-dimensionally scans the display screen 324 with the beam emitted from the laser source to create and display the image for the driver DR.

The HUD 300H also comprises a combiner 350H. The display part 320 emits the display light L1 towards the correcting element 330H. The correcting element 330H changes the direction of the display light L1 and causes the light to be incident on the combiner 350H. In the present embodiment, the correcting element 330H is exemplified as the deflecting element.

In the present embodiment, the combiner 350H is exemplified as the transmissive reflector which reflects the incident display light L1 on the correcting element 330H towards the eyes of the driver DR. The combiner 350H reflects light of wavelengths, which are included in the display light emitted from the display part 320, towards the driver DR (user), and transmits light of other wavelengths. Consequently, the driver DR may visually perceive an ambient outlook outside the vehicle 301 as well as the image displayed by the display light L1.

For example, a photopolymer layer is formed on the inner surface of the front windscreen 302 mounted on the vehicle 301 (the surface forming the boundary with the interior of the vehicle 301). The combiner 350H may be a Lippman volume hologram which is formed in the photopolymer layer. The combiner 350H, which is formed from a hologram, is manufactured so that the display light L1 entering at the incident angle $\alpha_2$ from the correcting element 330H is reflected towards the driver DR at the diffraction angle of $\beta_2$.

In the present embodiment, the combiner 350H which is formed in the photopolymer layer includes three holograms which reflect light components from the red, blue and green laser sources 341, 342, 343, respectively. These holograms are formed by a multiplex exposure method.

In the present embodiment, the combiner 350H is a one-layer hologram which is formed by the multiplex exposure of the light components of the three colors R, G, B. Alternatively, the combiner is a hologram having three layers which correspond to the light components of the three colors of R, G, B, respectively. The refractive index modulation value of the hologram materials used in the hologram combiner which comprises three laminated layers are appropriately set for each of the light components of three colors (RGB). Therefore, the diffraction efficiency for each of the light components of three colors (RGB) is improved, in comparison with a case where the refractive index modulation values of the hologram material are distributed to the RGB light components (when a one-layer hologram is used).

The combiner 350H functions as a magnifying mirror to magnify an image represented by the display light L1 from the display part 320 and present the magnified image to the driver DR.

Figure 22:
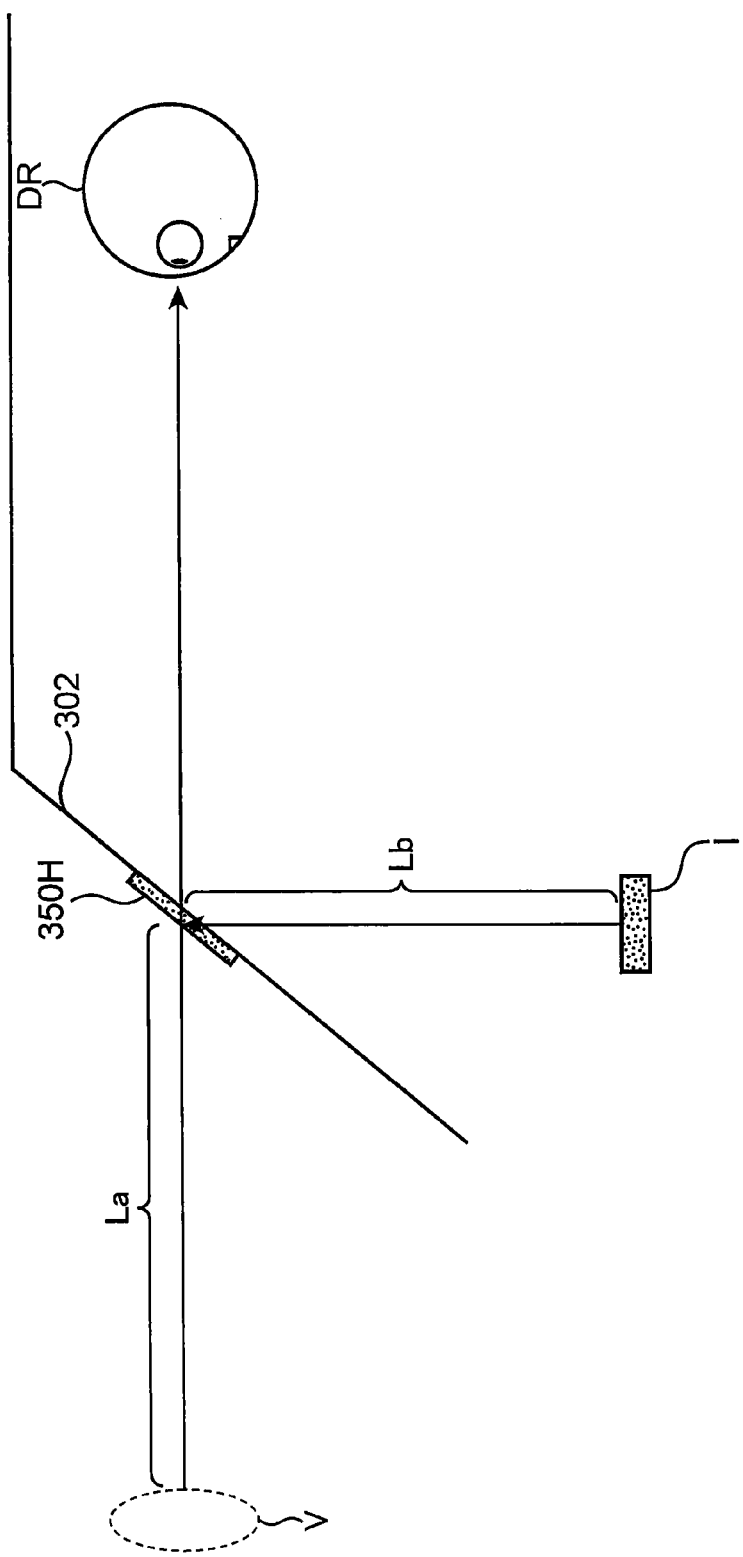
FIG. 22 is a diagram showing magnification principles of a display image by means of a combiner.

FIG. 22 shows magnification principles of the display image by means of the combiner 350H. The magnification principles of the display image are described with reference to FIGS. 21 and 22.

FIG. 22 shows a positional relationship between a virtual image V displayed by the HUD 300H and the driver DR. The driver DR perceives the virtual image V so as to exist at a distant position by a distance La from the front windscreen 302.

The distance Lb shown in FIG. 22 indicates a distance between the display image I represented by the display light L1 from the display part 320, and the combiner 350H. In order to clarify the description, FIG. 22 does not depict components such as the correcting element 330H which turns the optical path. The distance between the combiner 350H and the display image I is represented by a length of a straight line.

The optical magnification ratio of the combiner 350H is expressed as a ratio between the distances La, Lb shown in FIG. 22. For example, if the distance La is 1 m and if the distance Lb is 0.5 m, then the optical magnification ratio of the combiner 350H is expressed as 2× (2 times). If a display position of the virtual image V is constant, a greater optical magnification ratio of the combiner 350H results in a shorter optical path length from the combiner 350H to the display image I (the distance Lb). Therefore, a compact design of the HUD optical unit 310H shown in FIG. 21 may be achieved. In order to make an optical system compact, a large optical magnification ratio is desirable in the combiner 350H. In general, a larger optical magnification of the combiner, however, results in severer aberration caused by the combiner. Consequently, with a combiner having a large optical magnification ratio, the resolution of the display image tends to deteriorate.

As shown in FIG. 21, the display light L1 is incident on the correcting element 330H at the incident angle $\alpha_1$, and is emitted at the diffraction angle $\beta_1$. The display light L1 is then incident on the combiner 350H at the incident angle $\alpha_2$ and is emitted at the diffraction angle $\beta_2$.

In the following description, the term "combiner angle", which is represented by the symbol "$\phi$", is an angle of the front windscreen 302 and the combiner 350H with respect to the horizontal line. The larger the value of this combiner angle $\phi$, the closer the front windscreen 302 and the combiner 350H to the vertical.

In the present embodiment, the incident angles $\alpha_1$, $\alpha_2$ and the diffraction angles $\beta_1$, $\beta_2$ are appropriately set to reduce aberration of the optical system and make the optical system compact. A method for setting the four values about the incident angles $\alpha_1$, $\alpha_2$ and the diffraction angles $\beta_1$, $\beta_2$ is described below.

<First Setting Method: Diffraction Angle Adjustment of Hologram Combiner>

The first setting method for reducing a size of the optical system involves, for example, a reduction in the diffraction angle $\beta_2$ of the combiner 350H. The smaller the diffraction angle $\beta_2$ of the combiner 350H, the smaller the aberration caused by the combiner 350H. Consequently, an application of the combiner 350H, which has a relatively large magnification ratio, to the HUD 300H is acceptable in terms of the aberration. Therefore, the optical system of the HUD 300H is compactly designed by means of the combiner 350H having a relatively large magnification ratio.

The diffraction angle $\beta_2$ of the combiner 350H is defined by the combiner angle $\phi$ and an angle at which the driver DR looks down at the display image I (hereinafter, called "top-down view angle").

Figure 23:
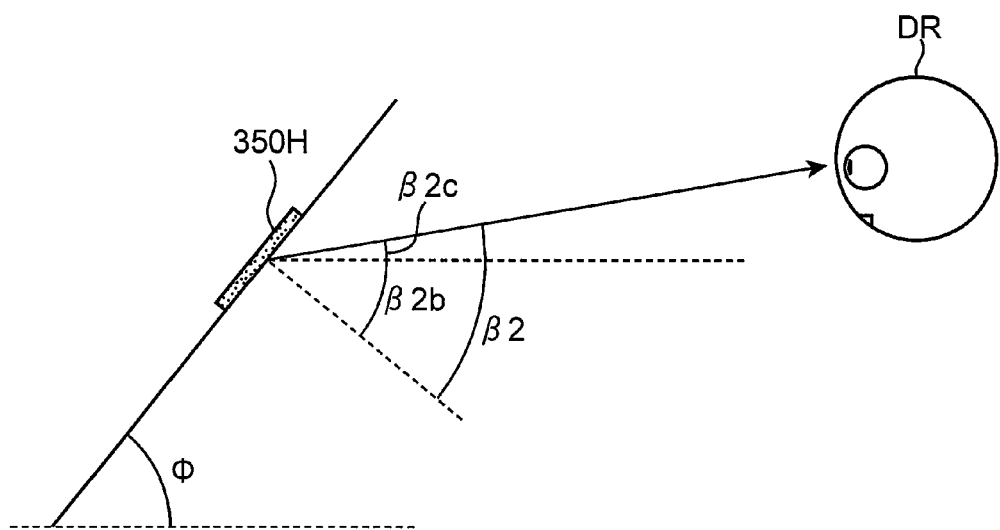
FIG. 23 is a schematic view of a relationship among a diffraction angle, a combiner angle and a top-down view angle.

FIG. 23 shows a schematic view of a relationship among the diffraction angle $\beta_2$ of the combiner 350H, the combiner angle $\phi$ and the top-down view angle. The relationship among the diffraction angle $\beta_2$ of the combiner 350H and the combiner angle $\phi$ and the top-down view angle is described with reference to FIGS. 21 and 23.

FIG. 23 shows the diffraction angle $\beta_2$ of the combiner 350H, the combiner angle $\phi$, the top-down view angle $\beta_{2c}$ (the angle at which the driver DR looks down at the image displayed by the HUD 300H), and the angle $\beta_{2b}$. The value of the angle $\beta_{2b}$ is expressed by 90° minus the value of the combiner angle $\phi$. The diffraction angle $\beta_2$ of the combiner 350H corresponds to the sum of the top-down view angle $\beta_{2c}$ and the angle $\beta_{2b}$. Therefore, the larger the setting of the combiner angle $\phi$, the smaller the diffraction angle $\beta_2$ of the combiner 350H. Consequently, in order to reduce the aberration and make the HUD 300H compact, it is desirable to set a large combiner angle $\phi$ and a large optical magnification ratio of the combiner 350H.

FIG. 24 shows exemplary set values of the diffraction angle $\beta_2$ of the combiner 350H and the optical magnification ratio of the combiner 350H. The settings of the diffraction angle $\beta_2$ and the optical magnification ratio are described with reference to FIGS. 21 to 24.

In the setting values shown in FIG. 24, the incident angle $\alpha_2$ of the combiner 350H is set to 20° under all conditions. The resolution of the image displayed by the HUD 300H is set so that the pixel magnification per pixel when the driver DR views the virtual image V is no more than one minute (no more than 1/60th degree, which corresponds to the visual resolution of a person having "1.0" vision). Alternatively, the resolution of the image displayed by the HUD 300H is set so that the size of one pixel of the virtual image V projected onto the retina of the driver DR when the driver DR views the virtual image V is no more than 6.2 μm.

As shown in FIG. 24, the smaller the diffraction angle $\beta_2$ of the combiner 350H, the greater the optical magnification ratio of the combiner 350H which is acceptable in terms of resolution. If the diffraction angle $\beta_2$ of the combiner 350H is set to a range of 45° to 65°, the desirable optical magnification ratio of the combiner 350H is set to a range of 3× to 4× (in FIG. 24, a range of 3.00× to 3.75× is shown). In designing the vehicle 301 on which the HUD 300H is mounted, the front windscreen 302 may be set so that an angle of the front windscreen 302 is close to the vertical to increase the combiner angle $\phi$. Alternatively, the combiner 350H and the front windscreen 302 may be formed as separate objects. The angle of the combiner 350H and the combiner angle $\phi$ may be increased without changing the mounting angle of the front windscreen 302.

The data shown in FIG. 24 are obtained when the incident angle $\alpha_2$ at the combiner 350H is set to 20°. However, the incident angle $\alpha_2$ at the combiner 350H is not limited to 20°. The incident angle $\alpha_2$ at the combiner 350H is desirably set to a range of 20° to 25°.

<Second Setting Method: Incident Angle Adjustment at Hologram Combiner>

If the combiner 350H is attached to the front windscreen 302, the combiner angle $\phi$ may not be freely changed. As a result, the diffraction angle $\beta_2$ of the combiner 350H becomes too large to accept a large optical magnification ratio of the combiner 350H in terms of aberration. However, if the incident angle $\alpha_2$ at the combiner 350H is appropriately set, the combiner 350H having a large optical magnification ratio may be acceptably used in terms of aberration without changing the combiner angle $\phi$. An aberration amount caused by the combiner 350H varies with a change in the incident angle $\alpha_2$ at the combiner 350H.

Figure 25:
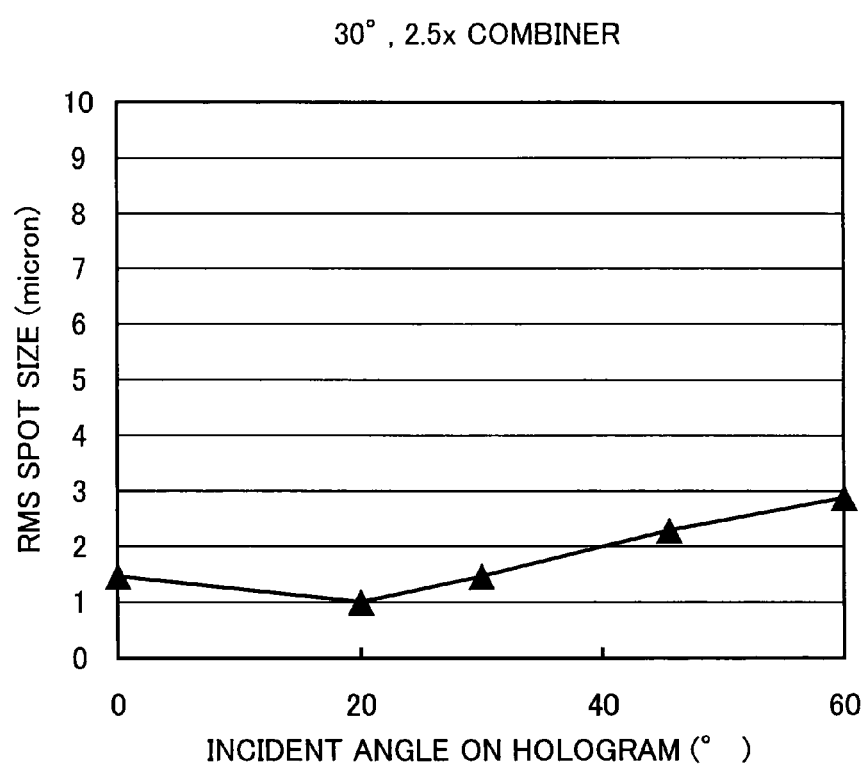
FIG. 25 is a graph of calculation results about a change in display resolution in response to a change in an incident angle on the combiner by means of optical simulation software.

FIG. 25 is a graph showing calculation results about the display resolution change due to a change in the incident angle $\alpha_2$ at the combiner 350H by means of an optical simulation software. In the calculation by means of the optical simulation software, the combiner angle $\phi$ is set to 30°, and the optical magnification ratio of the combiner 350H is set to 2.5×. The change in the display resolution due to the change in the incident angle $\alpha_2$ at the combiner 350H is described with reference to FIGS. 21, 22 and 25.

The horizontal axis of the graph shown in FIG. 25 indicates the incident angle $\alpha_2$ at the combiner 350H while the vertical axis indicates a size of a pixel projected onto the retina of the driver DR when the driver DR sees the virtual image V. As shown by the graph in FIG. 25, even if the diffraction angle $\beta_2$ of the combiner 350H and the optical magnification ratio of the combiner 350H are consistent, the value of the aberration caused by the combiner 350H changes if the incident angle $\alpha_2$ at the combiner 350H changes. Consequently, the spot diameter per pixel projected onto the retina of the driver DR changes.

As shown in FIG. 25, the aberration becomes the least influential when the incident angle $\alpha_2$ at the combiner 350H is set to around 20°. Consequently, the spot diameter per pixel projected onto the retina of the driver DR becomes smaller so that the driver DR may view a high quality image.

In the present embodiment, the incident angle $\alpha_2$ at the combiner 350H is desirably set to a range of 0° to 25°. The diffraction angle $\beta_2$ of the combiner 350H is desirably set to no more than 50°. The optical magnification ratio is desirably set to a range of 2.5× to 3.5×. In such a setting range, the HUD optical unit 310H may become sufficiently compact so that the HUD 300H may be mounted in the small vehicle 301.

<Third Setting Method: Combiner Distance Adjustment>

In FIG. 21, the combiner distance between the combiner 350H and the HUD optical unit 310H is indicated by the symbol "D". If the combiner distance D becomes longer, the HUD optical unit 310H suitably becomes compact.

The distance Lb shown in FIG. 22 is determined on the basis of the optical magnification ratio of the combiner 350H and the distance La between the combiner 350H and the virtual image V. If the combiner distance D between the combiner 350H and the HUD optical unit 310H is short, the HUD optical unit 310H has to have an optical path length Lc which corresponds to a differential between the distance Lb and the combiner distance D. If the optical path Lc is longer, the HUD optical unit 310H becomes larger. Therefore, if a long combiner distance D is set, the HUD optical unit 310H may suitably become compact. If the opening 313 of the HUD optical unit 310H is situated on an inner side of the vehicle, the combiner distance D increases to make the HUD optical unit 310H compact.

FIG. 26 exemplifies the incident angle $\alpha_2$ at the combiner 350H, the diffraction angle $\beta_2$ of the combiner 350H, the optical magnification ratio of the combiner 350H, and a volume of the HUD optical unit 310H which depends on a change in the combiner distance D. Variation in the volume of the HUD optical unit 310H is described with reference to FIGS. 21 and 26.

As shown in FIG. 26, even if the diffraction angle $\beta_2$ of the combiner 350H is large and unless the optical magnification ratio of the combiner 350H is increased, the HUD optical unit 310H may suitably become compact when the combiner distance D is set as a long distance. Conversely, the smaller the diffraction angle $\beta_2$ of the combiner 350H, the less susceptible the image quality to the effects of an increase in the optical magnification ratio of the combiner 350H. Therefore, the HUD optical unit 310H may be compactly designed even if the combiner distance D is short.

<Fourth Setting Method: Addition of Magnification Function to Correcting Element>

The aforementioned first and second setting methods are effective if the wavelength width of the light source in the display part 320 is sufficiently small (e.g., no more than 0.1 nm). However, if the wavelength width of the light source of the display part 320 is large and if a hologram combiner is used as the combiner 350H, then the image blurring problem arises because of the wavelength width of the light source. Therefore, the first and second setting methods may not provide an image having sufficiently improved resolution.

The term "wavelength width of the light source" which is used in the following or above description means a variation range of the light wavelength which is emitted from the light source that is designed to output a prescribed wavelength. For instance, even if the green laser source 343 described with reference to FIG. 2 is designed so as to emit laser light having a wavelength of 532 nm, the green laser source 343 actually emits laser light of which wavelength varies in a variation range of several nm around 532 nm. For instance, if the wavelength width of the green laser source 343 is 1 nm, the green laser source 343 emits laser light in a range of 531.5 to 532.5 nm.

The hologram combiner is designed so that light is emitted at a specific diffraction angle when light of a certain wavelength is incident at a specific incident angle. The combiner 350H (hologram combiner) shown in FIG. 21 is designed so as to output light at the diffraction angle $\beta_2$, in response to light which is incident at the incident angle $\alpha_2$ (light of wavelengths corresponding to R, G, B). However, if the wavelength of the light source has a given wavelength width as described above, the combiner 350H diffracts the light of a wavelength (e.g., 531.5 nm) which deviates from the design wavelength of the hologram (e.g., 532 nm), at a different angle from the expected emission angle $\beta_2$. A larger difference between the incident angle $\alpha_2$ and the diffraction angle $\beta_2$ is likely to cause the largely deviated diffraction angle $\beta_2$ from the expected diffraction angle $\beta_2$ if the wavelength of the light deviates from the design wavelength.

Figure 27:
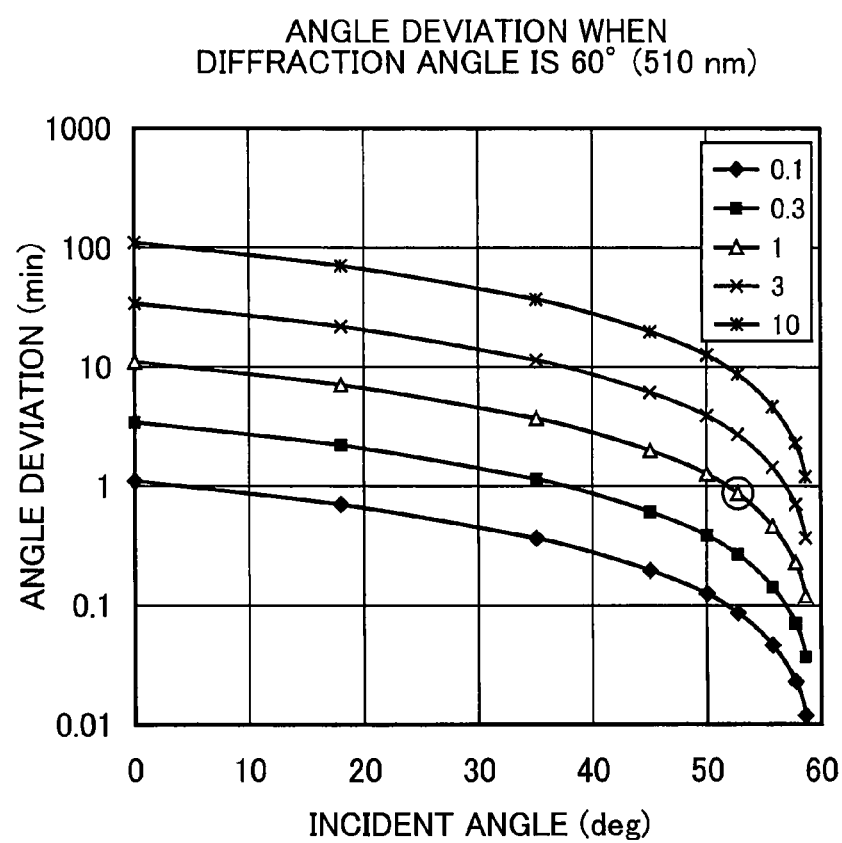
FIG. 27 is a graph showing errors in diffraction angle due to a wavelength width of the light source and variation in incident angle on the combiner.

FIG. 27 is a graph showing errors in the diffraction angle $\beta_2$ due to the wavelength width of the light source and variation in the incident angle $\alpha_2$ at the combiner 350H (the error means a difference between the expected diffraction angle $\beta_2$ of the combiner 350H and the diffraction angle $\beta_2$ of the light actually emitted from the combiner 350H). The errors of the diffraction angle $\beta_2$ are described with reference to FIGS. 2, 21, 22 and 27.

The graph in FIG. 27 shows the errors in the diffraction angle $\beta_2$ when the design diffraction angle $\beta_2$ of the combiner 350H is set to 60°. The horizontal axis of the graph in FIG. 27 indicates the incident angle $\alpha_2$ at the combiner 350H while the vertical axis indicates the errors of the diffraction angle $\beta_2$ (unit: minute (1/60 degree)).

In a group of the curves shown in FIG. 27, lower curves mean data obtained from light sources having a narrower wavelength width (the lowest curve shown in FIG. 27 indicates data obtained from a light source designed to have a wavelength width of 0.1 nm). Upper curves mean data obtained from light sources having a wider wavelength width (the uppermost curve shown in FIG. 27 indicates data obtained from a light source designed to have a wavelength width of 10 nm).

As shown in the graph in FIG. 27, if the wavelength width of the light source becomes wider and if the difference between the incident angle $\alpha_2$ at the combiner 350H and the diffraction angle $\beta_2$ of the combiner 350H becomes larger, the error in the diffraction angle $\beta_2$ becomes larger. The wavelength width of the light source depends on performance of the laser sources shown in FIG. 2 (the red, blue and green laser sources 341, 342, 343). Therefore, a closer value between the incident angle $\alpha_2$ and the design value of the diffraction angle $\beta_2$ is required in order to reduce the error of the diffraction angle $\theta_2$ in the design of the optical system. In other words, if the design diffraction angle $\beta_2$ of the combiner 350H shown in FIG. 27 is 60°, it is necessary for the incident angle $\alpha_2$ to be close to 60°.

However, as described above, if the incident angle $\alpha_2$ greatly departs from a range of 15° to 25°, the combiner 350 causes great aberration. Consequently, even if light having the design wavelength of the hologram (e.g., 532 nm) is incident on the combiner 350H, the spot diameter of each pixel at the retina becomes too large to display an image (information) of high resolution when the driver DR views the virtual image V. In particular, if the HUD 300H is mounted in the vehicle 301 having a small combiner angle $\phi$, the diffraction angle $\beta_2$ of the combiner 350H becomes large. Therefore, the incident angle $\alpha_2$ is set to a large value in order to reduce the error of the diffraction angle $\beta_2$. Hence, the combiner may cause further increased aberration.

A reduction in the optical magnification ratio of the combiner 350H reduces the resultant aberration from the combiner 350H. However, since the distance Lb from the combiner 350H shown in FIG. 22 to the display image I is long, the optical system becomes large. For example, if the combiner angle $\phi$ is approximately 40°, the spot diameter per pixel projected onto the retina is reduced to 6.2 µm or less when the driver DR views the virtual image V under a combiner magnification ratio reduced to approximately 2× whereas the size of the HUD optical unit 310H is increased to approximately 4 L. The HUD 300H, which comprises such a large volume of the HUD optical unit 310H, is not suitable for mounting on a small vehicle.

The aforementioned problems are suitably resolved by means of the correcting element 330H, which is formed from a concave mirror having magnifying functions, and a combiner 350H, which has a reduced optical magnification ratio. The correcting element 330H magnifies the display image I, in addition to the combiner 350H. Consequently, the optical magnification ratio of the combiner 350H may be set to a relatively small value to reduce the resultant aberration from the combiner 350H. A smaller optical magnification ratio of the correcting element 330H may be set than the optical magnification ratio of the combiner 350H. Desirably, the greater the optical magnification ratio of the combiner 350H, the larger the value set for the optical magnification ratio of the correcting element 330H.

In the present embodiment, the incident angle $\alpha_2$ on the correcting element 330H from the display part 320 is set so that astigmatism directions caused by the combiner 350H and the correcting element 330H become different from each other.

Figure 28:
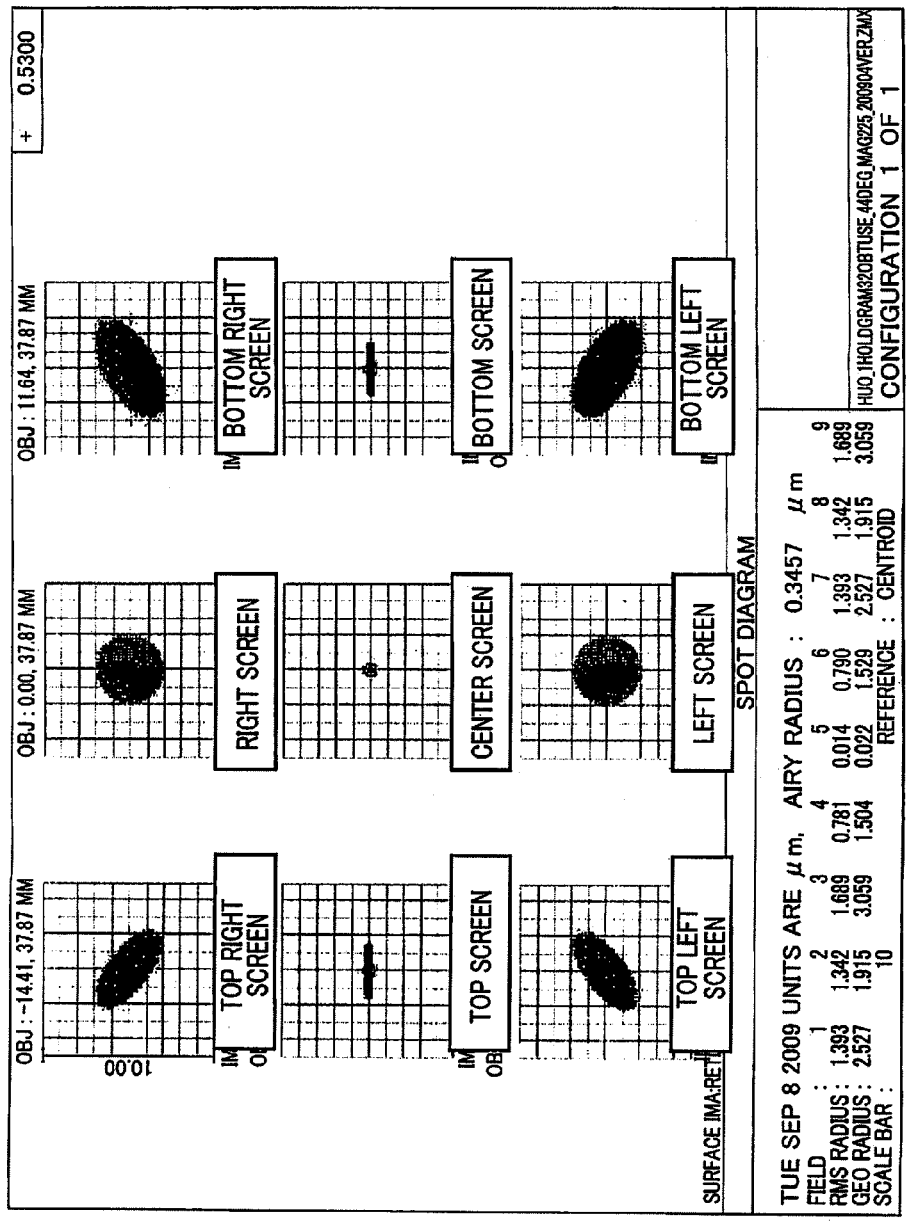
FIG. 28 is an exemplary diagram showing directions of astigmatism in the combiner.

FIG. 28 shows an exemplary astigmatism direction caused by the combiner 350H. The astigmatism direction caused by the combiner 350H is described with reference to FIGS. 21 and 28.

FIG. 28 shows the calculation results by means of an optical simulation software about pixel shape at the retina of the driver DR who views the virtual image V displayed by the HUD 300H. FIG. 28 shows the pixel sizes (spot diameters) and the pixel shapes at the retina, which correspond to the center of the display screen and peripheral sections of the display screen (the upper right area, the right area, the lower right area, the upper area, the lower area, the upper left area, the left area and the lower left area). As shown in FIG. 28, the pixel shapes at the edges of the screen are elongated towards the outside of the screen, in comparison with the pixel at the center of the screen. This means that the combiner 350H causes radial astigmatism which extends from the center of the screen.

The incident angle $\alpha_1$ at the correcting element 330H is set so that the aberration direction caused by the correcting element 330H used in the present embodiment is different from the aberration direction caused by the combiner 350H.

Figure 29:
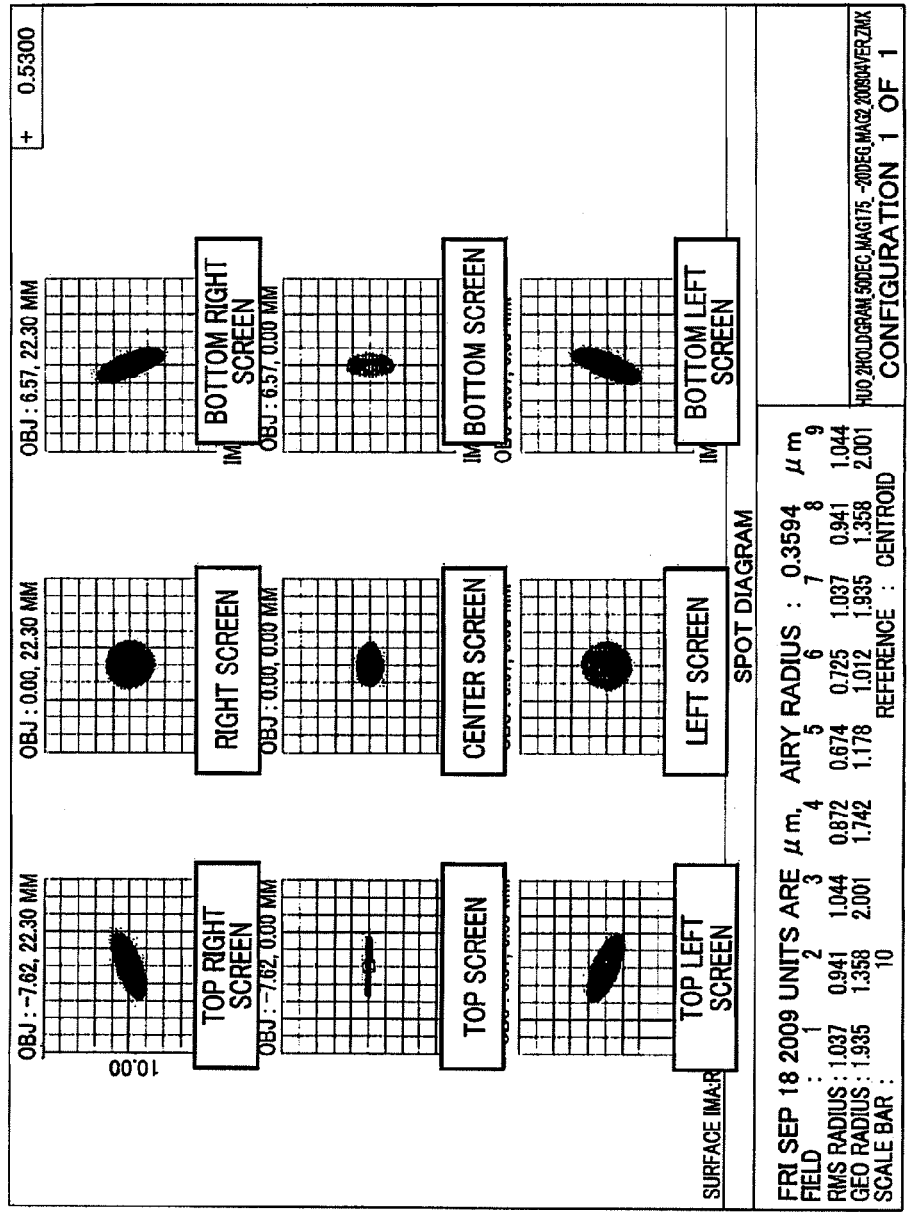
FIG. 29 is an exemplary diagram showing effects of the correcting element on aberration in a display image.

FIG. 29 shows an exemplary aberration effect caused in the display image I by the correcting element 330H. The aberration effect in the display image I by the correcting element 330H is described with reference to FIGS. 21, 22, 28 and 29.

FIG. 29 shows pixel shapes at the center and peripheral sections of the screen, which are projected onto the retina of the driver DR when the display image I is affected only by the resultant aberration from the correcting element 330H. As shown in FIG. 29, the correcting element 330 causes circumferential astigmatism on the screen. The astigmatism due to the correcting element 330H differs in direction from the astigmatism due to the combiner 350H shown in FIG. 28.

The astigmatism direction, which the correcting element 330H as a concave mirror causes, is varied by a change in the incident angle $\alpha_2$ on the correcting element 330H. The display light L1 irradiated down from the display part 320 towards the correcting element 330H is thereafter propagated upwards with the astigmatism shown in FIG. 29. The display light L1 is then incident on the combiner 350H. The combiner 350H uses the aberration characteristics shown in FIG. 28 to cancel out the astigmatism shown in FIG. 29. In the present embodiment, as shown in FIG. 21, the incident angle $\alpha_1$ on the correcting element 330H is set so that the display light L1 enters from the front side of the vehicle 301. The incident angle $\alpha_1$ on the correcting element 330H is desirably set to a range of 15° to 25°. Since the aberration directions caused by the combiner 350H and the correcting element 330H are different from each other. Therefore, even if the combiner 350H and the correcting element 330H have magnifying characteristics, respectively, the image resolution presented to the driver DR is less likely to deteriorate.

Figure 30:
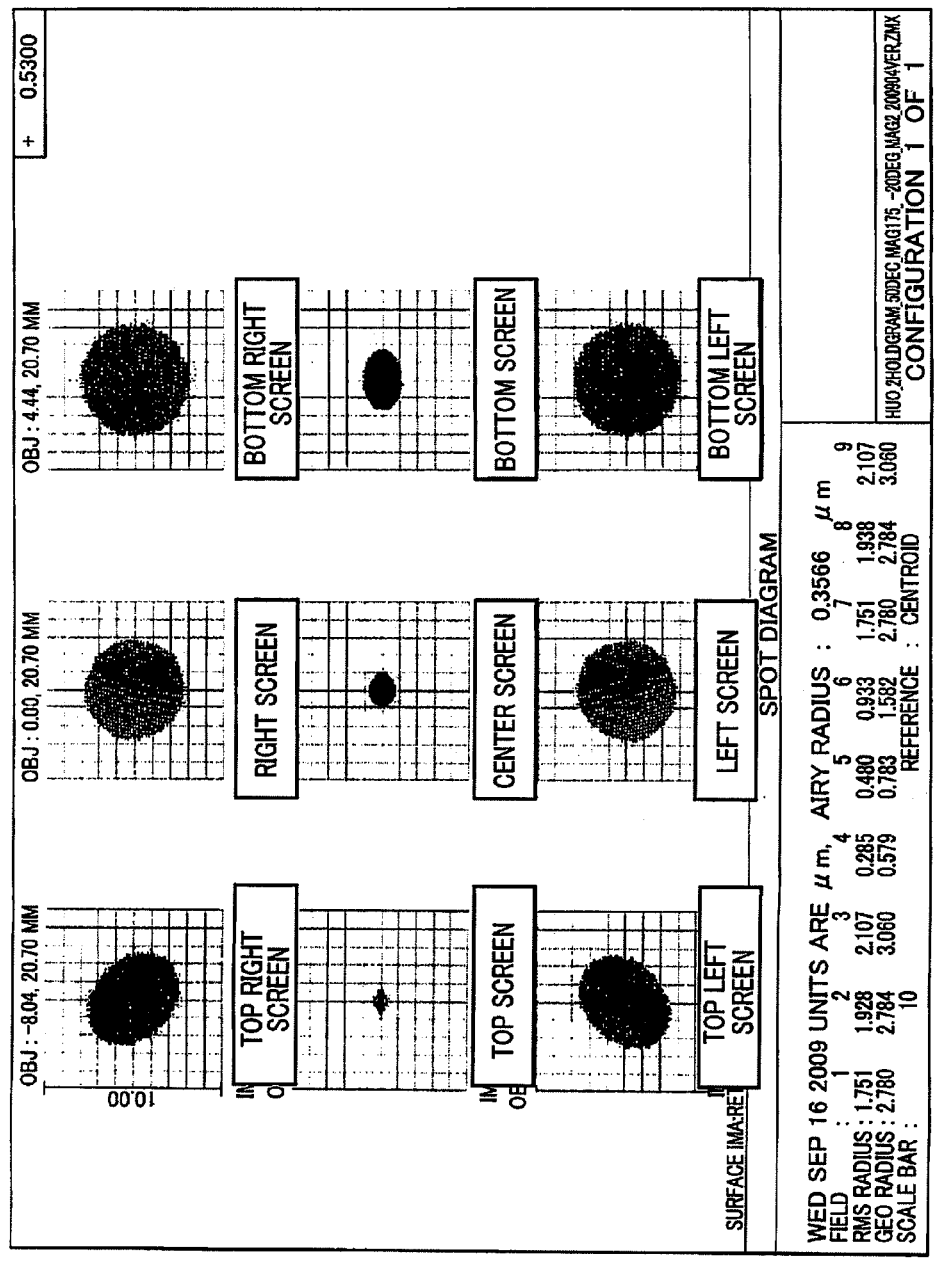
FIG. 30 is an exemplary diagram showing shapes and sizes of pixels of a display image projected onto the retina of a driver when the driver views the display image which is magnified by the combiner and the correcting element.

FIG. 30 shows exemplary shapes and sizes of the display image I projected onto the retina of the driver DR who views the magnified display image I by the combiner 350H and the correcting element 330H. The shape and size of the pixels in the display image I projected onto the retina of the driver DR are described with reference to FIGS. 21, 22, 28 to 30.

The shapes of the pixels shown in FIG. 30 are approximately circular in comparison with the shape of the pixels shown in FIGS. 28 and 29. As a result of the combined aberration due to the combiner 350H and the correcting element 330H, area sizes of the actual pixels become larger without an increase in the actual diameter of each pixel due to the different astigmatism directions from each other. Consequently, the resolution presented to the driver DR is kept high.

If the optical magnification ratio of the combiner 350H is set to a range of 2× to 3×, if the optical magnification ratio of the correcting element 330H is set to a range of 1.2× to 2× (and more desirably, 1.25× to 2×) and if the incident angle $\alpha_1$ at the correcting element 330H and the diffraction angle $\beta_1$ of the correcting element 330H are set in a range of 15° to 25°, then the HUD optical unit 310H shown in FIG. 21 may become small in size up to approximately 1 L. Each pixel size at the retina when the driver DR views the virtual image V is reduced to no more than 6.2 μm (no more than the resolution of a person with vision of "1.0").

More desirably, if the optical magnification of the combiner 350H is set to 2.65×, if the optical magnification of the correcting element 330H is set to 1.75× and if the incident angle $\alpha_1$ on the correcting element 330H and the diffraction angle $\beta_1$ of the correcting element 330H are set to 20°, then the optical system suitably becomes more compact.

The incident angle $\alpha_2$ at the combiner 350H does not have to be the same as the diffraction angle $\beta_2$ of the combiner 350H. For example, a smaller incident angle $\alpha_2$ on the combiner 350H may be set than the diffraction angle $\beta_2$ of the combiner 350H by 6° or more. For example, if the eye box EB which is 10 cm in the vertical direction and 10 cm in the horizontal direction is optically determined, external disturbing factors such as external light which is reflected from a surface of the display part 320 is less likely to be directly viewed by the driver DR.

The incident angle $\alpha_2$ at the combiner 350H may be set to a smaller angle than the diffraction angle $\beta_2$ of the combiner 350H, by no less than 6° and no more than 8°. In this case, external disturbing factors such as external light reflected from a surface of the display part 320 are less likely to be directly viewed by the driver DR. Therefore, the astigmatism becomes less influential.

A focal distance of the concave mirror in the correcting element 330H is desirably set to be shorter than a distance from the correcting element 330H to the combiner 350H. Consequently, light components such as the sunlight entering through the front windscreen 302 are less likely to be condensed on the combiner 350H even if the light components are reflected by the concave mirror. With little condensation of the light on the combiner 350H, the HUD 300H becomes safer.

Optionally, the optical path length of the display light L1 from the display part 320 to the correcting element 330H may be set to be longer than the optical path length of the display light L1 from the correcting element 330H to the combiner 350H since the correcting element 330H has magnification functions.

According to the fourth setting method, even with a light source having a relatively large wavelength width, the HUD 300H may present a high quality image to the driver DR. If the wavelength width of the light source is no more than 1 nm, a very high quality image is displayed.

Sixth Embodiment

A problem which a transmissive display device according to the sixth embodiment addresses is described below.

If a hologram combiner is used as a combiner, brightness of an image presented to the driver is reduced when the wavelength of the light from the display element changes. The HUD according to the present embodiment suitably resolves this problem about the reduced image brightness.

A volume reflection type of hologram is used as the hologram combiner, which is generally employed in an HUD. The volume reflection type of hologram has wavelength selectivity high enough to very efficiently reflect only specific light wavelengths. With the volume reflection type of hologram having such characteristics, a hologram combiner is formed to reflect only the light wavelengths included in the display element and transmits light of other wavelengths.

The term "wavelength range $\delta\lambda$" used in the following description means a light wavelength range which may be very efficiently reflected by a certain hologram combiner. Intensity of incident light on the hologram combiner is represented by the symbol "Sa". Intensity of reflected light from the hologram combiner is represented by the symbol "Sb". The term "diffraction efficiency $\eta$ of the hologram combiner" means a value obtained by dividing the intensity Sb of the reflected light from the hologram combiner by the intensity Sa of the incident light on the hologram combiner. For example, if light of 200 mW is incident on a certain hologram combiner and if the reflected light from the hologram combiner is 100 mW, then the diffraction efficiency $\eta$ of the hologram combiner is 0.5. The diffraction efficiency $\eta$ of the hologram combiner changes in response to the wavelength. The diffraction efficiency $\eta$ of the hologram combiner becomes relatively high for the light included in the wavelength range $\delta\lambda$ of the hologram. If the light from the display element used in the HUD is included in the wavelength range $\delta\lambda$ of the hologram combiner, the driver may view an ambient outlook outside the vehicle due to external light, which is transmitted at a high transmission ratio, as well as a very bright image resulting from the display light reflected with high diffraction efficiency $\eta$ by the hologram combiner.

However, if the light wavelength from the display element departs from the wavelength range $\delta\lambda$ of the hologram, the diffraction efficiency $\eta$ of the hologram corresponding to the light from the display element is dramatically reduced because of the high wavelength selectivity of the volume hologram. Consequently, the brightness of the image viewed by the driver is noticeably reduced.

For example, if the HUD is provided with a hologram combiner which is designed so as to very efficiently reflect light of the wavelengths included in the wavelength range $\delta\lambda$ from wavelength $\lambda a$ to wavelength $\lambda b$, the diffraction efficiency $\eta$ is markedly reduced for light of wavelengths excluded from the wavelength range $\delta\lambda$ (e.g., light having a wavelength shorter than $\lambda a$ or larger than $\lambda b$). If a light source such as a laser source is used as the light source of the display element, the wavelength of the light source changes with the temperature.

Figure 31:
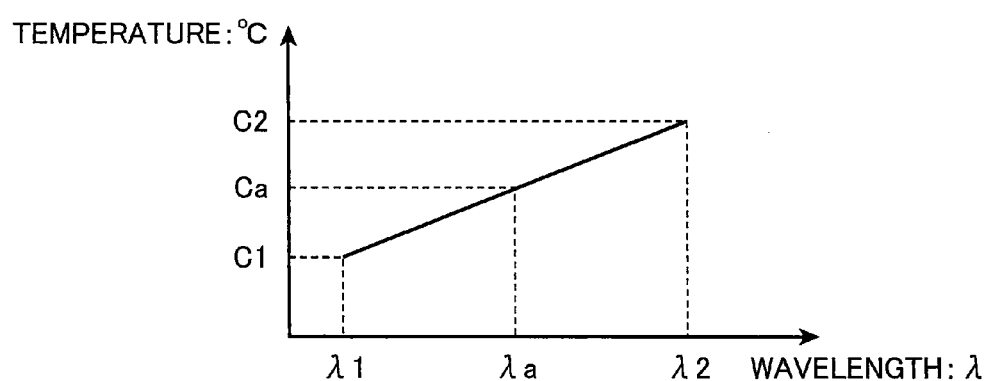
FIG. 31 is a schematic graph of a relationship between the temperature and wavelength of a laser source.

FIG. 31 is a schematic graph of a relationship between the temperature and wavelength of a laser source. The relationship between the temperature and wavelength of the laser source is described with reference to FIG. 31.

According to the graph shown in FIG. 31, if the temperature of the laser source goes down, the wavelength of the laser light emitted from the laser source becomes short. On the other hand, the temperature of the laser source goes up, the wavelength of the laser light becomes long. If the temperature of the laser source changes in a range from C1 to C2, the wavelength of the laser light emitted from the laser source changes between $\lambda 1$ and $\lambda 2$. The environment inside the vehicle where the HUD is used, especially the ambient temperature of the light source, is likely to greatly change in response to various conditions such as location, season, time of day and weather where the HUD is used. The temperature of the light source itself greatly varies with a change in the ambient temperature around the light source. Consequently, it is expected that there is a large variation in wavelength from the laser source. If the wavelength of the light source departs from the wavelength range $\delta\lambda$ of the hologram due to conditions such as the operating temperature, it becomes impossible to present a very bright image to the driver.

A reduction in thickness T of the hologram used in the combiner is effective in order to resolve the aforementioned problem. The following equation shows a relationship between the thickness T of the volume hologram and the wavelength range $\delta\lambda$ of the hologram combiner.

$$T \propto 1/\delta\lambda \qquad \text{[Equation 1]}$$

The thickness T of the hologram and the size of the wavelength range $\delta\lambda$ have an inversely proportional relationship, as indicated in the aforementioned equation. In other words, if the thickness T of the hologram is reduced, the hologram has a larger wavelength range $\delta\lambda$. A reduction in the thickness T of the hologram results in a wider wavelength range $\delta\lambda$ in which reflection from the hologram becomes very efficient. Consequently, the display brightness for the driver is less likely to go down even if the wavelength of the light source varies due to a change in the environment such as the operating temperature.

The following equation relates to the diffraction efficiency $\eta$ of the hologram.

$$\eta \propto (\delta n \cdot T)^2 \qquad \text{[Equation 2]}$$

In the aforementioned equation, "$\delta n$" is a value of the refractive index modulation of the hologram material. As shown in the aforementioned Equation 2, in order to increase the diffraction efficiency $\eta$ of the hologram, it is necessary to increase the value of the refractive index modulation $\delta n$ of the hologram material, or to increase the thickness T of the hologram. If the thickness T of the hologram is reduced to increase the wavelength range $\delta\lambda$, in order to respond to the wavelength variation of the light source as described above, then the value of the diffraction efficiency $\eta$ is reduced as shown in the aforementioned Equation 2. In other words, if the thickness T of the hologram is reduced in order to increase the wavelength range $\delta\lambda$, it becomes difficult to reflect very bright display light from the display element towards the driver although the resultant reduction in the display brightness presented to the driver from the wavelength variation in the light source is suppressed. Even if the wavelength of the light source is included in the wavelength range $\delta\lambda$ of the hologram, it is difficult to display a bright image. A transmissive display device, which is typically an HUD or an HMD, as described below is often used in an outdoor environment under the daylight. Therefore, the reduction in the display brightness means that it becomes difficult for a user to readily view the displayed information, because of effects of external disturbing factors such as the sunlight.

A transmissive display device to address the problem of the resultant reduction in image brightness presented to the driver from the change in the light wavelength of the display element is described below.

Figure 32:
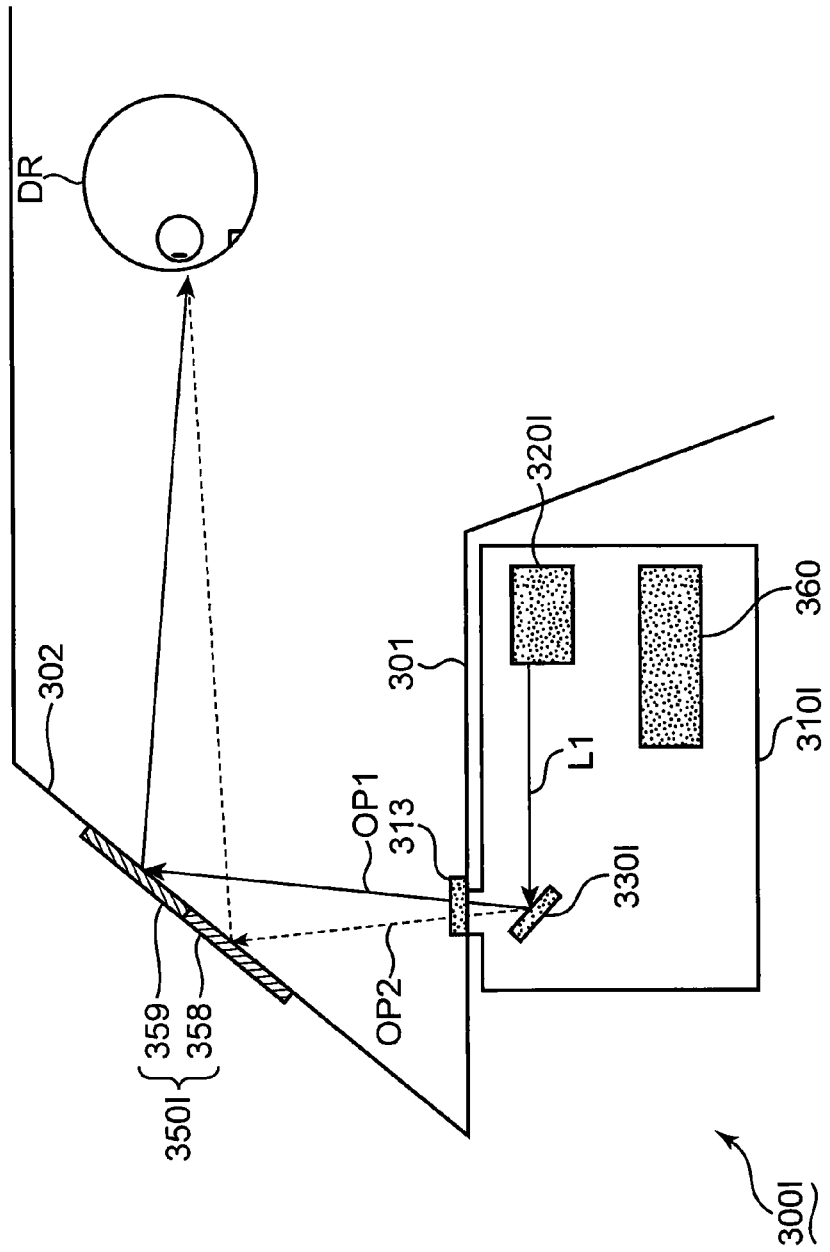
FIG. 32 is a schematic view of a transmissive display device according to the sixth embodiment.

FIG. 32 shows a schematic view of an HUD which is exemplified as a transmissive display device to address the problem about the reduction in the image brightness presented to the driver. The same components as the first embodiment are labeled with the same reference numerals. Differences from the first embodiment are described with reference to FIG. 32. Descriptions about the same components as the first embodiment are omitted here. The descriptions in the context of the first embodiment may be suitably incorporated to components which are not described below.

The HUD 300I shown in FIG. 32 comprises a hologram combiner 350I, which is attached to the front windscreen 302, and an HUD optical unit 310I, which is situated inside the dashboard of the vehicle 301. The HUD optical unit 310I stores a display part 320I, a correcting element 330I and a controller 360. The opening 313 is formed in the HUD optical unit 310I. The display light L1 created by the display part 320I is emitted through the opening 313.

The display part 320I generates and emits the display light L1 to display an image, which contains driving information (a speedometer and/or map information), to the driver DR. In the present embodiment, the display part 320I two-dimensionally scans a display screen by means of an emitted beam from a laser source to create an image that is presented to the driver DR.

Figure 33:
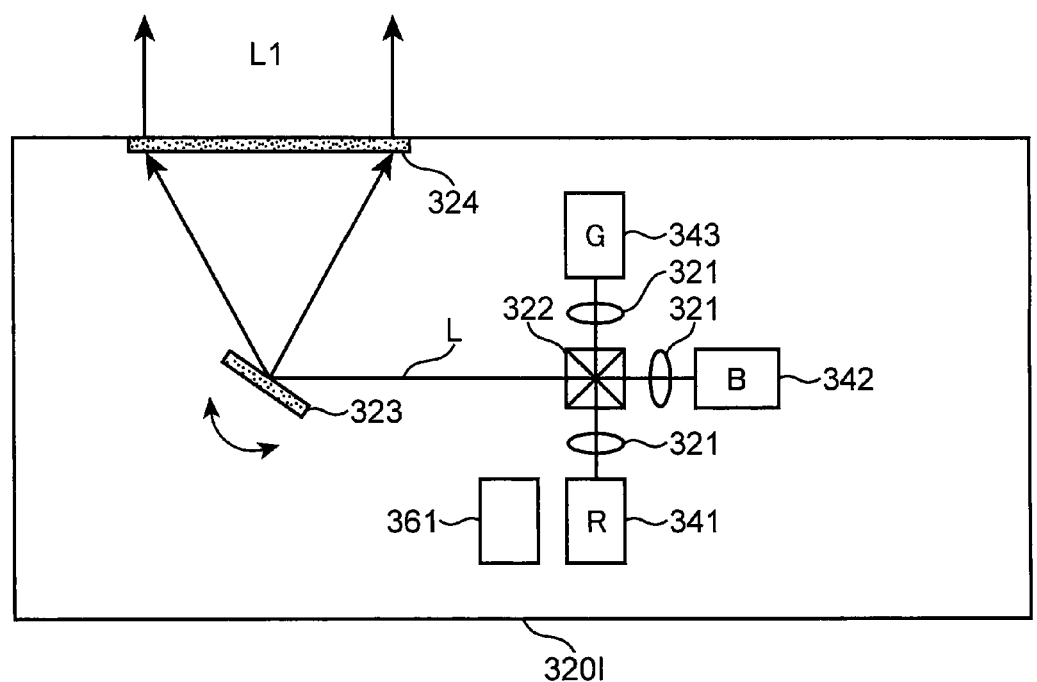
FIG. 33 is a schematic view of a display part of the transmissive display device shown in FIG. 32.

FIG. 33 shows a schematic configuration of the display part 320I. The display part 320I is described with reference to FIGS. 32 and 33.

As shown in FIG. 33, the display part 320I comprises the laser sources (the red, blue and green laser sources 341, 342, 343), the collimators 321, the dichroic mirror 322, the scanning element 323 and the display screen 324, like the display part 320 described in the context of the first embodiment. The display part 320I also comprises a temperature detector 361, in addition to these various components.

The temperature detector 361 is used to detect temperatures of the laser sources (the red, blue and green laser sources 341, 342, 343). The wavelength of the emitted laser light L from the laser source (the red, blue and/or green laser sources 341, 342, 343) is estimated in real time by the temperature detector 361. A method for estimating the wavelength on the basis of the temperature detected by the temperature detector 361 is described below.

In the present embodiment, the display part 320I comprises the display screen 324. Alternatively, the display part may exclude a display screen. Laser light may be directly projected onto the hologram combiner, which is described below. Consequently, since the laser light is directly projected onto the retina of the driver, the driver may view a clear image.

In the present embodiment, the display part 320I comprises the scanning element 323 which performs the scanning operation of the light L. Alternatively, a liquid crystal device and a backlight source may be used, like the first to fifth embodiments. It should be noted that a laser source or another laser source such as an LED may be used as the backlight source.

As shown in FIG. 32, the hologram combiner 350I includes a lower combiner 358 and an upper combiner 359. The correcting element 330I changes the direction of the display light L1 emitted from the display part 320I and causes the light to be incident on the hologram combiner 350I. In the present embodiment, the correcting element 330I is formed from a mirror. If the inclination of the mirror of the correcting element 330I is changed, the position of the incident display light L1 on the hologram combiner 350I changes. The correcting element 330I shown in FIG. 32 changes the inclination of the mirror and switches the optical path of the reflected display light L1 from the correcting element 330I between the optical path OP1 indicated by the solid line and the optical path OP2 indicated by the dotted line. The switching operation of the optical path by the correcting element 330I is described hereinafter.

The hologram combiner 350I is exemplified as the transmissive reflector which reflects the incident display light L1 on the correcting element 330I towards the eyes of the driver DR.

For example, a photopolymer layer is formed on the inner surface of the front windscreen 302 mounted in the vehicle 301 (the surface forming the boundary with the interior of the vehicle 301). The hologram combiner 350I may be a Lippman volume hologram which is formed in the photopolymer layer. The hologram combiner 350I is manufactured so as to reflect the display light L1 from the correcting element 330I towards the driver DR.

In the present embodiment, the hologram combiner 350I, which is formed in the photopolymer layer, includes three holograms which reflect light components from the red, blue and green laser sources 341, 342, 343, respectively. These holograms are formed by a multiplex exposure method. The wavelength ranges $\delta\lambda r$, $\delta\lambda g$, $\delta\lambda b$ which correspond to the light components from the red, blue and green laser sources 341, 342, 343 are set for the three holograms, respectively. The wavelength range $\delta\lambda r$ indicates a wavelength range corresponding to the red light. The wavelength range $\delta\lambda g$ indicates a wavelength range corresponding to the green light. The wavelength range $\delta\lambda b$ indicates a wavelength range corresponding to the blue light. The three holograms may reflect light wavelengths included in these wavelength ranges with high diffraction efficiency, respectively.

In the present embodiment, the hologram combiner 350I is designed so that the wavelength ranges $\delta\lambda r$, $\delta\lambda g$, $\delta\lambda b$ of the lower combiner 358 are different from the wavelength ranges $\delta\lambda r$, $\delta\lambda g$, $\delta\lambda b$ of the upper combiner 359, respectively. In the following description, the wavelength ranges $\delta\lambda r$, $\delta\lambda g$, $\delta\lambda b$ of the lower combiner 358 are referred to as "$\delta\lambda r1$", "$\delta\lambda g1$", "$\delta\lambda b1$". The wavelength ranges $\delta\lambda r$, $\delta\lambda g$, $\delta\lambda b$ of the upper combiner 359 are referred to as "$\delta\lambda r2$", "$\delta\lambda g2$", "$\delta\lambda b2$".

Figure 34:
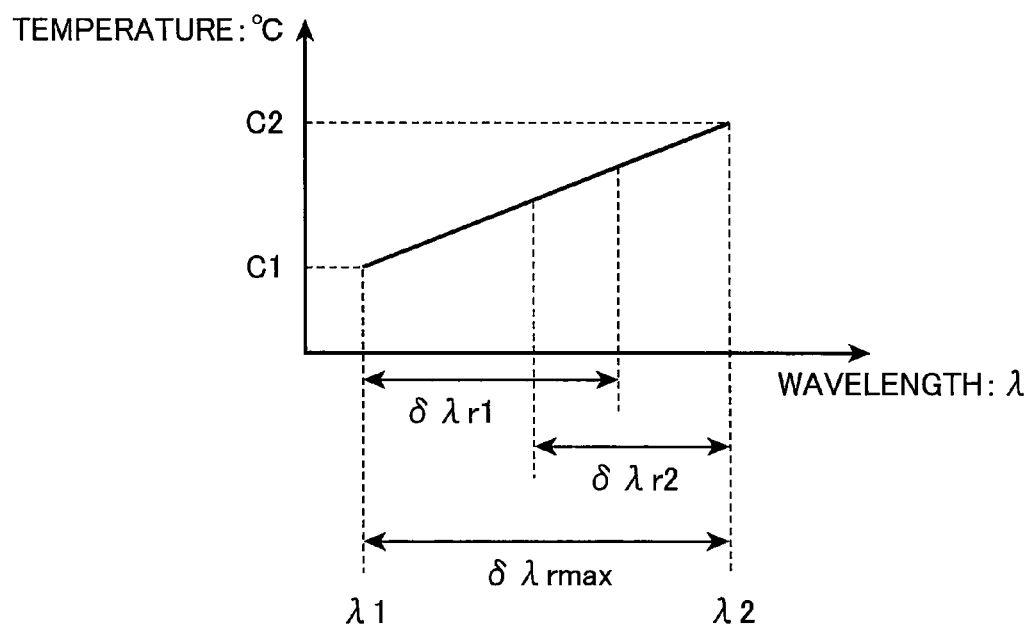
FIG. 34 is a schematic graph of an expected temperature change of the light source in the transmissive display device shown in FIG. 32, and a change in wavelength due to the temperature change in the light source.

FIG. 34 is a schematic graph of an expected temperature change of the light source (the red laser source 341) in the HUD 300I, and a resultant change in wavelength from the temperature change of the light source. A relationship between the red laser wavelength range $\delta\lambda r1$ in the lower combiner 358 and the red laser wavelength range $\delta\lambda r2$ in the upper combiner 359 is described with reference to FIGS. 32 to 34.

According to the graph in FIG. 34, the temperature of the red laser source 341 changes between C1 and C2 in an operational environment of the HUD 300I. Consequently, the wavelength of the laser light L emitted from the red laser source 341 varies between $\lambda 1$ and $\lambda 2$. In the graph shown in FIG. 34, the change range of the wavelength of the laser light L emitted from the red laser source 341 in the operational environment of the HUD 300I is referred to as "$\delta\lambda max$".

The red laser wavelength range $\delta\lambda r1$ of the lower combiner 358 and the red laser wavelength range $\delta\lambda r2$ of the upper combiner 359 are set so as to cover different wavelength ranges within "$\delta\lambda max$". The red laser wavelength range $\delta\lambda r1$ of the lower combiner 358 covers a shorter wavelength range than the red laser wavelength range $\delta\lambda r2$ of the upper combiner 359. Therefore, if the wavelength of the laser light L emitted from the red laser source 341 is short (i.e., if the temperature of the red laser source 341 is low), the lower combiner 358 reflects the laser light L emitted from the red laser source 341 at a high diffraction rate $\eta$. On the other hand, the red laser wavelength range $\delta\lambda r2$ of the upper combiner 359 covers a longer wavelength range than the red laser wavelength range $\delta\lambda r1$ of the lower combiner 358. Therefore, if the wavelength of the laser light L emitted from the red laser source 341 is long (i.e., if the temperature of the red laser source 341 is high), the upper combiner 359 reflects the laser light L emitted from the red laser source 341 at a high diffraction rate η.

The hologram combiner 350I situated on the front windscreen 302 comprises two combiners (the lower combiner 358 (wavelength range δλr1) and the upper combiner 359 (wavelength range δλr2)), which have different wavelength ranges from each other. Therefore, the hologram combiner 350I becomes thicker than a single hologram combiner having a wavelength range of δλmax. Consequently, the lower and upper combiners 358, 359 have comparatively high diffraction efficiency η, respectively.

If the wavelength of the laser light L emitted from the light sources (the red, blue and green laser sources 341, 342, 343) changes due to environmental changes such as a temperature change, the direction of the correcting element 330I is altered as described below. Consequently, a target on which the display light L1 is incident is switched between the lower and upper combiners 358, 359. Since the display light L1 is reflected by a combiner (the lower or upper combiner 358, 359) which has a wavelength range corresponding to the wavelength of the display light L1, an image continues to be presented to the driver DR without any brightness reduction, regardless of a change in the wavelength of the light source.

Relationships between the blue laser wavelength ranges δλb1 and δλb2 and between the green laser wavelength ranges δλr1 and δλr2 are similar to the relationship between the aforementioned red laser wavelength ranges. Therefore, description about these relationships is omitted.

In the present embodiment, the hologram combiner 350I is a one layer hologram which is formed by a multiplex exposure method of light components of the three colors R, G, B. Alternatively, the hologram combiner is a hologram with three layers which correspond to light components of the three colors of R, G, B, respectively. Numerical values of the refractive index modulation δn of the hologram materials used in the hologram combiner which comprises three laminated layers are appropriately set for each light component of three colors (RGB). Therefore, the diffraction efficiency for each light component of three colors (RGB) is improved, in comparison with a case where the numerical values of the refractive index modulation of the hologram material are distributed to the RGB light components (when a one-layer hologram is used).

In the present embodiment, the lower and upper combiners 358, 359 have different wavelength ranges for each of the colors R, G, B. Alternatively, the lower and upper combiners may be designed so as to have different wavelength ranges for light of one or two colors among RGB. For example, the lower and upper combiners may have different wavelength ranges for R (red), but may have the same wavelength range (δλgmax, δλbmax) for the colors G (green) and B (blue). If the width of the wavelength variation caused by the temperature variation in the blue and/or green laser sources is smaller than the width of the wavelength variation caused by the temperature variation in the red laser source, the display brightness presented to the driver is maintained simply by adjustment in response to the wavelength variation relating to the red laser source. Since the same exposure settings may be used for blue and green lights in the lower and upper combiners, it becomes simple to fabricate the hologram combiner.

The controller 360 includes an integrated circuit configured to control various components of the HUD 310I. The controller 360 controls operation of the red, blue and green laser sources 341, 342, 343 and the correcting element 330I.

The controller 360 comprises a device configured to determine contents (information) which is presented to the driver DR.

Figure 35:
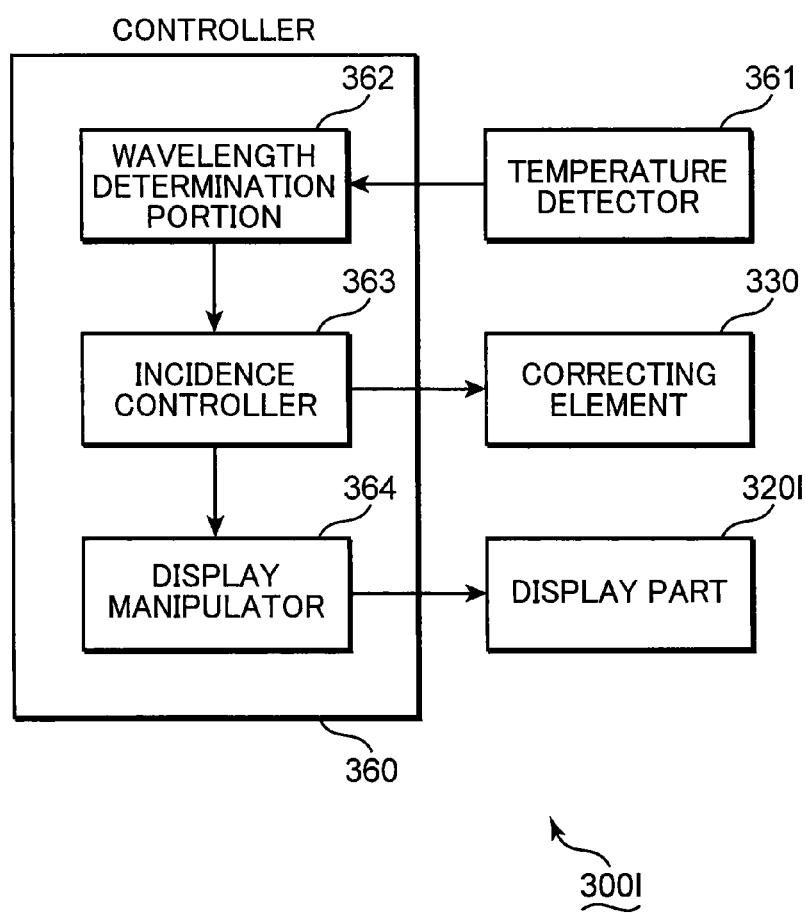
FIG. 35 is a schematic block diagram of a transmissive display device shown in FIG. 32.

FIG. 35 is a schematic block diagram of the HUD 300I. The controller 360 is described with reference to FIGS. 32 and 35.

The controller 360 comprises a wavelength determination portion 362, an incidence controller 363 and a display manipulator 364. The operations of the wavelength determination portion 362, the incidence controller 363 and the display manipulator 364 are described below.

The controller 360 may be wirelessly connected to a peripheral device such as a mobile phone. The controller 360 may comprise a communicatory portion which receives image and audio signals. The controller 360 may comprise a memory which stores an image presented to the driver DR. Alternatively, the controller 360 may acquire an image presented to the driver DR from the external device via a wireless connection.

Figure 36:
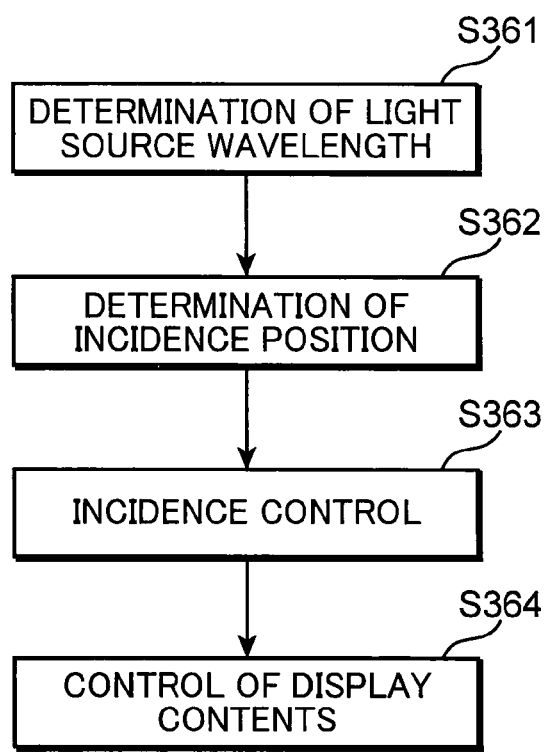
FIG. 36 is a schematic process flowchart of a controller of the transmissive display device shown in FIG. 32.

FIG. 36 is a schematic process flowchart of the controller 360 when the wavelengths of the laser light L emitted from the red, blue and green laser sources 341, 342, 343 in the display part 320I are changed. The processes of the controller 360 are described with reference to FIGS. 31 to 33 and FIGS. 35 and 36.

In the present embodiment, the controller 360 executes the steps S361, S362, S363 and S364 shown in FIG. 36.

<Step S361: Determination of Light Source Wavelength>

In step S361, the wavelength determination portion 362 determines the wavelengths of the laser lights L which are emitted from the red, blue and green laser sources 341, 342, 343 in the display part 320I, respectively. The wavelength determination portion 362 acquires information about the temperatures of the red, blue and green laser sources 341, 342, 343 from the temperature detector 361 which is arranged in the display part 320I. The wavelength determination portion 362 previously stores data which represents a relationship between temperature and wavelength for the red, blue and green laser sources 341, 342, 343 as described with reference to FIG. 31. The wavelength determination portion 362 determines the wavelengths of the laser lights L emitted from the red, blue and green laser sources 341, 342, 343, on the basis of the information about each temperature of the red, blue and green laser sources 341, 342, 343 acquired from the temperature detector 361. The wavelength determination portion 362 outputs the data about the wavelength of the laser light L estimated by means of the data, which is stored in advance and represents the relationship between the temperature and the wavelength, to the incidence controller 363.

In the present embodiment, the wavelength determination portion 362 estimates the wavelengths of the laser lights L on the basis of the temperatures of the red, blue and green laser sources 341, 342, 343, respectively. Alternatively, the display part may comprise a measurement device configured to directly measure the wavelengths of the laser lights emitted from the red, blue and green laser sources, respectively. Since the wavelength of the laser light is directly measured, more accurate data about the wavelength of the laser light are output to the incidence controller.

In the present embodiment, the wavelength determination portion 362 determines the wavelengths of the laser lights L emitted from the red, blue and green laser sources 341, 342, 343, respectively. Alternatively, the wavelength determination portion may determine laser light wavelength of one color or two colors among R, G, B. Since the determination of the laser light wavelength of colors having smaller wavelength variation against a temperature change is omitted, a number of components and the processing steps required for the wavelength determination are reduced, which results in a lower manufacturing cost of the controller.

<Step S362: Determination of Incidence Position>

In step S362, the incidence controller 363 determines the combiner (the lower or upper combiner 358, 359) on which the display light L1 is incident from the display part 320I, on the basis of the wavelength determination result for the laser lights L emitted from the red, blue and green laser sources 341, 342, 343, after the wavelength determination result is output from the wavelength determination portion 362.

The incidence controller 363 has data about the wavelength range of the hologram combiner 350I as shown in FIG. 34 for the red, blue and green laser sources 341, 342, 343 in advance. The incidence controller 363 selects the combiner (the lower or upper combiner 358, 359) having a wavelength range corresponding to the current wavelength of the laser lights L which are emitted from the light sources (the red, blue and green laser sources 341, 342, 343). In the present embodiment, if the wavelengths of the laser lights L emitted from the light sources (the red, blue and green laser sources 341, 342, 343) are short, the lower combiner 358 which has the wavelength range $\delta\lambda r1$ corresponding to a short wavelength is selected. If the wavelengths of the laser lights L emitted from the light sources (the red, blue and green laser sources 341, 342, 343) are long, the upper combiner 359 which has the wavelength range $\delta\lambda r2$ corresponding to a long wavelength is selected. In the following description, the selected one of the lower and upper combiners 358, 359 is called "display combiner".

As shown in FIG. 34, the wavelength range $\delta\lambda r1$ of the lower combiner 358 partially overlaps with the wavelength range $\delta\lambda r2$ of the upper combiner 359. If the value of the wavelength indicated by the data output from the wavelength determination portion 362 corresponds to both the wavelength ranges $\delta\lambda r1$, r2, the incidence controller 363 may determine one of the lower and upper combiners 358, 359 as the display combiner. If an image has already being displayed, one in use of the lower and upper combiners 358, 359 may be determined as the display combiner and continuously used for the image display.

The partial overlap between the wavelength range $\delta\lambda r1$ of the lower combiner 358 and the wavelength range $\delta\lambda r2$ of the upper combiner 359 is less likely to cause a resultant decrease in display brightness from a temporary variation in wavelengths of the laser lights L emitted from the light sources (the red, blue and green laser sources 341, 342, 343). A variation in environmental factors such as the ambient temperature and supply current may result in a larger variation in the actual wavelength of the laser light L than expected. Therefore, the actual wavelength may depart from the wavelength range of the lower or upper combiner 358, 359. Consequently, without any overlap between the wavelength range $\delta\lambda r1$ of the lower combiner 358 and the wavelength range $\delta\lambda r2$ of the upper combiner 359, the display brightness declines. By setting the wavelength range $\delta\lambda r1$ of the lower combiner 358 and the wavelength range $\delta\lambda r2$ of the upper combiner 359 to relatively broad ranges to create a partial overlap between these ranges, the display brightness is suitably less likely to decrease.

After the display combiner is determined, the incidence controller 363 executes the processes in step S364 to change the combiner on which the display light L1 from the display part 320I is actually incident.

<Step S363: Incidence Control>

In step S363, the incidence controller 363 carries out processes to cause the display light L1 from the display part 320I to be incident on the display combiner determined in the preceding step S362. The incidence controller 363 changes an angle of the correcting element 330I to switch the combiner on which the display light L1 from the display part 320I is incident (the lower or upper combiner 358, 359).

Figure 37:
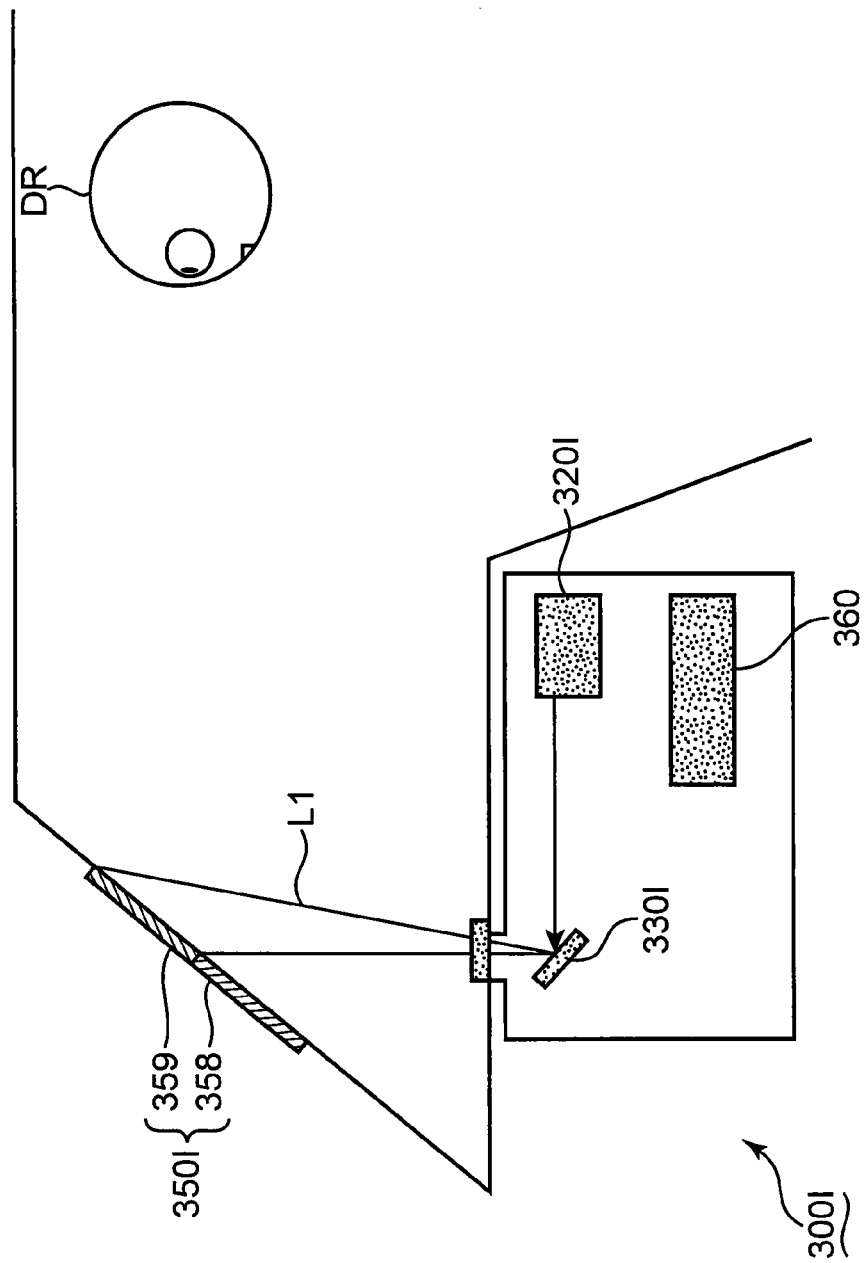
FIG. 37 is a schematic view of combiner switching control of the transmissive display device shown in FIG. 32.
Figure 38:
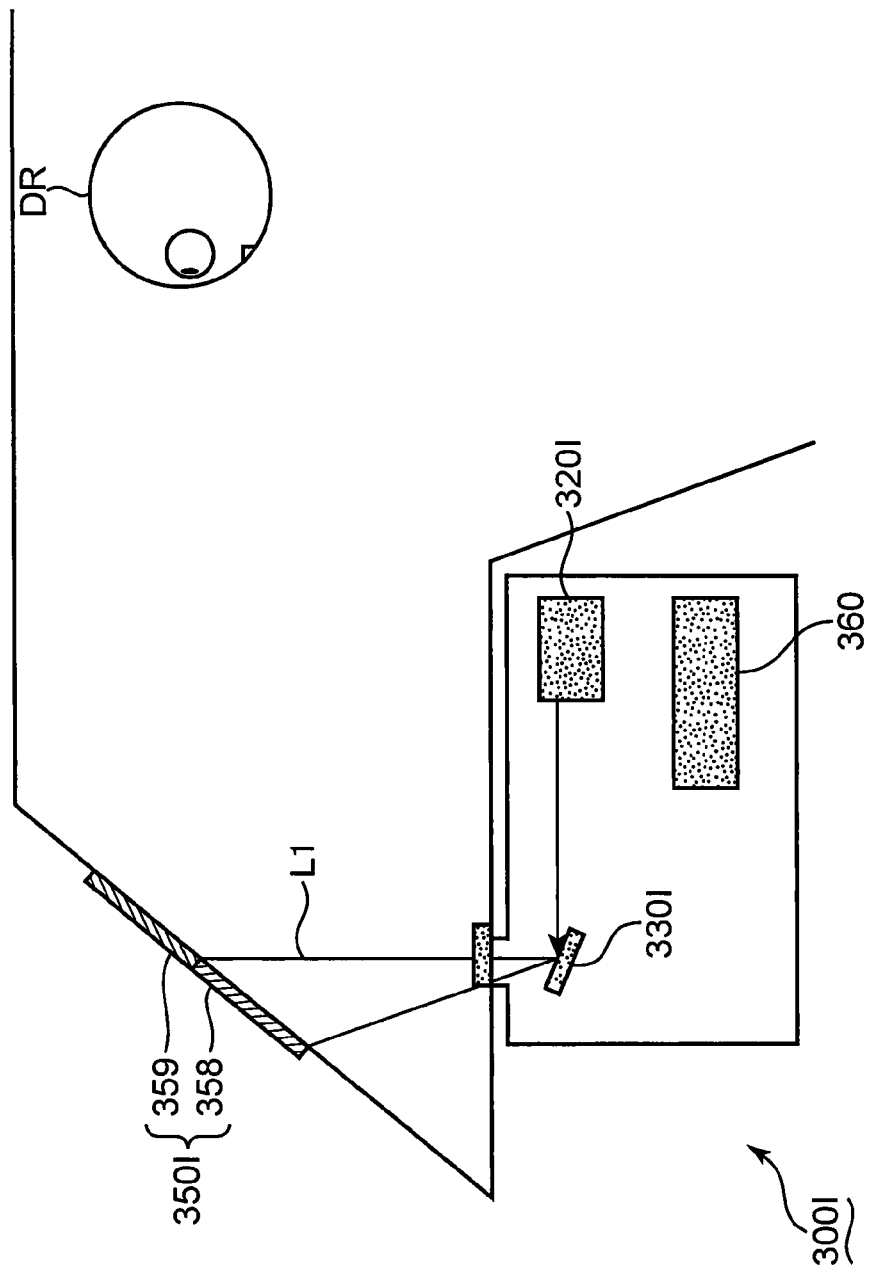
FIG. 38 is a schematic view of the combiner switching control of the transmissive display device shown in FIG. 32.

FIGS. 37 and 38 show a schematic view of the switching control of the combiner (the lower or upper combiner 358, 359). FIG. 37 shows the correcting element 330I which causes the display light L1 to be incident on the upper combiner 359. FIG. 38 shows the correcting element 330I which causes the display light L1 to be incident on the lower combiner 358. The switching control of the combiner (the lower or upper combiner 358, 359) is described with reference to FIGS. 32, 35, 37 and 38.

The incidence controller 363 changes the angle of the correcting element 330I to switch the optical path of the display light L1 between the optical paths OP1, OP2. After the incidence controller 363 adjusts the angle of the correcting element 330I so as to make the display light L1 propagate along the optical path OP1, the reflected display light L1 from the correcting element 330I is projected onto the upper combiner 359. After the incidence controller 363 adjusts the angle of the correcting element 330I so as to make the display light L1 propagate along the optical path OP2, the reflected display light L1 from the correcting element 330I is projected onto the lower combiner 358. The display light L1 is projected towards the display combiner determined in step S362.

In the present embodiment, the incidence controller 363 changes the inclination angle of the correcting element 330I to select the combiner on which the display light L1 is incident (the lower or upper combiner 358, 359). Alternatively, the display part may cause the display light to be incident on the entire hologram combiner with switching the display area.

Figure 39:
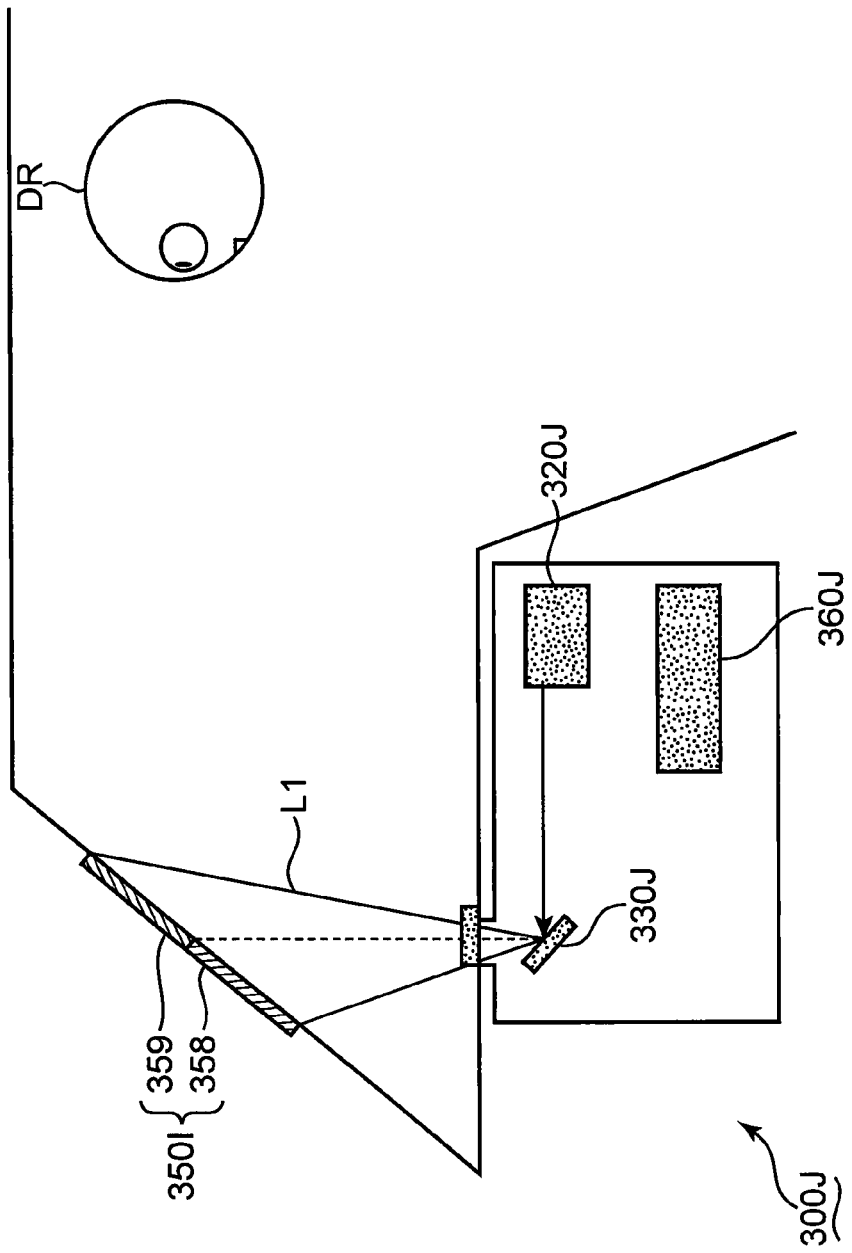
FIG. 39 is a schematic view of another transmissive display device which comprises a display part to switch the display region.

FIG. 39 shows a schematic view of another HUD which comprises a display part that switches the display area. The other HUD which comprises the display part configured to switch the display area is described with reference to FIG. 39.

The HUD 300J comprises the hologram combiner 350I which is described in the context of the HUD 300I. The HUD 300J also comprises a display part 320J, which switches the display area, a controller 360J, which controls the display part 320J, and a correcting element 330J, which deflects the display light L1 emitted from the display part 320J towards the hologram combiner 350I. The controller 360J controls the display part 320J so as to switch the display area. Since the display part 320J switches the display area, the angle of the correcting element 330J may be kept consistent.

The dotted line shown in FIG. 39 corresponds to a boundary between the lower and upper combiners 358, 359 (the central position of the hologram combiner 350I). The display part 320J simultaneously irradiates the display light L1 onto the lower and upper combiners 358, 359. In order to clarify the description, the image display area from the display part 320J towards the hologram combiner 350I coincides with the whole area of the hologram combiner 350I. The inclination of the correcting element 330J is adjusted so that the vertical center position of the image emitted from the display part 320J coincides with the boundary between the lower and upper combiners 358, 359.

Figure 40:
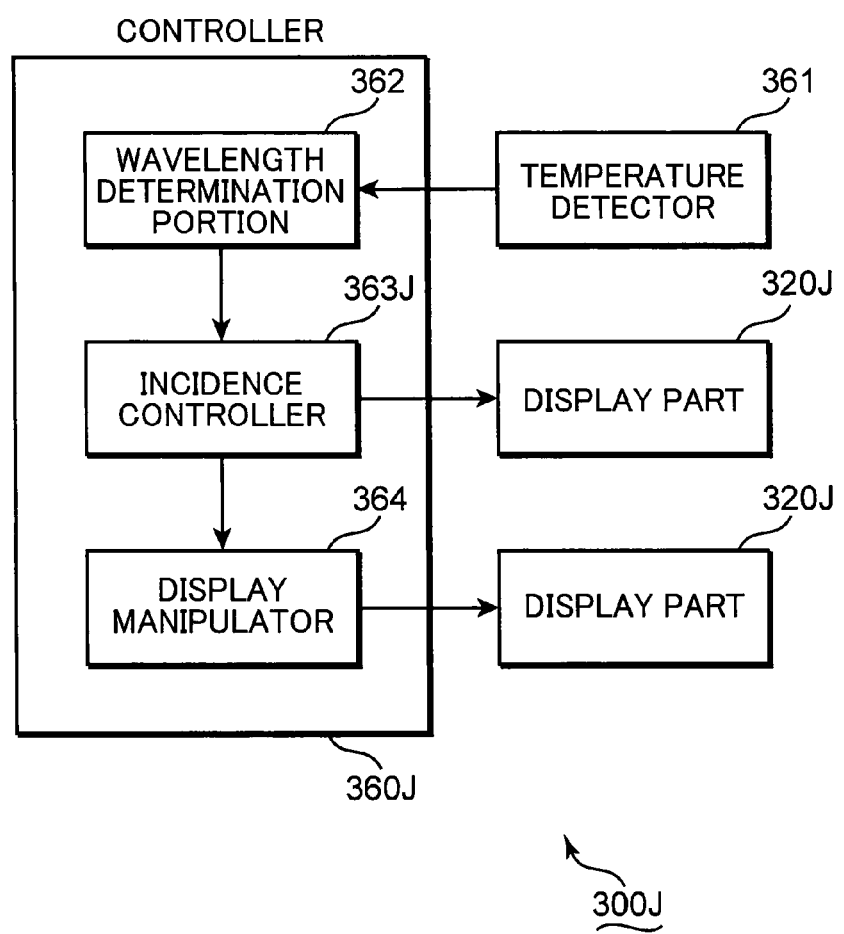
FIG. 40 is a schematic block diagram of the transmissive display device shown in FIG. 39.

FIG. 40 is a schematic block diagram of the HUD 300J. The controller 360J is described with reference to FIGS. 39 and 40.

The controller 360J comprises an incidence controller 363J in addition to the incidence controller 363 and the display manipulator 364 described in the context of the aforementioned controller 360. The incidence controller 363J controls the display part 320J so as to switch the display area.

Figure 41:
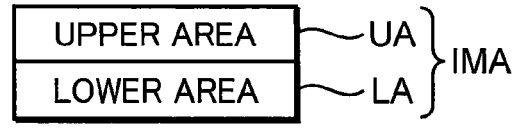
FIG. 41 shows an image area which is displayed by a display part of the transmissive display device shown in FIG. 39.

FIG. 41 shows an image area on which the display part 320J displays an image. The switching operation of the display area is described with reference to FIGS. 32, 36 and 39 to 41.

The image area IMA includes: an upper area UA on which an image is depicted by the incident display light L1 on the upper combiner 359, and a lower area LA on which an image is depicted by the incident display light L1 on the lower combiner 358. If the lower combiner 358 is selected as the display combiner, the incidence controller 363J outputs control signals to the display part 320J to display information only on the lower area LA. If the upper combiner 359 is selected as the display combiner, the incidence controller 363J outputs control signals to the display part 320J to display information only on the upper area UA. As described above, since the inclination angle of the correcting element 330J is kept consistent, it becomes simple to manufacture the HUD 300J in comparison with the HUD 300I which comprises the movable correcting element 330I.

<Step S364: Control of Display Contents (Determination of Display Position)>

In step S364, the display manipulator 364 changes the image contents presented to the driver DR as well as the position of the image.

Figure 42:
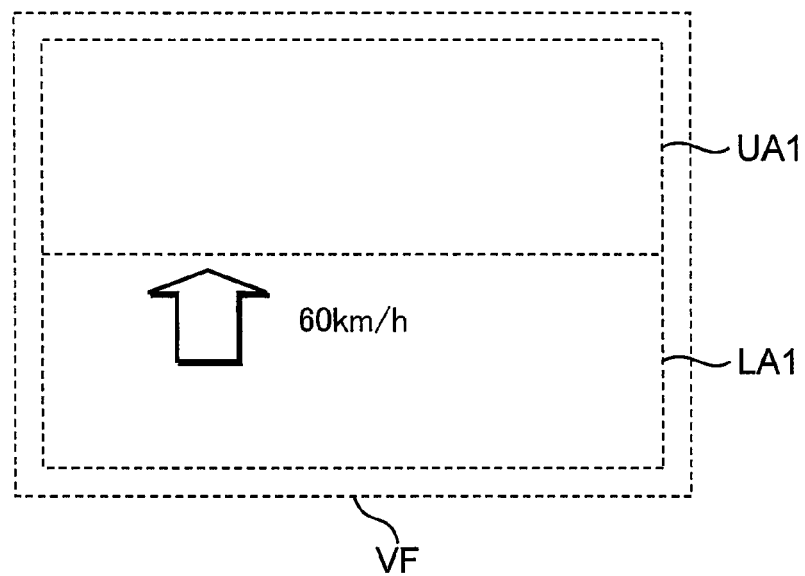
FIG. 42 is a schematic view of an image presented to a driver.

FIG. 42 shows a schematic view of an image presented to the driver DR. The control of the display contents is described with reference to FIGS. 35 to 42.

FIG. 42 shows a view field VF of the driver during driving, an upper area UA1 in the view field VF of the driver DR, in which information is displayed by the reflected light from the upper combiner 359, and a lower area LA1 in the view field VF of the driver DR in which information is displayed by the reflected light from the lower combiner 358. In the lower area LA1 of the view field VF shown in FIG. 42, the reflected light from the lower combiner 358 presents the information to the driver DR. If the reflected light from the upper combiner 359 displays the information to be presented to the driver DR, the information is displayed in the upper area UA1 of the view field VF.

In the preceding step S363, if the display combiner is changed, the display position of the information presented to the driver DR is vertically changed. The vertical positional change of the information potentially makes the driver feel strange.

The display manipulator 364 may adjust the display position of the information by means of the display combiner so as to prevent the driver from feeling strange.

Figure 43:
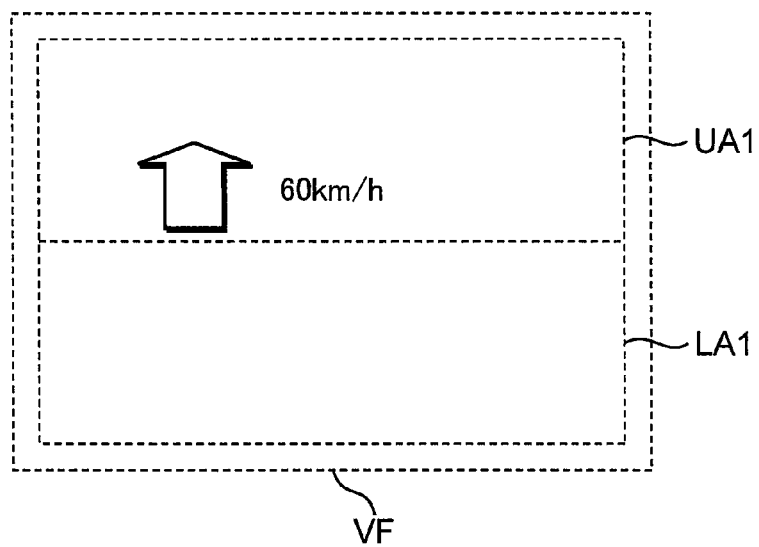
FIG. 43 is a schematic view of an image presented to a driver.

FIG. 43 shows a schematic view of an image presented to the driver DR. The adjustment of the information display position is described with reference to FIGS. 35 to 43.

If information is represented by means of the reflected light from the lower combiner 358 as shown in FIG. 42, the display manipulator 364 adjusts the display position of the information so that the information is displayed in an upper portion of the lower area LA1. If the information is represented by means of the reflected light from the upper combiner 359 as shown in FIG. 43, the display manipulator 364 adjusts the display position of the information so that the information is displayed in a lower portion of the upper area UA1. A vertical variation range in the display position of the information (e.g., the speedometer) with the switching operation of the display combiner becomes narrow enough to prevent the driver DR from feeling strange by the adjustment to the display position of the information.

In the present embodiment, the steps S361 to S364 shown in FIG. 36 are sequentially executed. Alternatively, a portion of these steps may be simultaneously executed. For example, the steps S363 and S364 may be simultaneously executed to accelerate the changing processes of the display combiner.

According to the principles of the present embodiment, since an image is displayed by means of a few hologram combiners which have relatively short wavelength ranges, a high diffraction efficiency is set for each hologram combiner. Therefore, a bright image may be presented to the driver DR. Even if the light wavelength from the light source varies due to a change in an operational environment such as a temperature change, the image brightness is less likely to decrease.

In the present embodiment, the HUDs 300I, 300J comprise two hologram combiners (the lower and upper combiners 358, 359). Alternatively, the HUD may comprise more than two hologram combiners. As a result of setting small wavelength ranges for the hologram combiners, respectively, the diffraction efficiency of the hologram combiners is improved to display a clear image.

In the present embodiment, the HUDs 300I, 300J comprise two hologram combiners which are vertically aligned (the lower and upper combiners 358, 359). Alternatively, the HUD may comprise a few hologram combiners which are horizontally aligned. In this case, the display position of the display image (information) in the view field of a driver horizontally varies with a change in the display combiner. In general, the human eye follows a horizontal movement more readily than a vertical movement. Therefore, the switching operation of the display combiner may make the driver feel less strange.

In the present embodiment, the HUDs 300I, 300J determine the wavelength of the laser light L emitted from the display parts 320I, 320J to automatically switch the display combiner. Alternatively, the display combiner may be switched on the basis of an instruction from the driver. For example, the driver may operate a user interface attached to the driver's seat to switch the display combiner if the driver feels insufficient brightness of the displayed image. In this case, components such as the aforementioned temperature detector are not required. Therefore, the manufacturing cost of the HUD is reduced.

Seventh Embodiment

Figure 44:
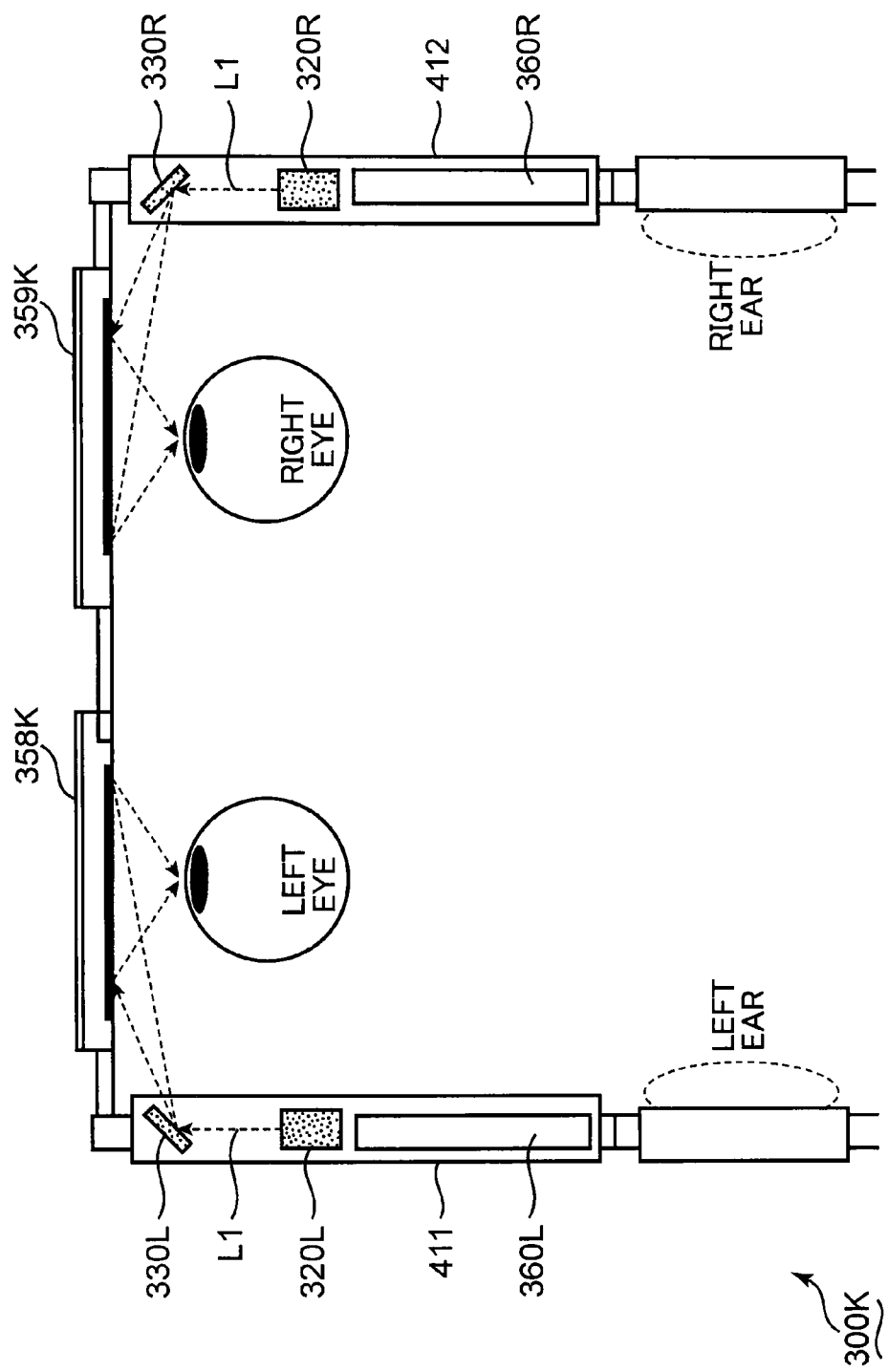
FIG. 44 is a schematic plan view of a transmissive display device according to the seventh embodiment.
Figure 45:
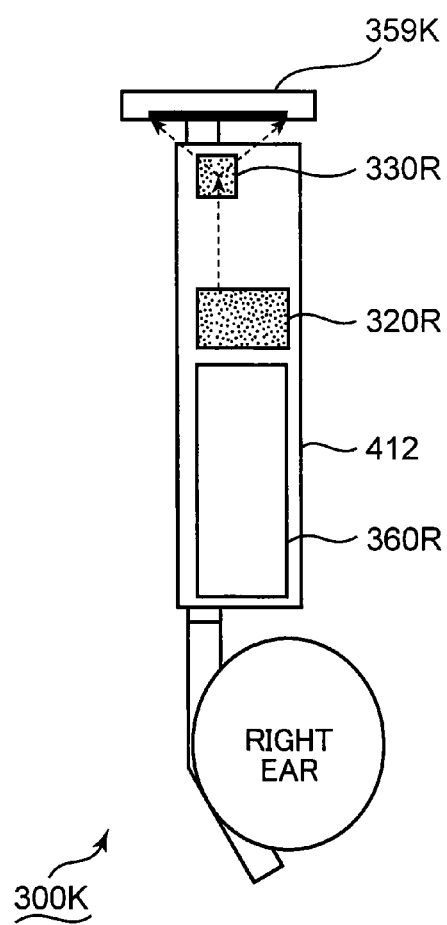
FIG. 45 is a schematic side view of the transmissive display device shown in FIG. 44.
Figure 46:
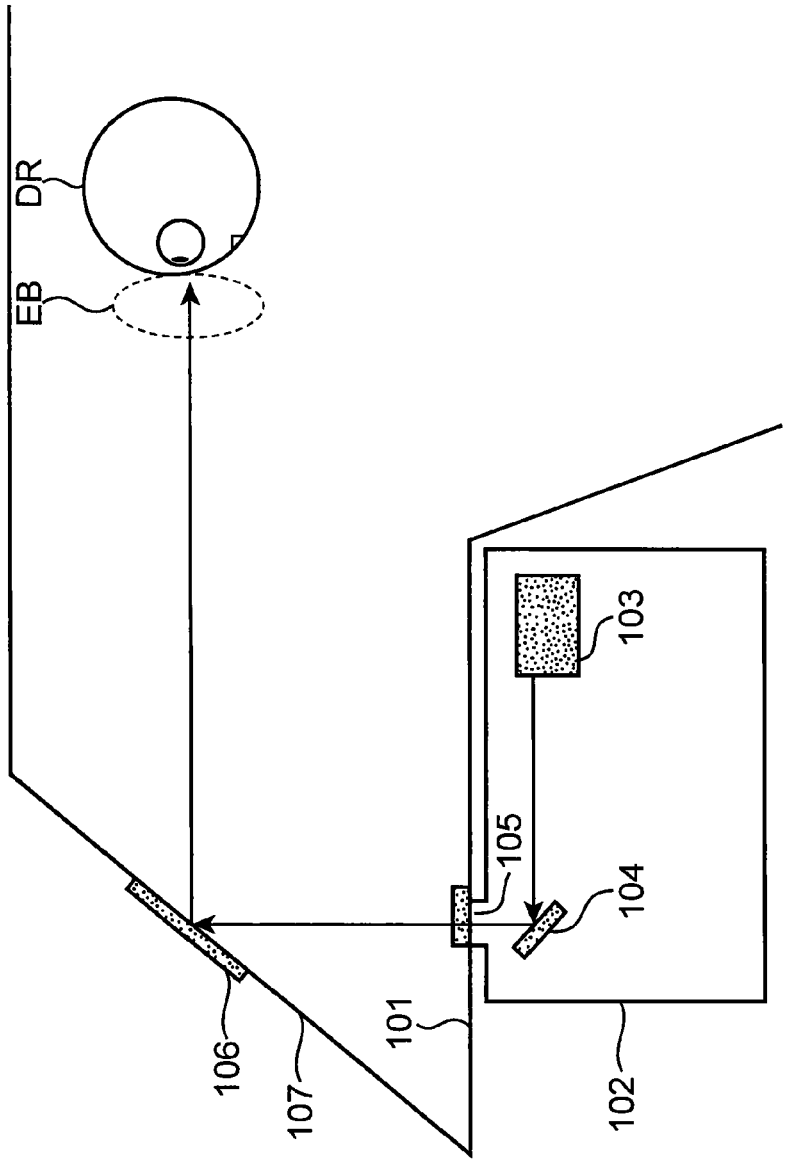
FIG. 46 is a schematic view of a conventional transmissive display device.
Figure 47:
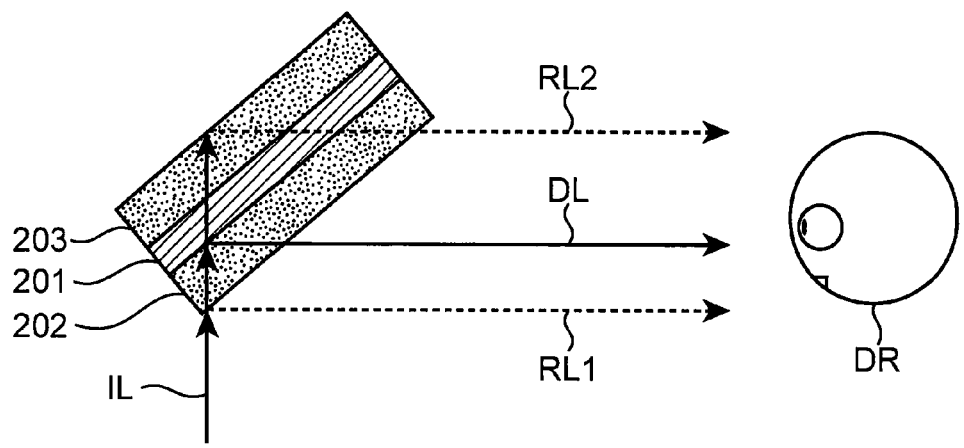
FIG. 47 is a schematic view of a hologram combiner which is used in a conventional transmissive display device.

FIG. 44 is a schematic plan view of a head-mounted display (hereinafter, called "HMD") which is exemplified as a transmissive display device according to the seventh embodiment. FIG. 45 is a schematic right view of the HMD shown in FIG. 44. The same components as the first and/or sixth embodiments are labeled with the same reference numerals. Differences from the first and/or sixth embodiments are described with reference to FIGS. 44 and 45. Descriptions about the same components as the first and/or the sixth embodiments are omitted here. The descriptions in the context of the first and/or sixth embodiments may be suitably incorporated to components which are not described below.

Like the sixth embodiment, the HMD according to the present embodiment resolves the problem about the reduced image brightness caused by a change in the incident light wavelength on the hologram combiner, which is used as a combiner, from the display element.

The HMD 300K generally looks like eyeglasses for correcting eyesight. The HMD 300K comprises a left frame portion 411, which extends from the left ear of a user, and a right frame portion 412, which extends from the right ear of the user. The HMD 300K also comprises a left combiner 358K, which is situated in front of the left eye of the user and a right combiner 359K, which is situated in front of the right eye of the user. The left and right combiners 358K, 359K have different wavelength ranges from each other.

The HMD 300K also comprises a display part 320L and a correcting element 330L which are situated inside the left frame portion 411. The display part 320L emits the display light L1, which is viewed by the left eye, towards the correcting element 330L. The correcting element 330L reflects the display light L1 from the display part 320L towards the left combiner 358K which is situated in front of the left eye.

The HMD 300K also comprises a display part 320R and a correcting element 330R which are situated inside the right frame portion 412. The display part 320R emits the display light L1, which is viewed by the right eye, towards the correcting element 330R. The correcting element 330R reflects the display light L1 from the display part 320R towards the right combiner 359K which is situated in front of the right eye.

The HMD 300K also comprises a controller 360L, which is situated inside the left frame portion 411, and a controller 360R, which is situated inside the right frame portion 412. For example, the controller 360L controls the display part 320L inside the left frame portion 411. For example, the controller 360R controls the display part 320R inside the right frame portion 412.

The left and right combiners 358K, 359K have different wavelength ranges. Therefore, even if the wavelength of the display light L1 changes in response to a change in an operational environment (a change in a temperature of the light source), the image brightness perceived by the user is less likely to go down. Human beings combine image information which is viewed by the left and right eyes, respectively, and perceive the information as a single image (fusion effect). Therefore, if one of the images displayed by the reflected lights from the left and right combiners 358K, 359K keeps the brightness, the user is less likely to perceive a decrease in the image brightness. The left and right combiners 358K, 359K have different wavelength ranges, respectively. Therefore, one of the images viewed by the left and right eyes keeps the brightness. Consequently, even if there is a change in the wavelength of the light source of the display part 320L, 320R, the user is less likely to perceive a decrease in the image brightness.

The series of the aforementioned embodiments are no more than examples of a transmissive display device. Various modifications and improvements may be made without departing from the principles included in the various embodiments described above.

The aforementioned embodiments mainly comprise the following features.

The transmissive display device according to one aspect of the aforementioned embodiment comprises a light source configured to emit light; a display part which receives the light from the light source to generate display light that represents an image; a deflecting element which changes a direction of the display light emitted from the display part; and a transmissive reflector configured to reflect light, which has a wavelength included in the display light emitted from the display part, towards a user and transmits light, which has other wavelengths, wherein an angle formed by a straight line, which extends between an upper edge of an incident area of the display light on the transmissive reflector and a lower portion of an eye box that is defined as a visible range of the reflected display light from the transmissive reflector, with respect to a horizontal line, is smaller than a difference between an emission angle and an incident angle of the display light at the transmissive reflector.

According to the aforementioned configuration, the display part receives light emitted from the light source to generate display light, which represents an image. The deflecting element changes a direction of the display light emitted from the display part. The transmissive reflector reflects light, which has a wavelength included in the display light emitted from the display part, towards a user and transmits light, which has other wavelengths. The eye box is defined as a visible range of the reflected display light from the transmissive reflector. The angle formed by a straight line, which extends between an upper edge of an incident area of the display light on the transmissive reflector and a lower portion of the eye box, with respect to the horizontal line, is smaller than a difference between an emission angle and an incident angle of the display light at the transmissive reflector. Therefore, the user views little reflected light from other surfaces than the transmissive reflector.

In the aforementioned configuration, desirably, with regard to a relationship among a first incident angle of the display light, which is incident on the deflecting element, a first emission angle of the display light, which is emitted from the deflecting element, a second incident angle of the display light, which is incident on the transmissive reflector, and a second emission angle of the display light, which is emitted from the transmissive reflector, a first angular difference defined as a difference between the first incident angle and the first emission angle is larger than a second angular difference defined as a difference between the second incident angle and the second emission angle, and the first incident angle is smaller than the first emission angle.

According to the aforementioned configuration, the display light, which is incident on the deflecting element at a first incident angle, is emitted at a first emission angle from the deflecting element. The display light is then incident at a second incident angle on the transmissive reflector and is emitted from the transmissive reflector at a second emission angle. The first angular difference is defined as a difference between the first incident angle and the first emission angle. The second angular difference is defined as a difference between the second incident angle and the second emission angle. The first angular difference is set to become larger than the second angular difference. The first incident angle is set to become smaller than the first emission angle. Consequently, the user views little reflected light from other surfaces than the transmissive reflector. Blurring of the image represented by the display light also becomes less influential.

In the aforementioned configuration, desirably, a difference between the first and second angular differences is set to become greater as a wavelength width of the light emitted from the light source increases.

According to the aforementioned configuration, a difference between the first and second angular differences is set to become greater as the wavelength width of the light emitted from the light source increases. Therefore, blurring of the image represented by the display light appropriately becomes less influential in response to the wavelength width of the light source.

In the aforementioned configuration, desirably, the first angular difference is larger than the second angular difference by 5° or more if the wavelength width of the light emitted from the light source is no less than 2 nm.

According to the aforementioned configuration, the first angular difference is larger than the second angular difference by 5° or more. Therefore, blurring of the image represented by the display light suitably becomes less influential even if the wavelength width of the light emitted from the light source is no less than 2 nm.

In the aforementioned configuration, desirably, the difference between the first and second angular differences is set to become greater as an optical magnification ratio of the transmissive reflector increases.

According to the aforementioned configuration, the difference between the first and second angular differences is set to become greater as the optical magnification ratio of the transmissive reflector increases. Therefore, the image blurring appropriately becomes less influential in response to the optical magnification of the transmissive reflector.

In the aforementioned configuration, desirably, an optical path length of the display light from the display part to the deflecting element is greater than an optical path length along which the display light travels from the deflecting element to the transmissive reflector.

According to the aforementioned configuration, the optical path length of the display light from the display part to the deflecting element is greater than the optical path length along which the display light travels from the deflecting element to the transmissive reflector. Therefore, resultant aberration from the transmissive reflector is reduced enough for the user to view a better quality image.

In the aforementioned configuration, desirably, an inclination direction of the deflecting element with respect to the horizontal line becomes different in response to a magnitude relationship between the second incident angle and the second emission angle.

According to the aforementioned configuration, the inclination direction of the deflecting element with respect to the horizontal line becomes different in response to the magnitude relationship between the second incident angle and the second emission angle. Therefore, the aberration is corrected in response to the incident angle at the transmissive reflector. Accordingly, the user may view a better quality image.

In the aforementioned configuration, desirably, if the second incident angle is larger than the second emission angle, the inclination direction of the deflecting element is set to be identical to an inclination direction of the transmissive reflector with respect to the horizontal line.

According to the aforementioned configuration, if the second incident angle is larger than the second emission angle, the inclination direction of the deflecting element is set to be identical to the inclination direction of the transmissive reflector with respect to the horizontal line. Therefore, the resultant aberration from the transmissive reflector is suitably reduced.

In the aforementioned configuration, desirably, the transmissive reflector includes: a diffracting element configured to deflect a direction of the display light; a front transparent member configured to hold the diffracting element at an incident side of the display light which is incident on the transmissive reflector; and a rear transparent member opposite to the front transparent member, the rear transparent member sandwiching the diffracting element together with the front transparent member, the front transparent member includes an air contact surface which contacts air, and the diffracting element is inclined with respect to the air contact surface.

According to the aforementioned configuration, the transmissive reflector comprises a diffracting element, which deflects the direction of the display light, and a front transparent member, which holds the diffracting element. The front transparent member is situated at the incident side of the display light, which is incident on the transmissive reflector. The transmissive reflector also comprises a rear transparent member opposite to the front transparent member. The rear transparent member sandwiches the diffracting element together with the front transparent member. The front transparent member includes an air contact surface which contacts the air. Since the diffracting element is inclined with respect to the air contact surface, the incident angle and the reflection angle at the diffracting element may be set to be different from the incident angle and the diffraction angle of the display light at the front transparent member, respectively.

In the aforementioned configuration, desirably, the diffracting element is inclined with respect to the air contact surface so that a difference between the incident angle of the display light, which is incident on the diffracting element, and the emission angle of the display light, which is emitted from the diffracting element, becomes small.

According to the aforementioned configuration, the diffracting element is inclined with respect to the air contact surface to reduce the difference between the incident angle of the display light, which is incident on the diffracting element, and the emission angle of the display light, which is emitted from the diffracting element. Therefore, the resultant aberration from the diffracting element is reduced.

In the aforementioned configuration, desirably, the diffracting element includes at least one inclined area, which is inclined with respect to the air contact surface.

According to the aforementioned configuration, since the diffracting element has at least one inclined area, which is inclined with respect to the air contact surface, the difference between the incident angle of the display light, which is incident on the inclined area, and the emission angle of the display light, which is emitted from the diffracting element, is reduced. Therefore, the resultant aberration from the diffracting element is reduced in the inclined area. The inclined area may be provided only where the aberration has to be reduced. Accordingly, the transmissive reflector does not become excessively thick.

In the aforementioned configuration, desirably, the at least one inclined area includes an area on which the display light is incident to depict an edge portion of the image.

According to the aforementioned configuration, since the at least one inclined area includes an area on which the display light is incident to depict an edge portion of the image, the image may have quality edge portion, in which large aberration is likely to occur.

In the aforementioned configuration, desirably, the diffracting element includes a free-form surface which has at least one curvature.

According to the aforementioned configuration, since the diffracting element includes a free-form surface which has at least one curvature, settings of the incident angle and the emission angle at the diffracting element may be changed, area by area of the diffracting element. The optical characteristics of the diffracting element, which are varied in response to areas of the diffracting element, suitably result in better quality image.

In the aforementioned configuration, desirably, a curvature of an area, on which the display light is incident to depict an edge portion of the image, is determined so that a difference between the incident angle of the display light on the diffracting element and the emission angle of the display light emitted from the diffracting element becomes small.

According to the aforementioned configuration, a curvature of an area, on which the display light is incident to depict an edge portion of the image, is determined so that a difference between the incident angle of the display light on the diffracting element and the emission angle of the display light emitted from the diffracting element becomes small. Therefore, the image may have quality edge portion, in which large aberration is likely to occur.

In the aforementioned configuration, desirably, a difference between the incident angle of the display light on the transmissive reflector and the emission angle of the display light from the transmissive reflector is no less than 6°.

According to the aforementioned configuration, since the difference between the incident angle of the display light on the transmissive reflector and the emission angle of the display light from the transmissive reflector is no less than 6°, the user views little external light, which is reflected by the display part.

In the aforementioned configuration, desirably, the transmissive reflector has a magnification function to magnify a display image which is created by the display part, and a magnification ratio of the magnification function is set to become greater as the emission angle of the display light from the transmissive reflector decreases.

According to the aforementioned configuration, the transmissive reflector has a magnification function to magnify a display image which is created by the display part. The magnification ratio of the magnification function, which is set to become greater as the emission angle of the display light from the transmissive reflector decreases, allows a short optical path length from the display part to the transmissive reflector, which results in a compact transmissive display device.

In the aforementioned configuration, desirably, the incident angle of the display light on the transmissive reflector is between 20° and 25°.

According to the aforementioned configuration, the incident angle of the display light on the transmissive reflector, which is set between 20° and 25°, reduces the resultant aberration from the transmissive reflector to improve resolution of the displayed image.

In the aforementioned configuration, desirably, the magnification ratio of the magnification function is in a range of 3× to 4× if the emission angle of the display light from the transmissive reflector is ranged from 45° to 65°.

According to the aforementioned configuration, since the magnification ratio of the magnification function is set in a range of 3× to 4× if the emission angle of the display light from the transmissive reflector is ranged from 45° to 65°, the resultant aberration from the magnification function of the transmissive reflector is reduced. Therefore, the transmissive display device may become compact and achieve improved resolution of the displayed image.

In the aforementioned configuration, desirably, the transmissive reflector is a combiner made from a hologram, the display part includes a display element, and a wavelength width of the light source is no more than 1 nm.

According to the aforementioned configuration, since the transmissive reflector is a combiner made from a hologram, the user may suitably see an ambient outlook. Since the wavelength width of the light source is no more than 1 nm, the display device may suitably become compact.

In the aforementioned configuration, desirably, the transmissive device further comprises a display unit which stores the display part, wherein the display unit is provided with an opening from which the display light is emitted, and a distance between the transmissive reflector and the opening becomes shorter as the emission angle of the display light from the transmissive reflector decreases.

According to the aforementioned configuration, the transmissive display device further comprises a display unit, which is provided with an opening. The display light is emitted from the opening. The distance between the transmissive reflector and the opening becomes shorter as the emission angle of the display light from the transmissive reflector decreases. Therefore, the display unit may become compact for easy storage of the display unit.

In the aforementioned configuration, desirably, the transmissive reflector is a combiner made from a hologram, the display part includes a display element which receives light from the light source to generate the display light, and a difference between the incident angle of the display light on the transmissive reflector and the emission angle of the display light from the transmissive reflector becomes smaller as a wavelength width of the light source increases.

According to the aforementioned configuration, the transmissive reflector is a combiner made from a hologram. The display part comprises a display element which receives light from the light source to generate the display light. Since the difference between the incident angle of the display light on the transmissive reflector and the emission angle of the display light from the transmissive reflector is set to become smaller as the wavelength width of the light source increases, resultant blurring of the display image from the wavelength width of the light source or diffraction at the hologram is reduced.

In the aforementioned configuration, desirably, the difference between the incident angle of the display light on the transmissive reflector and the emission angle of the display light from the transmissive reflector is no more than 8°.

According to the aforementioned configuration, since the difference between the incident angle of the display light on the transmissive reflector and the emission angle of the display light from the transmissive reflector is no more than 8°, the resultant blurring of the display image from the wavelength width of the light source or diffraction at the hologram is reduced.

In the aforementioned configuration, desirably, the light source includes laser sources which emit laser lights that have wavelengths corresponding to red, blue and green, respectively, and wavelength widths of the laser lights emitted from the laser sources are no more than 1 nm, respectively.

According to the aforementioned configuration, the light source includes laser sources, which emit laser light of wavelengths corresponding to red, blue and green, respectively, to display a color image. Since the wavelength widths of the laser lights, which are emitted from the laser sources, respectively, are no more than 1 nm, the resultant blurring of the display image from the wavelength width of the light source is reduced.

In the aforementioned configuration, desirably, the emission angle of the display light from the transmissive reflector is no more than 50°; and the magnification ratio is set to a range of 2× to 3.5×.

According to the aforementioned configuration, the emission angle of the display light from the transmissive reflector is no more than 50°. Since the emission angle from the transmissive reflector is relatively small, the magnification ratio is set in a range of 2× to 3.5×. Consequently, the resultant aberration from the magnification function of the transmissive reflector is reduced.

In the aforementioned configuration, desirably, the deflecting element is made from a concave mirror which has a magnification ratio.

According to the aforementioned configuration, the deflecting element is made from a concave mirror which has a magnification ratio. The deflecting element magnifies the display image as well as the transmissive reflector to shorten the optical path length from the display part to the transmissive reflector.

In the aforementioned configuration, desirably, the magnification ratio of the deflecting element is set to be smaller than the magnification ratio of the transmissive reflector.

According to the aforementioned configuration, the magnification ratio of the transmissive reflector is set to be higher than the magnification ratio of the deflecting element. Therefore, the aberration is less likely to increase in pixels of a lower portion of the display screen.

In the aforementioned configuration, desirably, the magnification ratio of the deflecting element is set to become larger as the magnification ratio of the transmissive reflector increases.

According to the aforementioned configuration, the magnification ratio of the deflecting element, which is set to become larger as the magnification ratio of the transmissive reflector increases, reduces a difference in magnitude between the resultant aberrations from the transmissive reflector and the deflecting element to show the user substantially circular pixels.

In the aforementioned configuration, desirably, the incident angle of the display light on the deflecting element is set so that a direction of astigmatism which the deflecting element causes is different from a direction of astigmatism which the transmissive reflector causes.

According to the aforementioned configuration, since incident angle of the display light on the deflecting element is set so that a direction of astigmatism which the deflecting element causes is different from a direction of astigmatism which the transmissive reflector causes, the pixels viewed by the user keep substantially circular with little decline in resolution.

In the aforementioned configuration, desirably, the display light is incident on the deflecting element in an opposite direction to an incident direction of the display light on the transmissive reflector.

According to the aforementioned configuration, since the display light is incident on the deflecting element in an opposite direction to the incident direction of the display light on the transmissive reflector, the pixels viewed by the viewer keep substantially circular with little decline in resolution.

In the aforementioned configuration, desirably, the incident angle of the display light on the transmissive reflector is set between 15° and 25°.

According to the aforementioned configuration, since the incident angle of the display light at the transmissive reflector is set between 15° and 25°, a direction of the resultant aberration from the transmissive reflector is different from a direction of the resultant aberration from the deflecting element. Consequently, the pixels viewed by the user keep substantially circular with little decline in resolution.

In the aforementioned configuration, desirably, the magnification ratio of the transmissive reflector is set to a range of 2× to 3×, and the magnification ratio of the deflecting element is set to a range of 1.2× to 2×.

According to the aforementioned configuration, the magnification ratio of the transmissive reflector is set to a range of 2× to 3×. The magnification ratio of the deflecting element is set in a range of 1.2× to 2×. Therefore, the aberration is reduced. Consequently, the user may view an image with high resolution.

In the aforementioned configuration, desirably, a focal distance of the deflecting element is shorter than a distance from the deflecting element to the transmissive reflector.

According to the aforementioned configuration, since the focal distance of the deflecting element is shorter than the distance from the deflecting element to the transmissive reflector, the reflected light from the deflecting element is less likely to concentrate on the transmissive reflector. Therefore, the transmissive reflector is less likely to be damaged.

In the aforementioned configuration, desirably, the transmissive reflector comprises a first transmissive reflector, which reflects more light waves in a first wavelength region than other light waves, and a second transmissive reflector, which reflects more light waves in a second wavelength region, which is different from the first wavelength region; wherein the deflecting element switches a direction of the display light between a first direction towards the first transmissive reflector and a second direction towards the second transmissive reflector, in response to a wavelength of the light from the light source.

According to the aforementioned configuration, a bright image is presented to the user, even under varied wavelengths of the light from the light source.

In the aforementioned configuration, desirably, the transmissive display device further comprises a controller which controls the display part; wherein the transmissive reflector comprises a first transmissive reflector which reflects more light waves in a first wavelength region than other light waves, and a second transmissive reflector which reflects more light waves in a second wavelength region, which is different from the first wavelength region; and an image display position is switched between a corresponding position to the first transmissive reflector and a corresponding position to the second transmissive reflector under control of the controller, in response to a wavelength of the light from the light source.

According to the aforementioned configuration, a bright image is presented to the user, even under varied wavelengths of the light from the light source.

In the aforementioned configuration, desirably, the transmissive reflector comprises a first transmissive reflector which reflects more light waves in a first wavelength region than other light waves, and a second transmissive reflector which reflects more light waves in a second wavelength region, which is different from the first wavelength region; and the first transmissive reflector is situated in front of one eye of the user and the second transmissive reflector is situated in front of the other eye of the user.

According to the aforementioned configuration, a bright image is presented to the user, even under varied wavelength of the light from the light source.

INDUSTRIAL APPLICABILITY

The aforementioned principles of the transmissive display device may be applied to various applications such as a display device having a transmissive reflector including a hologram, a display system, a display method or a display program.

The invention claimed is:
1. A transmissive display device, comprising:
a light source configured to emit light;
a display part which receives the light from the light source to generate display light that represents an image;
a deflecting element which changes a direction of the display light emitted from the display part; and
a transmissive reflector configured to reflect light, which has a wavelength included in the display light emitted from the display part, towards a user and transmits light, which has other wavelengths, wherein
the transmissive reflector includes:
a diffracting element configured to deflect a direction of the display light;
a front transparent member configured to hold the diffracting element at an incident side of the display light which is incident on the transmissive reflector; and a rear transparent member opposite to the front transparent member, the rear transparent member sandwiching the diffracting element together with the front transparent member, the front transparent member includes an air contact surface which contacts air, the diffracting element is inclined with respect to the air contact surface so that a difference between an incident angle of the incident display light on the diffracting element and an emission angle of the display light emitted from the diffracting element becomes small, and the diffracting element includes at least one inclined area, which is inclined with respect to the air contact surface, and one of a non-inclined area, which is not inclined with respect to the air contact surface, and a free-form surface, which has at least one curvature.

2. The transmissive display device according to claim 1, wherein with regard to a relationship among a first incident angle of the display light, which is incident on the deflecting element, a first emission angle of the display light, which is emitted from the deflecting element, a second incident angle of the display light, which is incident on the transmissive reflector, and a second emission angle of the display light, which is emitted from the transmissive reflector, a first angular difference defined as a difference between the first incident angle and the first emission angle is larger than a second angular difference defined as a difference between the second incident angle and the second emission angle, and the first incident angle is smaller than the first emission angle.

3. The transmissive display device according to claim 2, wherein a difference between the first and second angular differences is set to become greater as a wavelength width of the light emitted from the light source increases.

4. The transmissive display device according to claim 3, wherein the first angular difference is larger than the second angular difference by 5° or more if the wavelength width of the light emitted from the light source is no less than 2 nm.

5. The transmissive display device according to claim 4, wherein an optical path length of the display light from the display part to the deflecting element is greater than an optical path length along which the display light travels from the deflecting element to the transmissive reflector.

6. The transmissive display device according to claim 5, wherein an inclination direction of the deflecting element with respect to a horizontal line becomes different in response to a magnitude relationship between the second incident angle and the second emission angle.

7. The transmissive display device according to claim 6, wherein if the second incident angle is larger than the second emission angle, the inclination direction of the deflecting element is set to be identical to an inclination direction of the transmissive reflector with respect to the horizontal line.

8. The transmissive display device according to claim 1, wherein the at least one inclined area includes an area on which the display light is incident to depict an edge portion of the image.

9. The transmissive display device according to claim 1, wherein a difference between the incident angle of the display light on the transmissive reflector and the emission angle of the display light from the transmissive reflector is no less than 6°.

10. The transmissive display device according to claim 1, wherein the incident angle of the display light on the transmissive reflector is between 20° and 25°.

11. The transmissive display device according to claim 10, wherein the transmissive reflector has a magnification function to magnify a display image which is created by the display part, and a magnification ratio of the magnification function is in a range of 3× to 4× if the emission angle of the display light from the transmissive reflector is ranged from 45° to 65°.

12. The transmissive display device according to claim 10, wherein the transmissive reflector is a combiner made from a hologram, the display part includes a display element, and a wavelength width of the light source is no more than 1 nm.

13. The transmissive display device according to claim 10, wherein the difference between the incident angle of the display light on the transmissive reflector and the emission angle of the display light from the transmissive reflector is no more than 8°.

14. The transmissive display device according to claim 13, wherein the light source includes laser sources which emit laser lights that have wavelengths corresponding to red, blue and green, respectively, and wavelength widths of the laser lights emitted from the laser sources are no more than 1 nm, respectively.

15. The transmissive display device according to claim 14, wherein the emission angle of the display light from the transmissive reflector is no more than 50°; and the magnification ratio is set to a range of 2× to 3.5×.

16. The transmissive display device according to claim 10, wherein the deflecting element is made from a concave mirror which has a magnification ratio.

17. The transmissive display device according to claim 16, wherein the magnification ratio of the deflecting element is set to be smaller than the magnification ratio of the transmissive reflector.

18. The transmissive display device according to claim 16, wherein the incident angle of the display light on the deflecting element is set so that a direction of astigmatism which the deflecting element causes is different from a direction of astigmatism which the transmissive reflector causes.

19. The transmissive display device according to claim 18, wherein the display light is incident on the deflecting element in an opposite direction to an incident direction of the display light on the transmissive reflector.

20. The transmissive display device according to claim 19, wherein the incident angle of the display light on the transmissive reflector is set between 15° and 25°.

21. The transmissive display device according to claim 20, wherein
- the magnification ratio of the transmissive reflector is set to a range of 2× to 3×, and
- the magnification ratio of the deflecting element is set to a range of 1.2× to 2×.

22. The transmissive display device according to claim 16, wherein
- a focal distance of the deflecting element is shorter than a distance from the deflecting element to the transmissive reflector.

23. The transmissive display device according to claim 1, further comprising a display unit which stores the display part, wherein
- the display unit is provided with an opening from which the display light is emitted, and
- a distance between the transmissive reflector and the opening becomes shorter as the emission angle of the display light from the transmissive reflector decreases.

\* \* \* \* \*